United States Patent
Kodama et al.

(10) Patent No.: US 7,527,890 B2
(45) Date of Patent: May 5, 2009

(54) SEALED ALKALINE STORAGE BATTERY, ELECTRODE STRUCTURE AND CHARGING METHOD FOR THE SAME, AND CHARGER FOR SEALED ALKALINE STORAGE BATTERY

(75) Inventors: Mitsuhiro Kodama, Osaka (JP); Seijiro Ochiai, Osaka (JP); Kouichi Sakamoto, Osaka (JP); Kaori Syodai, Osaka (JP); Masaki Miyamoto, Osaka (JP); Manabu Kanemoto, Osaka (JP); Yoshihiro Katayama, Osaka (JP); Minoru Kuzuhara, Osaka (JP); Masaharu Watada, Osaka (JP)

(73) Assignee: Yuasa Corporation, Takatsuki-shi, Osaka (JP)

( * ) Notice: Subject to any disclaimer, the term of this patent is extended or adjusted under 35 U.S.C. 154(b) by 428 days.

(21) Appl. No.: 10/543,733

(22) PCT Filed: Jan. 29, 2004

(86) PCT No.: PCT/JP2004/000811

§ 371 (c)(1),
(2), (4) Date: Nov. 14, 2005

(87) PCT Pub. No.: WO2004/068625

PCT Pub. Date: Aug. 12, 2004

(65) Prior Publication Data

US 2006/0097701 A1      May 11, 2006

(30) Foreign Application Priority Data

Jan. 31, 2003    (JP) ............................. 2003-025160
Feb. 21, 2003   (JP) ............................. 2003-043915

(51) Int. Cl.
H01M 2/10    (2006.01)
H01M 4/52    (2006.01)

(52) U.S. Cl. .................... 429/50; 429/54; 429/223; 29/623.5

(58) Field of Classification Search .................. 429/50, 429/218.2, 223, 54; 29/623.5
See application file for complete search history.

(56) References Cited

U.S. PATENT DOCUMENTS 5,584,892 A * 12/1996 Lim ........................ 429/50 X
6,077,626 A *  6/2000 Nogami et al. ............. 429/223
6,203,945 B1  3/2001 Baba et al.

FOREIGN PATENT DOCUMENTS

| JP | 5-326024 | 12/1993 |
| JP | 7-29568 | 1/1995 |
| JP | 7-99691 | 10/1995 |
| JP | 7-254399 | 10/1995 |
| JP | 9-7588 | 1/1997 |

(Continued)

Primary Examiner—Stephen J. Kalafut
(74) Attorney, Agent, or Firm—McGinn IP Law Group, PLLC

(57) ABSTRACT

A sealed alkaline storage battery including a nickel electrode as a positive electrode, characterized by having the function of being capable of charge when the gas pressure in the battery and/or the battery temperature is not higher than a specified value and of being incapable of charge when the gas pressure in the battery and/or the battery temperature exceeds the specified value.

30 Claims, 16 Drawing Sheets

FOREIGN PATENT DOCUMENTS

| | | |
|---|---|---|
| JP | 9-265981 | 10/1997 |
| JP | 10-188945 | 7/1998 |
| JP | 11-195426 | 7/1999 |
| JP | 3012951 | 12/1999 |
| JP | 2000-311704 | 11/2000 |
| JP | 2001-60463 | 3/2001 |
| JP | 2002-110129 | 4/2002 |
| JP | 3296754 | 4/2002 |
| JP | 2002-334695 | 11/2002 |
| JP | 2002-541646 | 12/2002 |
| JP | 2003-17116 | 1/2003 |
| WO | WO 98/31063 | 7/1998 |

* cited by examiner

SEALED ALKALINE STORAGE BATTERY, ELECTRODE STRUCTURE AND CHARGING METHOD FOR THE SAME, AND CHARGER FOR SEALED ALKALINE STORAGE BATTERY

TECHNICAL FIELD

The present invention relates to a sealed alkaline storage battery, e.g., a nickel/metal-hydride battery or nickel-cadmium battery, which can be charged at a high rate and has a high capacity, and to an electrode structure for the battery, processes for producing the battery, and a method of charging the battery.

BACKGROUND ART

Alkaline storage batteries are excellent in overcharge resistance and overdischarge resistance and are batteries easy to use for general users. Because of this, alkaline storage batteries are in extensive use as the powder sources of portable telephones, small power tools, and portable small electronic appliances such as personal computers. The demand therefor is remarkably growing with the spread of these small electronic appliances. Alkaline storage batteries have been put to practical use also as the driving power sources of hybrid electric vehicles (HEV).

In the case of the alkaline storage batteries heretofore in use, 100% charging of a battery in which the capacity has been used up necessitates at least 1 hour. If a reduction in the time required for charging can be attained, convenience for users is improved. There is hence a desire for the development of a technique of high-rate charging, which attains a further reduction in the time required for charging, besides an improvement in discharge capacity.

Factors which inhibit high-rate charging are as follows. In rapid charging, the battery temperature rises due to the heat of reaction and Joul's heat and materials constituting the battery alter to deteriorate battery characteristics. High-rate charging, for example, accelerates the deterioration of the hydrogen-storing alloy.

Furthermore, the internal pressure of the battery increases during charge, and this may result in the leakage of a gas, which is a product of the decomposition of the liquid electrolyte, or of the liquid electrolyte. Because of this, repetitions of high-rate charging accelerate the consumption of the liquid electrolyte as compared with ordinary charging, resulting in a possibility that the cycle life might be reduced.

A pulse charging technique such as that described in, e.g., JP-B-47-45462 (page 7, claims) has been proposed as a technique for enabling rapid charging. However, even when the pulse charging technique is applied to the charging of alkaline storage batteries, it has been impossible to complete the charging in a time period as short as about a half of an hour or shorter.

In WO 02/35618 A1 (FIG. 2A) are proposed a charging method and apparatus therefor in which a sealed battery having a pressure switch (pressure response switch) function is charged in such a manner that when the internal pressure of the battery exceeds a specified value during charge, the charging is stopped and when the internal pressure of the battery is not higher than the specified value, charging is conducted.

However, the method proposed in that patent document has had drawbacks that the charging efficiency is low in short-time charging in up to 30 minutes and that when the method is applied to a sealed storage battery having an increased capacity, the drawback of low charging efficiency becomes conspicuous.

The nickel/metal-hydride battery and nickel-cadmium battery mentioned above each employ a nickel electrode as the positive electrode. This nickel electrode is one obtained by impregnating a porous nickel substrate such as foamed nickel with a paste containing an active-material powder comprising nickel hydroxide as the main component. The negative electrode (hydrogen-storing-alloy electrode) of the nickel/metal-hydride battery is one obtained by adding a thickener and a binder to a hydrogen-storing-alloy powder to prepare a paste and filling this paste on a substrate such as, e.g., a punching metal foam formed from a nickel-plated steel sheet.

The negative electrode (cadmium electrode) of the nickel-cadmium battery is one obtained in the same manner as for the hydrogen-storing-alloy electrode, except that a powder comprising cadmium oxide or cadmium hydroxide as the main component is used in place of the hydrogen-storing alloy.

When alkaline storage batteries are charged, oxygen generates at the positive electrode in a final stage of charge. In the alkaline storage batteries, the oxygen which has generated at the positive electrode is absorbed by the negative electrode, whereby the batteries can be produced in a sealed form.

In the alkaline storage batteries heretofore in use, the proportion of the impregnant capacity of the negative electrode to the impregnant capacity of the positive electrode has been set at from 1.5 to 1.8 or higher (large-excess negative-electrode impregnation) so as to accelerate oxygen absorption by the negative electrode during charge and to inhibit hydrogen generation at the negative electrode.

In case where the proportion of the impregnant capacity of the negative electrode to the impregnant capacity of the positive electrode in the alkaline storage batteries heretofore in use is regulated to below 1.5, a charge reserve cannot be sufficiently secured and there is a possibility that the amount of hydrogen generating at the negative electrode in a final stage of charge might increase to heighten the internal pressure of the battery.

Furthermore, there is a possibility that during repetitions of charge/discharge, γ-NiOOH, which is inactive as an active material, might generate and accumulate on the positive electrode to reduce the capacity, or that the oxygen which has generated at the positive electrode might corrodes the hydrogen-storing alloy or cadmium to reduce the capacity.

In producing the nickel electrode, cobalt monoxide or cobalt hydroxide is added, besides the nickel hydroxide powder as an active material, in order to enhance electrical conduction in the electrode. After incorporation into a battery, this electrode is charged to thereby oxidize the cobalt hydroxide to a conductive higher-order compound (also called cobalt oxyhydroxide).

The, reaction which thus yields a higher-order cobalt compound through charging is an irreversible reaction. Consequently, in the case where a higher-order cobalt compound has been yielded by charging, it is necessary that latent electricity should be stored in the negative electrode as a discharge reserve in an amount corresponding to the quantity of electricity consumed by the formation of the higher-order cobalt compound and the quantity of electricity to be consumed for oxidizing the cobalt added to the nickel hydroxide so as to form a solid solution. The charge reserve decreases accordingly. A decrease in charge reserve amount has caused a possibility that the internal pressure of the battery might increase during charge or the hydrogen-storing alloy or cadmium as a negative-electrode active material might be corroded, leading to a decrease in charge/discharge cycle life.

For securing a necessary charge reserve amount, it is necessary in designing a battery to estimate the impregnation with an active material for forming a discharge reserve in the negative electrode.

Such additional impregnation with a negative-electrode active material based on the estimation for discharge reserve formation further reduces the amount of the positive-electrode active material used for impregnation, resulting in a decrease in the discharge capacity of the battery.

For example, JP-A-3-78965 (page 3, left upper column, lines 14-16) and JP-A-4-26058 (page 2, right upper column, lines 9-10) propose a method in which a cobalt compound, such as, e.g., cobalt hydroxide, deposited on the surface of nickel hydroxide as an active material for nickel electrodes is oxidized to a higher-order cobalt compound beforehand in a chemical manner in order to inhibit the formation of a discharge reserve.

However, even when this method is used, it is still necessary to regulate the negative-electrode capacity/positive-electrode capacity ratio to at least 1.5-1.7 and it has been difficult to reduce this proportion to a smaller value. Consequently, the alkaline storage batteries heretofore in use have had a drawback that the capacity of the positive electrode must be reduced in order to pack the negative electrode in large excess into a predetermined battery volume and, hence, the battery capacity is limited to low values.

For inhibiting oxygen generation at the positive electrode during charge, a method in which a compound of a rare-earth element is added to a nickel electrode is proposed in, e.g., JP-A-9-265981 (page 2, right column, lines 33-38).

The addition of a compound of a rare-earth element to a nickel electrode is effective in shifting the oxygen evolution potential of the nickel electrode to the noble side. Because of this, the difference between the oxygen evolution potential and the potential of the nickel electrode enlarges and oxygen evolution is inhibited, resulting in an improved charging efficiency.

However, even with the expedient described above, high-rate charging results in enhanced oxygen generation at the positive electrode and, hence, the rate of oxygen absorption at the negative electrode is too low as compared with the rate of oxygen generation at the positive electrode. In addition, since hydrogen generation at the negative electrode occurs simultaneously, there is a possibility that the internal pressure of the battery might increase abruptly.

Because of these, the rate of charging in the alkaline storage batteries heretofore in use has been limited to 1-hour-rate charge (1-ItA charge), and charging at a higher rate has been difficult.

On the other hand, small storage batteries such as, e.g., cylindrical storage batteries employ an electrode structure comprising a-rectangular electrode and a tab-form lug (hereinafter referred to simply as lug) bonded thereto, and employ an element obtained by spirally winding an assembly composed of such electrode structures and separators stacked therewith.

In storage batteries heretofore in use, the lug in an electrode structure has been bonded in the position shown in FIG. 10 in order to prevent the lug from coming into contact with the metallic battery case to cause internal short-circuiting. Namely, the lug 23 in the electrode structure 21 is bonded in such a position that the distance b between that shorter side 22a of the rectangular electrode which faces the center and the center line X of the lug 23 satisfies the following relationship with the length a of a longer side of the electrode: $b \leq 0.4a$.

As long as charging is completed in about 1 hour or longer as before, use of that electrode structure has posed no problem. However, it has been found that when the rapid charging which has come to be newly desired, in which charging is completed in a period as short as 15-30 minutes, is attempted, then a high charging efficiency cannot be obtained and an abnormal battery temperature increase occurs to cause a decrease in capacity or abrupt deterioration of cycle characteristics.

A subject for the invention, which has been achieved in view of the drawbacks of related-art techniques described above, is to provide an alkaline storage battery which employs a hydrogen-storing-alloy electrode or cadmium electrode as a negative electrode and which has a high discharge capacity and has a high charging efficiency even in charging in an extremely short time, which has not been attained so far, without undergoing a decrease in the coefficient of active-material use or a decrease in charge/discharge cycle performance or in the function of inhibiting the internal battery pressure from increasing during overcharge or high-rate charging. Another subject is to provide a method of charging the battery.

The invention has been achieved in view of the problems of related-art techniques described above. A further object thereof is to provide an electrode structure and a storage battery which each can attain improvement in suitability for rapid charging completed in 15-30 minutes, without lowering battery characteristics concerning smallness, high capacity, and cycle performance. It was found that the electrode structure produces surprising effects due to the lug bonding position therein which has been optimized, although this has not been attained with any technical idea in the related art. Those objects have been thus accomplished.

DISCLOSURE OF THE INVENTION

In order to overcome the problems described above, the invention provides the following.

1. A sealed alkaline storage battery including a nickel electrode as a positive electrode, characterized by having the function of being capable of charge when the gas pressure in the battery is not higher than a specified value and of being incapable of charge when the gas pressure in the battery exceeds the specified value.

2. A sealed alkaline storage battery including a nickel electrode as a positive electrode, characterized by having the function of being capable of charge when the gas pressure in the battery and the battery temperature are not higher than specified values and of being incapable of charge when the gas pressure in the battery and the battery temperature exceed the specified values.

3. The sealed alkaline storage battery of claim 1 or 2, characterized in that it is a sealed alkaline storage battery in which the ratio between the capacity of the negative electrode and the capacity of the positive electrode (capacity of negative electrode/capacity of positive electrode) is from 1.02 to 1.45, and that the specified value of the gas pressure in the battery has been set at a value in the range of 1.0-3.0 megapascals (MPa) and/or the specified value of the battery temperature has been set at a value in the range of 50-80° C.

4. A process for producing the sealed alkaline storage battery of claim 3, characterized by applying a nickel electrode obtained by filling on a porous substrate a powdery material which comprises as a major constituent material an active material comprising nickel hydroxide as the main component and in which the average oxidation number of the transition metal elements contained therein is 2.04-2.4.

5. The process for producing a sealed alkaline storage battery of claim 4, characterized in that a powdery material comprising as a major constituent material an active material comprising nickel hydroxide as the main component is chemically oxidized with an oxidizing agent or electrochemically oxidized before being incorporated into the battery to thereby regulate the average oxidation number of the transition metal elements contained in the powdery material to 2.04-2.4.

6. The process for producing a sealed alkaline storage battery of claim 5, characterized in that an electrode obtained by filling on a porous substrate a powdery material prepared by adding a compound of cobalt having an oxidation number of 2 or smaller or elementary cobalt to an active-material powder comprising nickel hydroxide as the main component or forming a coating layer comprising a compound of cobalt having an oxidation number of 2 or smaller or elementary cobalt on the surface of the active material is charged in an alkaline liquid electrolyte before being incorporated into the battery to thereby regulate the average oxidation number of the transition metal elements contained in the powdery material to 2.04-2.4.

7. The process of claim 6 for producing a sealed alkaline storage battery including a positive electrode obtained by impregnating a porous substrate with a powdery material prepared by adding a compound of cobalt having an oxidation number of 2 or smaller or elementary cobalt to an active-material powder comprising nickel hydroxide as the main component or forming a coating layer comprising a compound of cobalt having an oxidation number of 2 or smaller or elementary cobalt on the surface of the active material and a negative electrode employing a hydrogen-storing material, characterized by comprising incorporating the positive electrode and the negative electrode into a battery, subsequently charging the battery in an unsealed state to regulate the average oxidation number of the transition metals contained in the powdery material of the positive electrode to 2.04-2.4, bringing the battery, after completion of the charging, under a reduced pressure obtained by suction to thereby remove the hydrogen which has accumulated in the negative electrode due to the charging, and then sealing the battery.

8. The sealed alkaline storage battery of claim 1 or 2, characterized in that the positive electrode contains a compound containing at least one element selected from rare-earth elements comprising Ho, Er, Tm, Yb, Lu, and Y and from Ca, the compound being, contained not as a eutectoid with the active material comprising nickel hydroxide as the main component.

9. The sealed alkaline storage battery of claim 8, characterized in that the proportion of the compound containing at least one element selected from rare-earth elements comprising Ho, Er, Tm, Yb, Lu, and Y and from Ca, which is contained in the positive electrode, is from 0.1% by weight to 5% by weight.

10. The sealed alkaline storage battery of claim 1 or 2, characterized by employing as a liquid electrolyte an aqueous alkali solution which contains one or more electrolytes comprising potassium hydroxide as a major electrolyte and in which the concentration of the electrolytes is 7.5±1.5 mol/dm$^3$, the liquid electrolyte being contained in an amount of 0.6-1.4 cm$^3$ per unit capacity (Ah) of the alkaline storage battery.

11. The sealed alkaline storage battery of claim 1 or 2, characterized by employing a nonwoven fabric comprising hydrophilic fibers of 0.5 deniers or finer as a separator.

12. The sealed alkaline storage battery of claim 11, characterized in that the hydrophilic fibers constituting the nonwoven fabric employed as a separator are split fibers comprising a copolymer of an olefin and vinyl alcohol or polyolefin fibers into which sulfo groups have been incorporated, and the nonwoven fabric has a basis weight of 35-70 g/m$^2$.

13. The sealed alkaline storage battery of claim 1 or 2, characterized in that a negative electrode contains a catalyst which accelerates a reaction by which oxygen gas and/or hydrogen gas is absorbed.

14. The sealed alkaline storage battery of claim 13, characterized in that the catalyst is Raney cobalt or Raney nickel.

15. A process for producing the sealed alkaline storage battery of claim 1 or 2, characterized in that the active material of the negative electrode is a hydrogen-storing-alloy powder and either the hydrogen-storing-alloy powder or a negative electrode obtained by filling the hydrogen-storing-alloy powder on a porous substrate is brought into contact with an acid or alkaline, aqueous solution before being incorporated into the battery to thereby activate the powder.

16. The sealed alkaline storage battery of claim 1 or 2, characterized in that a negative-electrode active material is a hydrogen-storing-alloy powder and the negative electrode contains, outside the structure of the hydrogen-storing-alloy powder, at least one rare-earth element selected from Ho, Er, Tm, Yb, Lu, Y, and Ce.

17. The sealed alkaline storage battery of claim 1 or 2, characterized in that it is a sealed alkaline storage battery in which the ratio between the capacity of the negative electrode and the capacity of the positive electrode (capacity of negative electrode/capacity of positive electrode) exceeds 1.45, and that the specified value of the gas pressure in the battery has been set at a value in the range of 0.5-1.5 megapascals (MPa) and/or the specified value of the battery temperature has been set at a value in the range of 50-80° C.

18. A method of charging the sealed alkaline storage battery of claim 1 or 2, characterized in that when the internal pressure of the battery being charged and/or the battery temperature exceeds a specified value, the charging is stopped, and that when the internal pressure of the battery and/or the battery temperature is not higher than the specified value, charging is conducted.

19. A method of charging a sealed alkaline storage battery, characterized in that it is a method of charging the alkaline storage battery of claim 17 and that charging is conducted at a constant voltage and the charging voltage is 1.5-1.7 V.

20. A charger for a sealed alkaline storage battery, characterized by having the function of sensing the surface temperature of the storage battery and the function of stopping charging when the surface temperature of the storage battery is higher than a specified value and of conducting charging when the surface temperature of the storage battery is lower than the specified value.

21. The charger for a sealed alkaline storage battery of claim 20, characterized in that the specified value of the surface temperature of the sealed alkaline storage battery has been set at a value in the range of 50-80° C.

22. An electrode structure characterized by comprising: an electrode obtained by impregnating with an active material; a porous electrode substrate which has a rectangular shape with a longer-direction width of a and a shorter-direction width of a and is capable of being spirally wound, with one of the shorter sides facing toward the center; and a single lug bonded to the electrode substrate, the lug having been bonded to the electrode substrate in such a position that the distance b between that one shorter side of the electrode substrate and the center line of the lug satisfies $0.3a \leq b \leq 0.6a$.

23. The electrode structure of claim 22, characterized in that the lug has a shorter-direction width and a longer-direction width, which are widths as measured respectively along the longer direction and shorter direction for the electrode substrate, of c and γ, respectively, and that region of the lug which overlaps the electrode substrate has a length of β, the a, c, α, β, and γ satisfying the following.

$$0.02 \leq c/a \leq 0.07$$

$$0.065 \leq \beta/\alpha \leq 0.45$$

$$0.1 \leq \beta/\gamma \leq 0.75$$

24. The electrode structure of claim 22, characterized in that the region in which the lug overlaps the electrode substrate has a shape similar to the outer shape of the electrode substrate.

25. The electrode structure of any one of claims 22 to 24, characterized in that the lug has been bonded to the electrode substrate by welding.

26. The electrode structure of claim 25, characterized in that the welding is spot welding conducted on spots radially arranged around the point of intersection of the center line of the lug and that longer side of the electrode substrate to which the lug is bonded.

27. A storage battery characterized by having the electrode structure of any one of claims 22 to 26 as a positive electrode.

28. The storage battery of claim 27, wherein an electric circuit connecting one of the electrodes to the same-polaritical terminal has a switching function by which the electric circuit is changed from on to off when the internal pressure of the battery has increased beyond a specified value and is changed from off to on when the internal pressure of the battery has decreased, and the space in the battery has been gastightly sealed.

Specifically, the storage battery is a sealed alkaline storage battery which has the function of being capable of charge when the gas pressure in the battery and/or the battery temperature is not higher than a specified value and of being incapable of charge when the gas pressure in the battery and/or the battery temperature exceeds the specified value. In the case where the sealed alkaline storage battery is one in which the discharge capacity ratio between the negative electrode and the positive electrode (discharge capacity of the negative electrode/discharge capacity of the positive electrode) is 1.45 or lower, the specified value of the gas pressure in the battery has been set at a value in the range of 0.5-1.0 MPa. In the case where the sealed alkaline storage battery is one in which the discharge capacity ratio between the negative electrode and the positive electrode is 1.5 or higher, the specified value of the gas pressure in the battery has been set at a value in the range of 1-3 MPa or the specified value of the battery temperature has been set at a value in the range of 50-80° C.

Due to the constitution described above, the alkaline storage battery according to the invention can be inhibited from increasing in the gas pressure in the battery or increasing in battery temperature even when charged at such a high rate that charging is completed in 15 minutes to 30 minutes. The battery attains a high charging efficiency even when charged at such high rates.

Furthermore, the sealed alkaline storage battery according to the invention is a sealed alkaline storage battery which has the function of being capable of charge when the gas pressure in the battery and/or the battery temperature is not higher than a specified value and of being incapable of charge when the gas pressure in the battery and/or the battery temperature exceeds the specified value, so as to attain a high capacity, and in which the proportion between the discharge capacity of the negative electrode and the discharge capacity of the positive electrode is 1.02-1.45.

One of the processes according to the invention for producing the alkaline storage battery is a production process in which a powdery material comprising nickel hydroxide as the main component is oxidized by a chemical reaction or oxidized in an electrochemical manner to thereby regulate the average oxidation number of the transition metal elements contained in the powdery material to 2.04-2.4 and is then used as an active-material powder for a nickel electrode.

Due to this process, the alkaline storage battery according to the invention can be a sealed alkaline storage battery in which the ratio between the capacity of the negative electrode to be incorporated in the battery and the capacity of the positive electrode to be likewise incorporated is set at a lower value than in the alkaline storage batteries heretofore in use and the oxidation number of the positive-electrode active material has been regulated beforehand so as to be higher than 2, whereby the formation of a discharge reserve is inhibited. Because of this, the sealed alkaline storage battery is inhibited from undergoing oxygen generation during charge and has a heightened charging efficiency in high-rate charging.

In the sealed alkaline storage battery according to the invention, the positive electrode may contain a compound containing at least one element selected from at least one rare-earth element selected from Ho, Er, Tm, Yb, Lu, and Y and from Ca.

The sealed alkaline storage battery may be one in which the content of the rare-earth elements in the positive electrode has been regulated to 0.5-4% by weight in terms of element amount.

The alkaline storage battery according to the invention may be a sealed alkaline storage battery which employs as a liquid electrolyte an aqueous alkali solution which contains potassium hydroxide as a major electrolyte and has a concentration of $7.5 \pm 1.5$ mol/dm$^3$, the liquid electrolyte being contained in an amount of 0.6-1.4 cm$^3$ per unit capacity (Ah) of the alkaline storage battery. Furthermore, the alkaline storage battery according to the invention may be a sealed alkaline storage battery employing as a separator a nonwoven fabric which comprises hydrophilic fibers having a fiber diameter of 0.5 deniers or finer as a major constituent material and which has a basis weight of 35-70 g/m$^2$ and preferably has a thickness of 70-120 μm.

Due to this constitution, the alkaline storage battery according to the invention can be inhibited from undergoing oxygen generation at the positive electrode and hydrogen generation at the negative electrode during charge and can have a heightened charging efficiency in high-rate charging.

Moreover, the sealed alkaline storage battery according to the invention may be a sealed alkaline storage battery in which the negative electrode contains a catalyst which accelerates a reaction by which oxygen gas and/or hydrogen gas is absorbed. Usable examples of the catalyst are metallic materials such as Raney nickel and Raney cobalt.

The other process according to the invention for producing a sealed alkaline storage battery is a process for producing a sealed alkaline storage battery including a negative electrode to which a powder of a hydrogen-storing alloy has been applied. In this process, the hydrogen-storing alloy is immersed in an alkaline aqueous solution or acid aqueous solution before being incorporated into the battery to thereby heighten the activity thereof.

Due to this process, a sealed alkaline storage battery can be obtained which has the enhanced ability to absorb the oxygen gas and hydrogen gas generating during charge and which is inhibited from increasing in internal pressure in high-rate charging.

The sealed alkaline storage battery according to the invention may be a sealed alkaline storage battery in which the negative-electrode active material is a hydrogen-storing-alloy powder and the negative electrode contains at least one rare-earth element selected from Ho, Er, Tm, Yb, Lu, Y, and Ce.

Due to this constitution, the corrosion resistance of the hydrogen-storing alloy in the alkaline liquid electrolyte can be enhanced and the sealed alkaline storage battery can have excellent cycle performance even in repetitions of high-rate charging.

The method according to the invention for charging the sealed alkaline storage battery is a charging method in which when the internal pressure and/or temperature of the battery being charged is not higher than a specified value, the charging is conducted, and when the internal pressure and/or temperature of the battery exceeds the specified value, the charging is stopped.

Charging modes for the sealed alkaline storage battery according to the invention are not particularly limited, and use can be made of constant-voltage charge, constant-current charge, constant-power charge, and a combination of these.

However, a mode in which the charging current decreases with the progress of charge and becomes low in a final stage of charge has an advantage that the change in battery temperature which accompanies on/off switching of charge can be small. From this standpoint, constant-voltage charge is preferred.

The charging method may be the method of charging at a constant voltage in which the charging voltage is set at a value of the range of 1.5-1.7 V.

According to the method of the invention for charging an alkaline storage battery, charging can be completed in a time period as short as 15-30 minutes and the gas pressure in the battery and the battery temperature can be inhibited from increasing.

The invention further provides an electrode structure characterized by comprising: an electrode substrate obtained by impregnating with an active material a porous substrate which has a rectangular shape with a longer-direction width of a and a shorter-direction width of a and is capable of being spirally wound, with one of the shorter sides facing toward the center; and a single lug bonded to the electrode substrate, the lug having been bonded to the electrode substrate in such a position that the distance b between that one shorter side of the electrode substrate and the center line of the lug satisfies $0.3a \leq b \leq 0.6a$.

Although the mechanism of the improvement of suitability for rapid charging in 15-30 minutes will be described below, the explanation includes conjectures. However, this should not be construed as limiting the invention in any way.

In the case where the value of b is much smaller than a as in electrode structures heretofore in use, the active material present in those parts of the electrode which are remote from the lug does not participate in the reactions and, hence, the charging efficiency is low.

The following is further thought. The charging current is concentrated in parts close to the lug and these parts have an increased current density. Because of this, the charging of the active material proceeds too slowly and side reactions such as the decomposition reaction of the liquid electrolyte occur, resulting in a decrease in charging efficiency.

In addition, it is thought that the temperature of the parts in which current is concentrated has been increased locally. There is hence a high possibility that this temperature increase might exert an adverse influence on battery performances other than suitability for rapid charging, such as battery cycle performance.

It is thought that in contrast to such electrode structures, the electrode structure of the invention attains an improved charging efficiency because the distance b indicating the lug bonding position has been regulated so as to satisfy $0.3a \leq b \leq 0.6a$ and this not only enables the active material present in electrode parts remote from the lug to participate in reactions but also prevents the charging current from concentrating in electrode parts close to the lug to thereby inhibit side reactions.

Furthermore, also in the battery having a pressure switch function described above, side reactions occur for the same reasons when the battery is a storage battery employing the electrode structure heretofore in use. The following is thought. The side reactions accelerate the increase in the internal pressure of the battery and the pressure switch works during charge. The proportion of the periods when the battery is in a charge-off state in a certain charging time is hence large, resulting in difficulties in obtaining a high charging efficiency.

The invention produces especially marked effects when the electrode structure improved in lug bonding position is combined with a pressure switch function.

In one embodiment of the invention, the lug has a shorter-direction width and a longer-direction width, which are widths as measured respectively along the longer direction and shorter direction for the electrode substrate, of c and γ, respectively, and that region of the lug which overlaps the electrode substrate has a length of β, the a, c, α, β, and γ satisfying the following.

$$0.02 \leq c/a \leq 0.07$$

$$0.065 \leq \beta/\alpha \leq 0.45$$

$$0.1 \leq \beta/\gamma \leq 0.75$$

In another embodiment, the region in which the lug overlaps the electrode substrate has a shape similar to the outer shape of the electrode substrate.

Preferably, the lug is bonded to the electrode substrate by welding.

More preferably, the welding is spot welding conducted on spots radially arranged around the point of intersection of the center line of the lug and that longer side of the electrode substrate to which the lug is bonded.

The invention furthermore provides a storage battery having the electrode structure of any of the constitutions described above.

DESCRIPTION OF THE REFERENCE NUMERALS

14: positive-electrode lead plate, 15: metallic cover, 17: metallic rigid plate, 18: metallic thin plate, 20: spring

BEST MODE FOR CARRYING OUT THE INVENTION (Charging-Stopping Mechanism)

Figure 1:
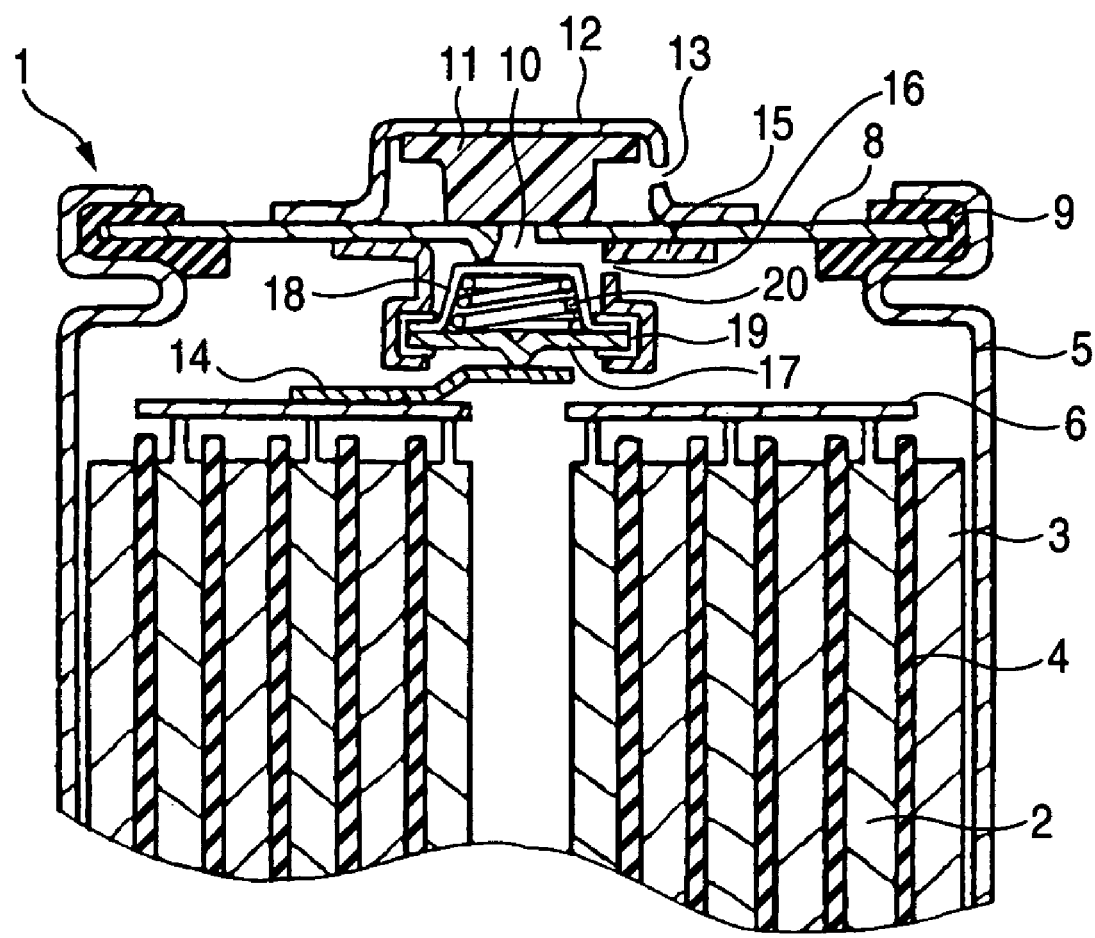
FIG. 1 is a sectional view illustrating an important inner part of an alkaline storage battery according to one embodiment of the invention.

FIG. 1 is a sectional view diagrammatically illustrating a section of an important part of a sealed alkaline storage battery 1 according to one embodiment of the invention.

In FIG. 1, a wound element obtained by superposing and winding a strip-form positive electrode plate 2 and a strip-form negative electrode plate 3 together with strip-form separators 4 interposed therebetween so that the outermost lap is the negative electrode plate 3 is packed in a cylindrical metallic battery case 5.

Edge parts of the substrate of the positive electrode plate protrude on the upper side of the wound element, and a positive-electrode current collector 6 in a nearly disk form has been bonded to the upper edge parts of the substrate. The negative electrode plate located as the outermost lap of the wound element is brought into contact with the inner surface of the side wall of the battery case 5 (although the figure shows a gap between the negative electrode plate and the inner surface of the battery case, these two are actually in contact with each other) to thereby electrically connect the negative electrode plate to the battery case 5. A liquid electrolyte comprising an aqueous solution of an electrolyte comprising KOH as the main component is introduced. Thereafter, a metallic lid 8 is fitted to the upper opening end of the battery case 5 through a gasket 9 made of a synthetic resin such as, e.g., nylon to thereby gastightly seal the battery case 5. An electrolyte comprising KOH as the main component and further containing LiOH or NaOH is also applicable.

The lid 8 has a through-hole 10 formed in a central part thereof, and a safety vent 11 made of rubber inserted between the lid 8 and a cap 12 is pressed against the through-hole 10 to gastightly seal the through-hole 10. When a gas accumulates in a space in the battery and the gas pressure in the battery rises, the safety vent is deformed by the internal pressure to break the gastightly sealed state. The gas in the battery is hence discharged outside through the through-hole 10 and a through-hole 13 formed in the cap.

The metallic lid 8 is equipped with a pressure switch inside.

The pressure switch comprises: a metallic cover 15; a metallic rigid plate 17; a metallic thin plate 18; a gasket 19 which serves to gastightly seal the space surrounded by the metallic rigid plate 17 and the metallic thin plate 18 and to insulate the metallic rigid plate 17 and metallic thin plate 18 from the cover 15; and a spring 20 enclosed in the space surrounded by the metallic rigid plate 17 and the metallic thin plate 18. A peripheral part of the cover 15 has been bonded to the inner surface of the lid 8 and a through-hole 20 has been formed.

In an ordinary state (the state in which the gas pressure in the battery remains low), the metallic thin plate 18 is in contact with the lid 8 in the state of being electrically connected therewith. When the gas pressure in the battery has increased, the gas pushes down the metallic thin plate 18 while opposing the elasticity of the spring 20. Namely, the metallic thin plate 18 separates from the lid 8 when the gas pressure in the battery exceeds a specified value. The electrical connection is hence eliminated. When the gas pressure in the battery has decreased, the metallic thin plate 18 is pushed up due to the elasticity of the spring and the metallic thin plate 18 comes into contact with the lid 8 again, whereby the electrical connection between these is recovered. By imparting such a mechanism, a function is imparted in which when the gas pressure in the battery has increased during charge, the charging is made off and when the gas pressure in the battery has decreased, charging is made on (hereinafter referred to as pressure switch function).

Figure 8:
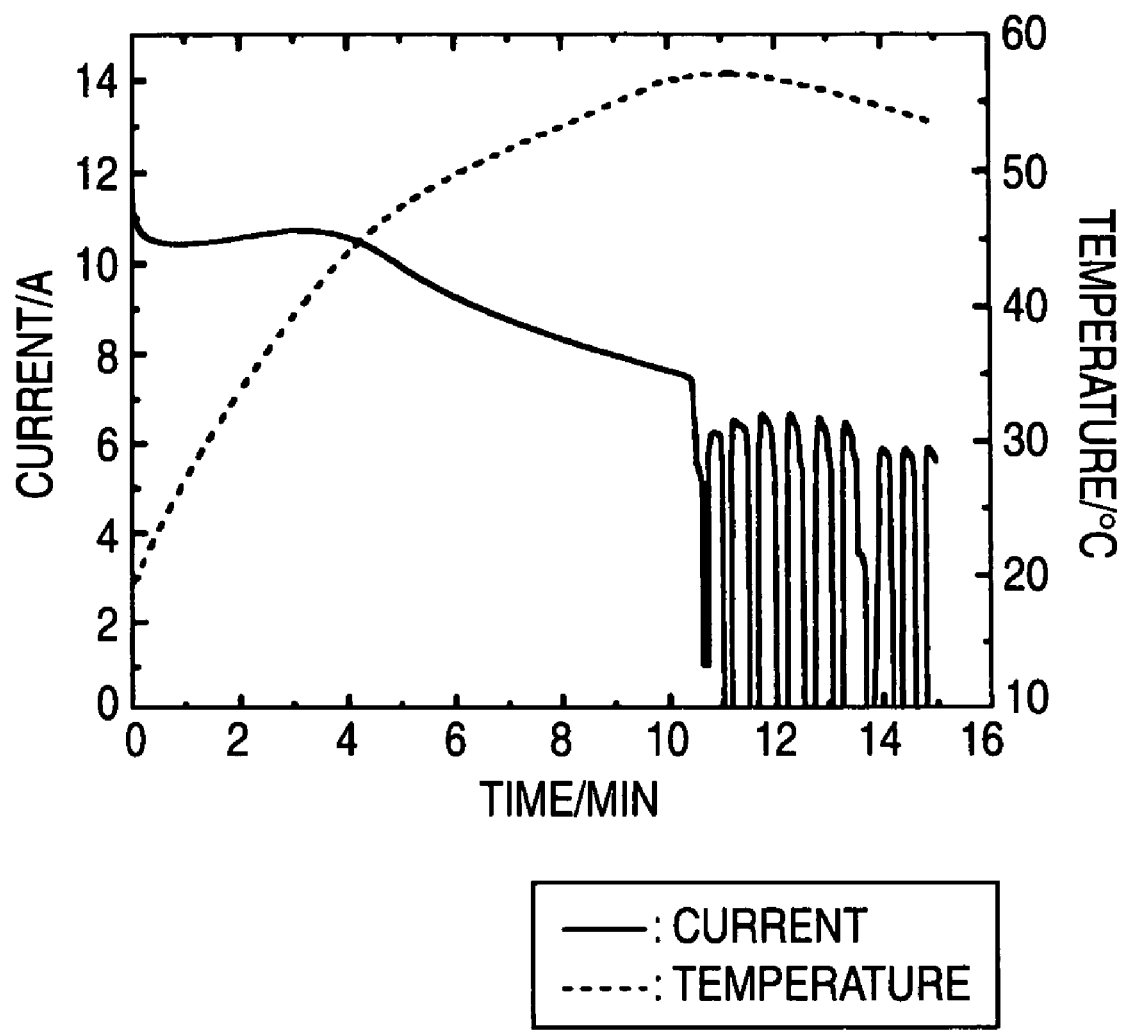
FIG. 8 is a presentation diagrammatically illustrating charging current and battery temperature behaviors of a sealed alkaline storage battery according to the invention when the charge on/off switch function worked.
Figure 9:
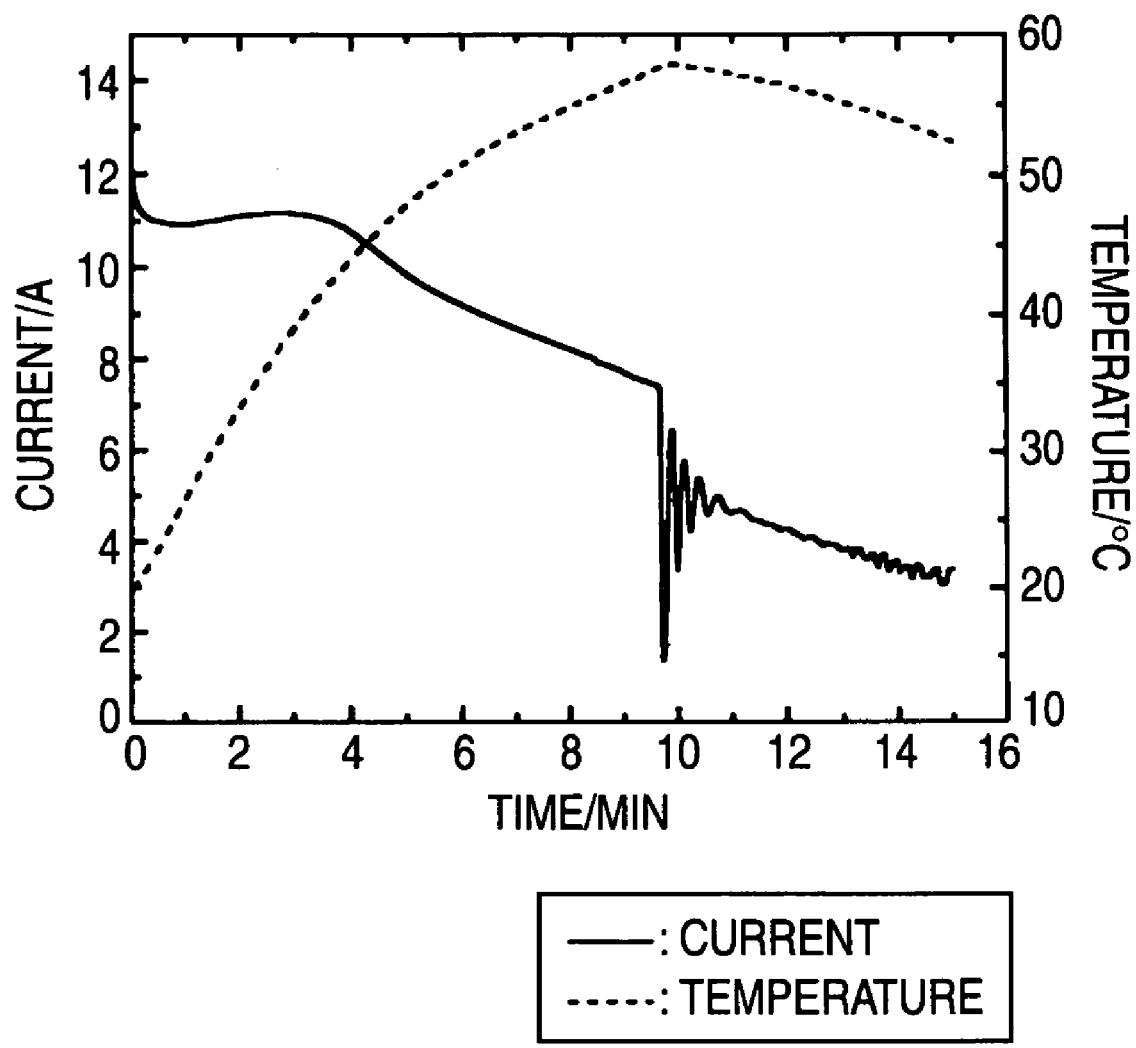
FIG. 9 is a presentation diagrammatically illustrating charging current and battery temperature behaviors of a sealed alkaline storage battery according to the invention when the charge on/off switch function worked.

FIG. 8 and FIG. 9 are presentations diagrammatically showing the charging current and battery temperature behaviors during charge of sealed storage batteries according to the invention when the charge on/off switch function worked. To make charging off herein preferably is an operation in which the charging is completely stopped (charging current is 0 A) in the charge-off period as shown in FIG. 8. However, even in the charge-off period, a charging current which has not decreased to 0 A may be kept flowing in a such a degree that the internal pressure or temperature of the battery does not increase beyond a specified value, as shown in FIG. 9.

Depending on the structure of the switch, there are cases where even in the off period, the contact point of the switch which controls circuit on/off does not completely separate and is in the state of being in contact while having high contact resistance.

In this case, the charging current does not become 0 A even in the off period and a low current is kept flowing.

The example shown in FIG. 1 is equipped with a temperature switch besides the pressure switch.

Numeral 14 in the figure denotes a bimetal lead plate bonded to the positive-electrode current collector 6. In an ordinary state (the state in which the battery temperature remains low), the lead plate 14 is in contact with the metallic rigid plate 17 and electrical connection is maintained between these. When the temperature rises, the lead plate 14 deforms downward on the figure. When the temperature has risen beyond a specified value, the lead plate 14 separates from the metallic rigid plate 17 and the electrical connection between these is eliminated. When the temperature lowers, the lead plate 14 recovers its original shape and, hence, the electrical connection between the two is recovered.

By imparting such a mechanism, a function is imparted in which when the battery temperature has risen during charge, the charging is made off and when the battery temperature has lowered, charging is made on (hereinafter referred to as temperature switch function).

The position in which the bimetal lead plate is disposed is not particularly limited as long as the lead plate is disposed so as to be incorporated in the circuit. However, since the temperature of the current collector, which is directly bonded to the electrode plate, most precisely reflects the internal temperature of the battery, it is preferred to bond the lead plate to the current collector as in the embodiment shown in FIG. 1.

In the battery of the invention which has the temperature switch function, charging is stopped when the battery temperature has reached a specified value for charge stopping. However, to keep the charging current low and thereby prevent the battery temperature from rising during charge is an effective method besides completely making the circuit off as described above. This method is within the scope of the charge stopping in the invention.

Specifically, in the embodiment shown in FIG. 1, Polyswitch (PTC element) is incorporated, in place of the bimetal lead plate, into the circuit extending from the current collector 6 to the lid 8. This element is an element whose electrical resistance increases abruptly when the temperature thereof exceeds a given value. In the invention, it is preferred that the electrical resistance of the element should increase abruptly at a temperature of 50-80° C. and the electrical resistance value after the increase be on the order of kilohms (k$\Omega$) or higher.

The resistance increase of the electric circuit can make the charging substantially impossible.

In the first sealed alkaline battery according to the invention, the specified value for charge stopping which is based on internal gas pressure is not higher than the opening pressure for the safety vent 11 made of rubber and is set so that battery performance deterioration can be inhibited. Specifically, the specified value is preferably set at 1.0 MPa to 3.0 MPa, more preferably set at 1.5-2.5 MPa.

In case where the set pressure is lower than 1.0 MPa, there is a possibility that high-rate charging might result in a larger proportion of charge stopping periods, making it difficult to complete charging in a short time. In case where the set value exceeds 3.0 MPa, there is a possibility that oxygen gas might accumulate inside and corrode the hydrogen-storing alloy or cadmium as the active material of the negative electrode, leading to a decrease in the discharge capacity of the alkaline storage battery.

The specified value for charge stopping which is based on battery temperature is preferably 50-80° C., more preferably 60-80° C.

In case where the set value is lower than 50° C., charge reception in high-rate charging is reduced. On the other hand, set values exceeding 80° C. lead to alteration of the hydrogen-storing alloy, separators, and binders in the positive and negative electrodes and this may lead to deterioration of the discharge capacity or cycle life of the storage battery.

Strictly speaking, the term battery temperature as used in the invention means the temperature of inner parts of the battery. However, the temperature of a battery surface, in particular, the temperature of a side or bottom surface of the metallic case, can be used in place of the internal temperature. Since the side or bottom surface of the battery case is in contact with the element and the metallic case has high thermal conductivity, the temperature thereof well reflects the internal temperature of the battery.

As shown in FIG. 1, it is most preferred that the alkaline storage battery according to the invention has both a pressure switch function and a temperature switch function.

In case where one of the two functions develops a trouble, the battery having the two functions is satisfactorily used as long as the other function has no trouble.

In the invention, however, the battery need not always have both a pressure switch function and a temperature switch function. The battery may have either of the two functions.

It should however be noted that a temperature switch function has the following drawback. In case where local heating has occurred in a specific part in the battery, it is difficult for the function to sharply sense the heating. Especially when the battery is large, there is a possibility that the temperature in the battery might differ from part to part and it is difficult to sharply sense the state of heating.

In contrast, in the case of a pressure switch function, it can sharply sense the state of gas generation because gas generation during charge immediately results in an increase in the gas pressure in the battery.

Consequently, in the case where one of a pressure switch function and a temperature switch function is to be imparted, it is preferred to dispose a pressure switch function.

When it is attempted to incorporate both a pressure switch function and a temperature switch function, not only the battery should have a complicated structure but also a space for disposing the two functions therein should be secured in the battery.

As stated above, the temperature of a battery surface may be used as the battery temperature in the invention.

Consequently, a temperature switch function can be imparted not to the battery but to a charger, and this is rather preferred. A temperature sensor is attached to that part of the charger which comes into contact with a surface, preferably a side or bottom surface, of the battery to be charged, and the function of changing between charging on and charging off according to the detected battery temperature is imparted to the charger, whereby the battery temperature is prevented from exceeding a specified value during charge.

(Constitution and Process for Production of Positive-Electrode Active-Material Powder)

The positive-electrode material powder to be applied to the positive electrode of the alkaline storage battery according to the invention desirably comprises nickel hydroxide, which is an active material, as the main component and contains a small amount of at least one element selected from zinc (Zn), cobalt (Co), magnesium (Mg), copper (Cu), and barium (Ba) in a solid solution state. The zinc (Zn), magnesium (Mg), copper (Cu), or barium (Ba) in the form of a solid solution in nickel hydroxide has the effect of inhibiting γ-NiOOH, which is inert as an active material, from generating when the battery is subjected to charge/discharge.

Furthermore, the solid solution of cobalt has the effect of shifting the charging potential of the nickel electrode to the less noble side and thereby inhibiting oxygen from generating at the nickel electrode during charge.

To add zinc and cobalt to nickel hydroxide so as to form a solid solution in the nickel hydroxide is especially effective. In typical embodiments of the invention, a solid solution (powdery material) of 1-7% by weight zinc and 1-5% by weight cobalt, in terms of element amount, in nickel hydroxide is applied.

The positive-electrode active-material powder to be applied to the invention preferably is one obtained by forming a coating layer comprising a cobalt-containing compound, e.g., cobalt hydroxide, on the surface of the nickel hydroxide containing a small amount of zinc, cobalt, etc. in a solid solution state.

The proportion of the surface coating layer comprising a cobalt compound in the whole positive-electrode active-material powder is preferably regulated to 1-7% by weight in terms of elementary cobalt.

The positive-electrode active-material powder to be applied to the invention preferably is a high-density powder which has been synthesized by the amine complex method, a known method for synthesizing positive-electrode active-material powders, and has a nearly spherical shape and a tap density of 2.0 or higher.

Thus, a positive electrode can be obtained in which the density of the positive-electrode active material used for impregnation is high and which has a high coefficient of active-material use and a high charging efficiency in high-rate charging.

The nickel hydroxide-based active-material powder to be applied to the first sealed alkaline storage battery according to the invention preferably is one in which the average oxidation number of the transition metal elements (Ni and Co) contained therein is preferably 2.04-2.40, more preferably 2.07-2.30.

Specific methods for increasing the average oxidation number of the transition metal elements contained in the active-material powder to 2.04-2.40 are not particularly limited. For example, to chemically oxidize the active-material powder with an oxidizing agent in the presence of an aqueous alkali solution is a simple method suitable for mass production. This is a preferred production process.

For example, the active-material powder is oxidized at a temperature of 90° C. with an oxidizing agent such as, e.g., NaClO or $K_2S_2O_8$ in an aqueous NaOH solution having a concentration of 10% by weight.

In this treatment, the average oxidation number of the transition metals contained in the active material can be easily controlled by regulating the proportion of the active-material powder to the oxidizing agent.

Another method comprises impregnating a porous substrate such as foamed nickel with a powdery material comprising nickel hydroxide as the main component and then electrochemically oxidizing the powdery material with an aqueous solution of potassium hydroxide, sodium hydroxide, or the like as a liquid electrolyte to thereby produce the positive-electrode active-material powder.

In this method, the average oxidation number of the transition metal elements contained in the active material can be controlled by regulating the quantity of electricity applied.

In the case of electrochemical oxidation, it is preferred that the positive electrode be used as the only electrode and charged or charging be conducted in the following manner. The positive electrode and a negative electrode are incorporated into a battery and the positive electrode is then charged in an open state. After the charging, the battery is subjected to continuous suction for about 1 hour so that the pressure of the atmosphere is kept at 0.01 MPa or lower to thereby remove the hydrogen occluded in the negative electrode as a result of the charging. Through the oxidation treatment, part of the nickel hydroxide becomes nickel oxyhydroxide consisting mainly of the β-form. The positive-electrode active-material powder obtained contains a higher-order cobalt compound containing alkali cations and having disordered crystallinity; this cobalt compound has been formed by the oxidation treatment from the coating layer comprising a cobalt compound and disposed on the surface of the powder comprising nickel hydroxide as the main component. This can reduce the amount of a discharge reserve to be formed.

To heighten the average oxidation number of the nickel hydroxide-based active-material powder to 2.04-2.40 as described above means to oxidize the cobalt in the surface coating layer as a component of the active-material powder to a higher-order cobalt compound in which the oxidation number of the cobalt is higher than 2 and, besides this, to oxidize part of the nickel and cobalt having an oxidation number of 2 contained in the core layer to higher-order compounds in which the oxidation number is higher than 2.

The oxidation not only forms a layer of a higher-order cobalt compound having satisfactory conductivity on the surface of the active material to thereby heighten the coefficient of active-material use, but also can inhibit the formation of a discharge reserve. As a result, a large amount of a charge reserve can be secured. Consequently, hydrogen generation at the negative electrode during charge can be inhibited and the gas pressure in the battery can be inhibited from increasing.

The oxidizing agent to be used for the oxidation treatment is not particularly limited, and use can be made of a chloric acid salt, hypochlorous acid salt, chlorous acid salt, peroxo acid salt, oxygen, or the like.

(Constitution of Positive Electrode)

The nickel electrode for the first sealed alkaline storage battery according to the invention preferably contains a compound (a hydroxide or hydrate thereof or an oxide) containing at least one element selected from rare-earth elements of Ho, Er, Tm, Yb, Lu, and Y and from Ca.

The total content of the rare-earth elements and Ca is preferably 0.1-5% by weight, more preferably 0.5-4% by weight, in terms of the amount of the rare-earth elements and calcium. In case where the content of the rare-earth elements and calcium is lower than 0.1% by weight, the effect of inhibiting oxygen generation at the positive electrode is insufficient.

Even when that content is increased beyond 5% by weight, not only the effect of inhibiting oxygen generation does not improve as compared with the case where the content is 5% by weight, but also there is a possibility that the positive electrode might have an increased impedance, leading to a decrease in capacity.

The nickel electrode for the sealed battery according to the invention can be produced by filling on a porous substrate, e.g., foamed nickel, a positive-electrode material powder prepared by mixing the active-material powder having an average particle size of 5-20 μm with a powder of a hydroxide of the rare-earth element or a hydrate thereof or an oxide of the element, the latter powder having almost the same size as or a smaller size than the former powder.

Besides a three-dimensional spongy one such as foamed nickel, a two-dimensional porous object such as a perforated plate or a three-dimensional one obtained by forming projections or irregularities on the surfaces of the two-dimensional porous object can be used as the porous substrate.

(Constitution of Negative-Electrode Active-Material Powder)

The negative electrode for the alkaline storage battery according to the invention is one obtained by filling an active material which is a hydrogen-storing alloy powder or a cadmium oxide or cadmium hydroxide powder on a perforated plate formed from a metallic sheet material such as, e.g., nickel or a nickel-plated steel sheet.

The hydrogen-storing alloy powder or the cadmium oxide or cadmium hydroxide powder preferably has an average particle diameter of 15-55 μm. In case where the average particle diameter of the powder is smaller than 15 μm, the powder is apt to be corroded and the corrosion may lead to a performance decrease.

On the other hand, in case where the average particle diameter thereof exceeds 55 μm, there is a possibility that the gas absorbing ability might become poor, leading to an increase in gas pressure in the battery.

The hydrogen-storing alloy to be applied to the negative electrode of the alkaline storage battery according to the invention preferably comprises one or more members selected from the group consisting of $AB_5$ type alloys having the $CaCu_5$ type structure, $AB_2$ type alloys having the Laves phase structure ($MgCu_2$ type or $MgZn_2$ type), AB type alloys having the CsCl type structure, and $A_2B$ type alloys having the $Mg_2Ni$ type structure.

(Constitution of Negative Electrode)

The negative electrode of the first sealed alkaline storage battery according to the invention preferably contains a catalyst which promotes a reaction for absorbing hydrogen or oxygen. The material of the catalyst is not particularly limited, and a noble-metal element such as platinum or palladium may be used.

However, an inexpensive material such as Raney nickel or Raney cobalt is more preferred. Specifically, a powder having an average particle diameter of 1-10 μm is preferred which has been produced by subjecting an alloy comprising 60-40% by weight nickel and 40-60% by weight aluminum or an alloy comprising 60-40% by weight cobalt and 40-60% by weight aluminum to a developing treatment with an aqueous alkali solution by a known method.

Thus, the absorption of the hydrogen gas and oxygen gas generating at the negative electrode and positive electrode, respectively, during charge can be accelerated and the gas pressure in the battery can be inhibited from increasing.

The hydrogen-storing alloy powder to be applied to the hydrogen-storing alloy electrode of the first sealed alkaline storage battery according to the invention may be immersed in an aqueous solution of an alkali, e.g., KOH, or a solution of an inorganic acid, e.g., hydrochloric acid, or organic acid, e.g., acetic acid, (processing liquid), whereby the coating film which has been formed on the surface of the powder and comprises an oxide, hydroxide, or another compound of a metal contained as a component in the hydrogen-storing alloy is dissolved away to enhance the activity of the hydrogen-storing alloy powder.

Furthermore, a complexing agent such as, e.g., ethylenediamine tetraacetate (EDTA) or tartaric acid may be added in a small amount to the processing liquid. This is more preferred because it has the effect of enhancing the stability of the transition metal element which has dissolved away during the immersion treatment in the processing liquid and preventing the transition metal element which has dissolved away from re-depositing as a hydroxide on the surface of the hydrogen-storing alloy powder.

The hydrogen-storing alloy electrode of the first sealed alkaline storage battery according to the invention preferably contains at least one rare-earth element selected from Ho, Er, Tm, Yb, Lu, Y, and Ce.

Although these rare-earth elements may be present as an alloy within the structure of the hydrogen-storing alloy, it is more preferred that these elements be present outside the structure of the hydrogen-storing alloy as the elemental metals or as hydroxides or oxides. These rare-earth elements serve to enhance the corrosion resistance of the hydrogen-storing alloy in an alkaline liquid electrolyte and thereby prevent the hydrogen-storing alloy from corroding during charge due to the presence of oxygen generating at the positive electrode or to an increased battery temperature.

The term "outside the structure of the hydrogen-storing alloy" herein means that the elements are present not in inner parts of the hydrogen-storing alloy powder but outside the hydrogen-storing alloy powder.

In the case where the hydrogen-storing alloy powder has cracks in the surface thereof or is one in which primary particles have aggregated to form secondary particles, the surface cracks and the spaces among primary particles are regarded as outside the structure of the hydrogen-storing alloy powder.

(Constitution of Separators)

In the case where charging is conducted at a high rate, use of separators having low liquid retention and low conductivity is disadvantageous because there is a possibility that the electrodes might have enhanced polarization to increase the charging voltage and enhance gas generation.

As the separators according to the invention can be used, for example, a nonwoven fabric obtained by hydrophilizing a nonwoven fabric made of polyethylene, polypropylene, or polyethylene/polypropylene by reacting it with sulfur trioxide in a gas phase to incorporate sulfo groups onto the fiber surface (sulfonation treatment) or by graft-polymerizing hydrophilic groups such as acrylic acid with the fibers.

Especially preferred is a nonwoven fabric constituted of fine fibers having a fiber diameter of 0.5 deniers or smaller. This is because separators comprising this nonwoven fabric have fine pores, an even pore size, and satisfactory liquid retention. The value in denier indicates the proportion of the weight of the fiber having a length of 450 m to 0.5 g.

Of such nonwoven fabrics, a nonwoven fabric constituted of fine fibers obtained by splitting split fibers produced by multi-component fiber spinning from a first ingredient comprising a polyolefin, e.g., polypropylene, and a second ingredient comprising an ethylene/vinyl alcohol copolymer into the components is suitable for use as a major constituent material for separators because it has the property of retaining excellent hydrophilicity over long.

In the case of the sealed alkaline storage battery, the oxygen which has generated at the positive electrode during charge is absorbed in the negative electrode.

Since the oxygen which has generated at the positive electrode reaches the negative electrode through the separators, use of separators having poor gas permeability inhibits gas absorption.

From the standpoint of securing the liquid retention and gas permeability, the basis weight of the separators in the invention is preferably 35-70 g/m², more preferably 40-60 g/m².

In case where the basis weight thereof exceeds 70 g/m², gas permeability is insufficient and there is a possibility that the function of causing an electrode to absorb the gas generating during charge might be impaired.

In case where the basis weight thereof is less than 35 g/m², there is a higher possibility that the evenness of distribution of the fibers constituting the nonwoven fabric might be lost and this may result in impaired liquid retention or the occurrence of internal short-circuiting after battery assembly.

The thickness of each separator is preferably 50-120 µm, more preferably 80-110 µm.

The thickness of a separator herein means the value obtained through a measurement made in accordance with method A (for general nonwoven fabrics) among the thickness test methods as provided for in Japanese Industrial Standard (JIS) L1913 (testing methods for general fibers/nonwoven fabrics).

(Constitution of Element)

The element of the nickel/metal-hydride storage battery according to the invention is one comprising the positive electrode (nickel electrode) and the negative electrode (hydrogen-storing alloy electrode or cadmium electrode) which have been stacked together with a separator interposed therebetween.

In the first sealed alkaline storage battery according to the invention, the capacity ratio between the negative electrode and positive electrode constituting the element {N/P ratio} is regulated to preferably 1.02-1.45, more preferably 1.1-1.45.

That value is lower than the values of 1.5-1.8 for alkaline storage batteries heretofore in use. By thus regulating the N/P ratio, high-rate discharge characteristics can be prevented from decreasing. Furthermore, by combining the N/P ratio regulation with the pressure switch function or temperature switch function, an alkaline storage battery having a high charging efficiency in high-rate charging can be obtained.

In case where the N/P ratio is lower than 1.02, high-rate discharge characteristics and the charging efficiency in high-rate charging decrease. Conversely, N/P ratios exceeding 1.45 result in a battery having a reduced discharge capacity.

The terms "capacity of a negative electrode" and "capacity of a positive electrode" herein mean the discharge capacity determined when the positive electrode and the negative electrode each are subjected to a single-electrode test at a temperature of 20° C. A method of the single-electrode test in the case of the single-electrode test of a positive electrode, for example, is as follows. The positive electrode is stacked through a separator on a negative electrode having a large excess of capacity, and this assembly is tightly pressed. A test battery (open battery) containing an aqueous KOH solution having a density of 1.3 g/cm³ as a liquid electrolyte is prepared. A mercuric oxide electrode (Hg/HgO electrode), for example, is incorporated into the battery as a reference electrode for measuring the potential of the positive electrode. The battery is charged for 16 hours at a current of 0.1 ItA based on the impregnant capacity of the positive electrode. After a subsequent 1-hour pause, the battery is discharged at the same current as in the charging until the potential of the positive electrode reaches 0 mV versus the reference electrode. This charge/discharge operation is repeated until the discharge capacity of the positive electrode becomes constant. The value of discharge capacity as measured at the time when the capacity became constant was taken as the capacity of the positive electrode.

In the single-electrode test of a negative electrode, a test battery including the negative electrode combined through a separator with a positive electrode having a large excess of capacity (open battery; having the same constitution as in the single-electrode test of a positive electrode, except that the capacity of the positive electrode was in large excess based on the capacity of the negative electrode) is prepared. The battery is charged for 16 hours at a current of 0.1 ItA based on the impregnant capacity of the negative electrode. After a subsequent 1-hour pause, the battery is discharged at the same current as in the charging until the potential of the negative electrode reaches −600 mV versus the mercury oxide reference electrode (Hg/HgO electrode).

This charge/discharge operation is repeated until the discharge capacity of the negative electrode becomes constant. The value of discharge capacity as measured at the time when the capacity became constant was taken as the capacity of the negative electrode.

(Constitution of Alkaline Storage Battery)

The alkaline storage battery according to the invention is a sealed battery which includes, packed in a closed space, a power-generating element comprising an element obtained by superposing a positive electrode, separators, and a negative electrode and a liquid electrolyte.

The power-generating element is packed, for example, in a metallic battery case serving also as a negative-electrode terminal, and the upper opening end of the battery case is sealed with a metallic lid serving also as a positive-electrode terminal.

The battery case and the lid is electrically insulated from each other with a gasket interposed between these and made of a synthetic resin, and the gap between the battery case and the lid is gastightly sealed with the gasket. A positive-electrode current collector has been bonded to the positive electrode, and the lid and the positive-electrode current collector have been electrically connected to each other with a positive-electrode lead plate.

A negative-electrode current collector has been bonded to the negative electrode, and the negative-electrode current collector is bonded to the battery case.

(Method of Charging Alkaline Storage Battery)

In the method of the invention for charging the alkaline storage battery, when the gas pressure in the battery and/or the battery temperature has exceeded the specified value during charge, the charging is interrupted and when the gas pressure and/or the battery temperature has decreased to below the specified value, charging is conducted.

In the invention, the charging, charging interruption, and restarting of charging are repeatedly conducted. Although modes of charging according to the invention are not particularly limited, constant-voltage charging is preferred as stated above.

For completing charging in a period as short as 15-30 minutes by repeatedly conducting charging, charging interruption, and restarting of charging as in the invention, it is preferred to regulate the applied voltage to 1.5-1.7 V in constant-voltage charging.

In case where the applied voltage is lower than 1.5 V, charging cannot be completed in a short time. In case where the applied voltage exceeds 1.7 V, the battery temperature during charge rises and this may cause deterioration of battery performances.

In addition, there is a possibility that the charging efficiency might decrease.

The invention will be explained below in detail by reference to Examples.

(First Sealed Alkaline Storage Battery According to the Invention; N/P ratio, 1.45 or lower)

(Influence of Pressure Switch Operating Pressure and Temperature Switch Operating Temperature)

EXAMPLE 1

(Production of Positive-Electrode Active-Material Powder)

A positive-electrode active-material powder consisting mainly of nickel hydroxide was produced by a known method.

An aqueous solution containing nickel sulfate, zinc sulfate, and cobalt sulfate was gradually added to and mixed with a reaction bath which contained ammonium sulfate and sodium hydroxide and the pH and temperature of which were set at 11.8-12.2 and 43-47° C., respectively, while stirring the reaction bath.

During the addition, the pH and temperature of the reaction bath were regulated so as to be within those ranges. Thus, a nickel hydroxide powder containing zinc hydroxide and cobalt hydroxide in a solid solution state was yielded. The proportions of the zinc and cobalt contained in the powder were regulated to 3% by weight and 2% by weight, respectively, in terms of metal proportion.

Subsequently, the nickel hydroxide powder was immersed in an aqueous sodium hydroxide solution whose pH and temperature were set at the same values as those shown above. While stirring this solution, an aqueous cobalt sulfate solution and an aqueous sodium hydroxide solution were gradually added thereto. During this addition, the pH and temperature of the reaction bath were regulated so as to be within those ranges.

Thus, an active-material powder having an average particle diameter of 10 µm and a spherical shape was obtained which comprised the powder consisting mainly of nickel hydroxide and, formed on the surface of the powder, a coating layer comprising cobalt hydroxide.

A positive-electrode active-material powder was thus obtained. The proportion of the coating film in the nickel hydroxide-based active-material powder was regulated to 4% by mass.

(Oxidation Treatment of Positive-Electrode Active-Material Powder with Chemical Oxidation)

A hundred grams of the nickel hydroxide-based active-material powder was added to 400 cm³ of an aqueous NaOH solution which had a concentration of 10% by weight and was kept at a temperature of 50° C. While the solution was being stirred for dispersion, 45 cm³ of a solution of an oxidizing agent (NaClO; effective concentration, 10%) was added thereto.

Thereafter, the resultant mixture was continuously stirred for 1 hour. Subsequently, the powder was taken out by filtration, washed with water, and then dried in air at a temperature of 80° C.

(Heat Treatment of Positive-Electrode Active-Material Powder)

Twenty grams of an aqueous NaOH solution having a concentration of 30% by weight was added to the nickel hydroxide-based active-material powder which had undergone the oxidation treatment to thereby bring the powder into a wet state. Thereafter, this mixture was stirred with heating at a temperature of 120° C. in an argon atmosphere.

Subsequently, the powder was washed with water and then dried at a temperature of 80° C. for 1 hour to obtain a positive-electrode active-material powder. Ten grams of the active material obtained was introduced into a measuring cylinder having a capacity of 10 cm³, which was then allowed to fall naturally from a height of 10 cm on a table made of a hard rubber.

The falling operation was repeatedly conducted 100 times to measure the tap density. The tap density of the active-material powder obtained was 2.1.

(Determination of Average Oxidation Number of Transition Metal Elements in Positive-Electrode Active-Material Powder)

The average oxidation number of the positive-electrode active-material powder was determined by the ferrous sulfate method.

Specifically, about 0.1 g of the positive-electrode active material (sample) and about 1 g of ammonium ferrous sulfate were weighed out and added to an aqueous acetic acid solution which had a concentration of 20% by volume and the temperature of which was set at 5° C. The solution was stirred for about 5 hours to completely dissolve the sample and the ammonium ferrous sulfate. Thereafter, the resultant solution was titrated with an aqueous potassium permanganate solution having a concentration of 0.02 mol/dm³. The active-oxygen amount (mg) in the sample was determined using the following equation.

(Su-1)

$$\text{Active-oxygen amount (mg/100-mg sample)} = 8 \times \left( \frac{X\text{Fe}}{392.14} - \frac{0.1 \times f \times V}{1000} \right) \times \left( \frac{100}{X\text{sp}} \right) \quad (1)$$

In equation (1), Xsp is the weighed amount of the sample (g), XFe is the weighed amount of the ammonium ferrous sulfate (g), V is the amount of the aqueous potassium permanganate solution used for titration (cm³), f is the factor of the aqueous potassium permanganate solution, and 392.14 is the molecular weight of ammonium ferrous sulfate.

Subsequently, the amounts of the nickel and cobalt (mg) contained in the sample powder were determined, for example, by ICP emission spectral analysis, and the average oxidation number of the positive-electrode active-material powder was determined using the following equation. (The term average oxidation number herein means the average oxidation number of the nickel and cobalt contained in the positive-electrode active-material powder.) The average oxidation number of the nickel and cobalt contained in the active material obtained was 2.15.

(Su-2)

$$\text{Oxidation number} = \left\{ 1 + \frac{(\text{active-oxygen amount}/16000)}{(\text{nickel amount}/58690) + (\text{cobalt amount}/58933.2)} \right\} \times 2 \quad (2)$$

In the equation, the numeral 16000 indicates (atomic weight of oxygen)×1000, numeral 58690 indicates (atomic weight of nickel)×1000, and numeral 58933.2 indicates (atomic weight of cobalt)×1000.

(Production of Nickel Electrode)

A $Yb_2O_3$ powder having an average particle diameter of 1 µm was added to 100 g of the active-material powder which had undergone the heat treatment. The ingredients were mixed by means of a mixer until they became homogeneous. Thus, a powdery material for positive-electrode formation was obtained.

The proportion of the $Yb_2O_3$ powder to be added was regulated so that the proportion of ytterbium contained in the powdery material for positive-electrode formation became 2% by weight in terms of elemental ytterbium amount. Eighty parts by weight of the powdery material for positive-electrode formation was mixed with 20 parts by weight of an aqueous carboxymethyl cellulose (CMC) solution having a concentration of 0.5% by weight to prepare a paste.

A strip-form porous substrate made of nickel having a thickness of 1.5 mm and a porosity of 95% was coated and impregnated with the paste. This substrate was dried to remove the water in the paste and then pressed with pressure rolls. Thus, a strip-form raw sheet for nickel electrodes was produced which had a thickness of 0.8 mm. The raw sheet was cut into a given size to obtain a nickel electrode for a cylindrical battery (AA size).

The nickel electrode obtained had an active-material impregnant capacity of 2,000 mAh.

(Production of Negative Electrode)

As an active material was used a hydrogen-storing alloy powder having a composition represented by $MmNi_{3.6}Co_{0.7}Mn_{0.4}Al_{0.3}$ (wherein Mm indicates a mischmetal comprising a mixture of rare-earth elements, e.g., La, Ce, Pr, Nd, and Sm) and an average particle diameter of 30 μm.

With 83.5 parts by weight of the hydrogen-storing alloy powder were mixed 15 parts by weight of an aqueous methyl cellulose solution having a concentration of 1% by weight and 1.5 parts by weight of a styrene/butadiene rubber (SBR) powder dispersion having a concentration of 60% by weight to produce a paste. This paste was applied to a nickel-plated perforated steel sheet having a thickness of 45 μm and a rate of openings of 45%.

Subsequently, the steel sheet was dried and then pressed by rolling. Thus, a continuous raw sheet for negative electrodes was produced which had a thickness of 0.3 mm. This raw sheet was cut into a given size to obtain a negative electrode for a cylindrical battery (AA size). The active-material impregnant capacity of the negative electrode was regulated to 2,400 mAh, which was 1.2 times the active-material impregnant capacity of the positive electrode.

(Production of Cylindrical Nickel/Metal-Hydride Battery)

The positive electrode and the negative electrode were stacked together with separators interposed therebetween, the separators comprising a nonwoven polypropylene fabric which was constituted of fibers made of a copolymer of ethylene and propylene in a ratio of 1/1, having a fiber diameter of 0.2 deniers, and having sulfo groups incorporated therein through gas-phase reaction with sulfur trioxide by a known method and which had a basis weight of 50 $g/m^2$ and a thickness of 100 μm. This assembly was wound to obtain an element in which the outermost lap was the negative electrode.

In the fibers, the proportion of the sulfo groups incorporated (hereinafter referred to as the degree of sulfonation) was regulated to 1.3% by weight.

A positive-electrode current collector was bonded to the upper side of the wound element by series spot welding. This element was inserted into a cylindrical metallic battery case, and that part of the negative electrode which constituted the outermost lap of the wound element was brought into contact with the metallic battery case.

A positive-electrode lead plate made of nickel was bonded to the positive-electrode current collector as shown in FIG. 1, and 1.7 $cm^3$ of an aqueous solution containing 7 $mol/dm^3$ potassium hydroxide and 0.5 $mol/dm^3$ lithium hydroxide was filled.

Although the degree of sulfonation of the fibers used as the separators in this Example was regulated to 1.3% by weight, the degree of sulfonation in the battery according to the invention should not be construed as being limited to that.

It is, however, noted that the degree of sulfonation is preferably 0.5-2% by weight.

In case where that proportion is below 0.5% by weight, the fibers have poor hydrophilicity and the separators have low liquid retention.

In case where the degree of sulfonation exceeds 2% by weight, there is a drawback that the fibers have poor mechanical strength.

Here, the amount of sulfur contained in the separators was determined by fluorescent X-ray spectroscopy. The found value was converted to the amount per 1 $m^2$ ($g/m^2$), and the proportion (%) of this converted value to the basis weight of the separators was taken as the degree of sulfonation.

Subsequently, a lid having a pressure switch attached to the inner side thereof as shown in FIG. 1 was applied and the positive-electrode lead plate was contacted with the metallic rigid plate of the pressure switch. This battery case was sealed in a given manner to produce a sealed battery of the AA size.

The operating pressure for the pressure switch (the pressure at which the charging circuit is made off as stated above) was set at 2 MPa. A temperature switch function was not imparted in this Example. Incidentally, the operating pressure for the safety vent (the internal battery pressure at which the gastightly sealed state is broken and the gas present inside is discharged outside through the through-hole 10 shown in FIG. 1) was regulated to 3.5 MPa.

EXAMPLE 2 TO EXAMPLE 5

The same constitution as in Example 1 was employed, except that springs differing in modulus of elasticity were used to change the specified operating pressure for the pressure switch to 0.7 MPa, 1 MPa, 3 MPa, and 3.3 MPa, respectively. The batteries were referred to the batteries of Example 2, Example 3, Example 4, and Example 5, respectively.

COMPARATIVE EXAMPLE 1

The same constitution as in Example 1 was employed, except that a lid having no pressure switch was used and the positive-electrode current collector and the lid was directly connected to each other with a strip-form lead plate made of nickel.

This battery is referred to as the battery of Comparative Example 1.

(Forming)

Ten sealed alkaline storage batteries were prepared with respect to each of the batteries of Examples 1 to 5 and Comparative Example 1. The batteries were allowed to stand at a temperature of 20° C. for 3 hours and then subjected to forming at a temperature of 20° C.

A first charge was conducted at a current of 0.05 ItA for 20 hours and subsequently a first discharge was conducted at a current of 0.2 ItA to a cut-off voltage of 1.0 V.

In the second and succeeding charge/discharge operations, charging was conducted at a current of 0.1 ItA for 16 hours and discharging was conducted at a current of 0.2 ItA to a cut-off voltage of 1.0 V. The charge/discharge operation as one cycle was repeated to conduct ten charge/discharge cycles including the first operation.

(Battery Test 1)

A temperature sensor for measuring the temperature of the side of a battery was attached to each of batteries which had undergone the forming described above. Thereafter, in an atmosphere having a temperature of 20° C., the batteries were charged at a current of 0.1 ItA for 16 hours and, after a 1-hour pause, discharged at a current of 0.2 ItA to a cut-off voltage of 1.0 V.

The discharge capacity obtained in this discharge (average for ten batteries) is referred to as K (mAh). Thereafter, the ten batteries for each Example or Comparative Example were divided into two groups each consisting of five batteries. The two groups of five batteries were charged respectively at ambient temperatures of 20° C. and 45° C. for 15 minutes by applying a constant voltage of 1.65 V thereto. After a 1-hour pause at a temperature of 20° C., the batteries were discharged at a current of 0.2 ItA to a cut-off voltage of 1.0 V. The maximum temperature of the battery surfaces during this discharge (average for five batteries) was taken as the maximum temperature of the battery surface.

The discharge capacity obtained in the discharge after the first constant-voltage charge (average for five batteries) is referred to as L (mAh). [L (mAh)/K (mAh)]×100 was taken as charging efficiency (%) in constant-voltage charging at 1.65 V.

In an atmosphere having a temperature of 20° C., constant-voltage charging was conducted at a charging voltage of 1.65 V and, after a 1-hour pause, the batteries were discharged at a current of 1 ItA to a cut-off voltage of 0.9 V.

This charge/discharge operation as one cycle was repeated until the discharge capacity decreased to 80% of the discharge capacity L (mAh) in the first cycle of the charge/discharge cycling, and the number of cycles thus conducted (average for five batteries) was taken as cycle life.

The results of the tests are shown in Table 1.

As shown in Table 1, the batteries of Examples 1 to 5 and the battery of Comparative Example 1 are substantially equal in the discharge capacity {K(mAh)} determined after the ordinary constant-current charging (16-hour charging at 0.1 ItA). However, with respect to the charging efficiency determined in 15-minute charging at a constant voltage of 1.65 V, the performances of the batteries of the Examples are considerably higher than the performance of the battery of Comparative Example 1.

In the case where the batteries were charged for 15 minutes at a constant voltage of 1.65 V and a temperature of 20° C., the charging efficiencies in Example 1, Example 3, and Example 4 are higher by 10% or more than that in Comparative Example 1.

Figure 3:
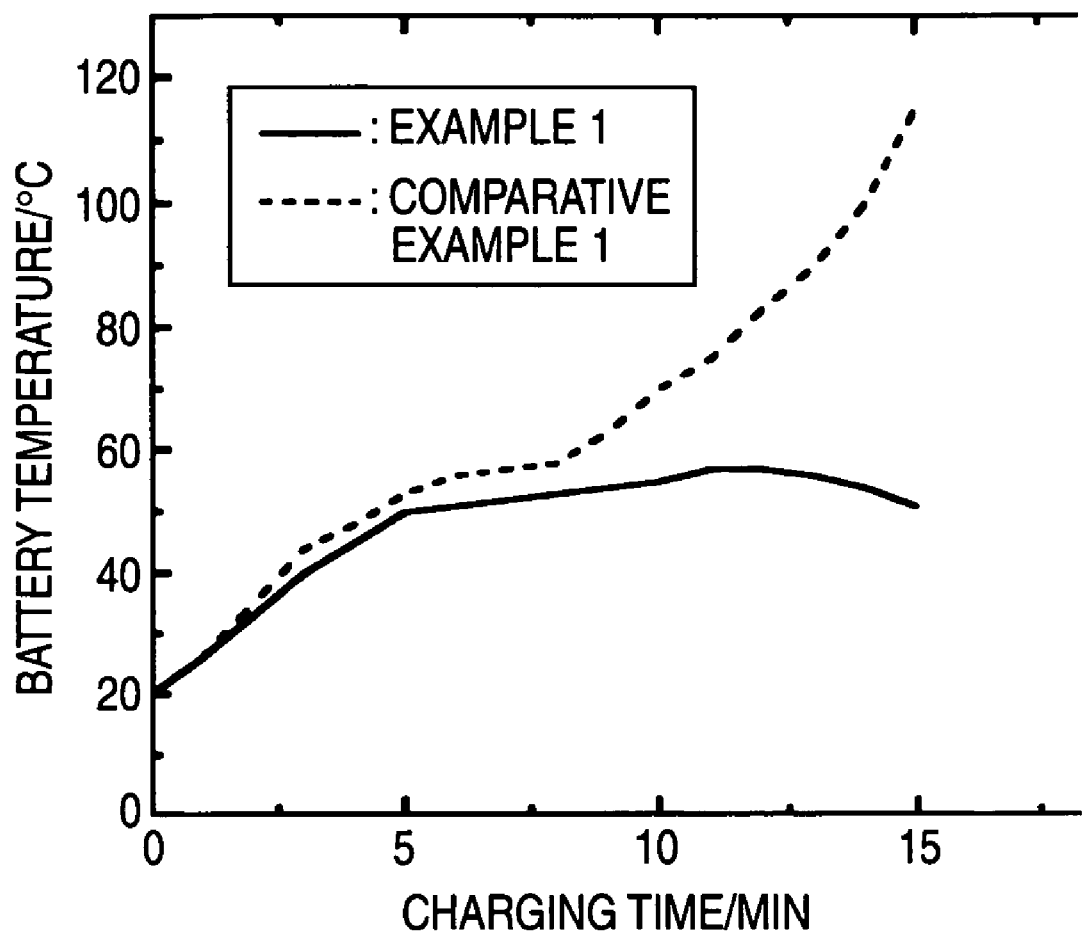
FIG. 3 is a graphic presentation showing battery temperatures measured when the battery of the Example according to the invention and the battery of the Comparative Example were charged.

This is because as shown in FIG. 3, the temperature of the battery of Comparative Example 1 rises with the progress of charging and exceeds 100° C. in a final stage of charge.

Because of this, the charging caused property deterioration and a decrease in capacity, resulting in the reduced charging efficiency. In contrast, in the case of Example 1, when the internal pressure of the battery has reached the specified value of 2 MPa, the pressure switch works to make the charging off. Thereafter, charging is alternately made on and off repeatedly and the battery can be further charged in an amount of 10% or more after the pressure switch worked first (the batteries of the other Examples show the same charge behavior).

Furthermore, as shown in FIG. 3, the battery temperature during charge is kept at 60° C. or lower. A decrease in capacity due to property deterioration is not caused.

Because of this, the batteries of the Examples can attain a high charging efficiency. Of the batteries of the Examples, the batteries of Example 1, Example 3, and Example 4 are especially excellent in charging efficiency and cycle life. It can hence be seen that it is preferred to set the specified value of internal battery pressure at 1-3 MPa.

TABLE 1

| Section | Specified value of gas pressure in battery (MPa) | Discharge capacity in 20° C. 0.2-ItA discharge K (mAh) | Ambient temperature during charge (° C.) | Discharge capacity after 1.65-V 15-min charge L (mAh) | Maximum temperature in 1.65-V 15-min charge (° C.) | Charging efficiency in 1.65-V 15-min charge (%) | Cycle life (cycles) |
|---|---|---|---|---|---|---|---|
| Ex. 1 | 2 | 2020 | 20 | 1720 | 57 | 85 | 485 |
|  |  |  | 45 | 1553 | 81 | 77 | — |
| Ex. 2 | 0.7 | 2031 | 20 | 1530 | 39 | 75 | 730 |
|  |  |  | 45 | 1430 | 62 | 70 | — |
| Ex. 3 | 1 | 2018 | 20 | 1611 | 48 | 80 | 650 |
|  |  |  | 45 | 1498 | 70 | 74 | — |
| Ex. 4 | 3 | 2025 | 20 | 1650 | 67 | 81 | 412 |
|  |  |  | 45 | 1453 | 93 | 72 | — |
| Ex. 5 | 3.3 | 2042 | 20 | 1593 | 89 | 78 | 313 |
|  |  |  | 45 | 1442 | 111 | 71 | — |
| Comp. Ex. 1 | no pressure switch | 2022 | 20 | 1423 | 115 | 70 | 59 |
|  |  |  | 45 | 938 | 140 | 46 | — |

Figure 2:
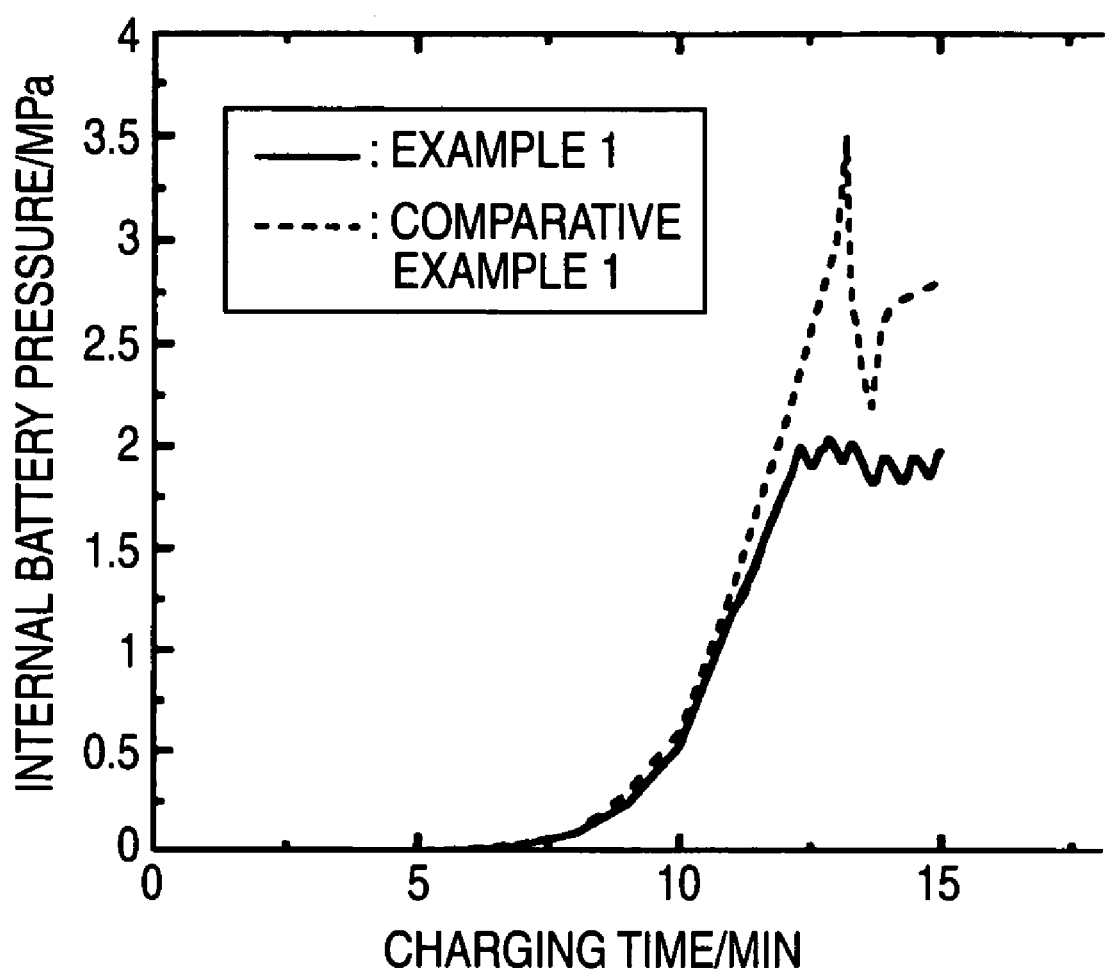
FIG. 2 is a graphic presentation showing internal battery pressures measured when the battery of an Example according to the invention and the battery of a Comparative Example were charged.

In FIG. 2 are shown the changes with time of the internal pressure of each of the battery of Example 1 and the battery of Comparative Example 1 in 15-minute charging at a charging voltage of 1.65 V and an ambient temperature of 20° C. In FIG. 3 are shown the changes of the battery side surface temperatures with time in the charging.

Figure 4:
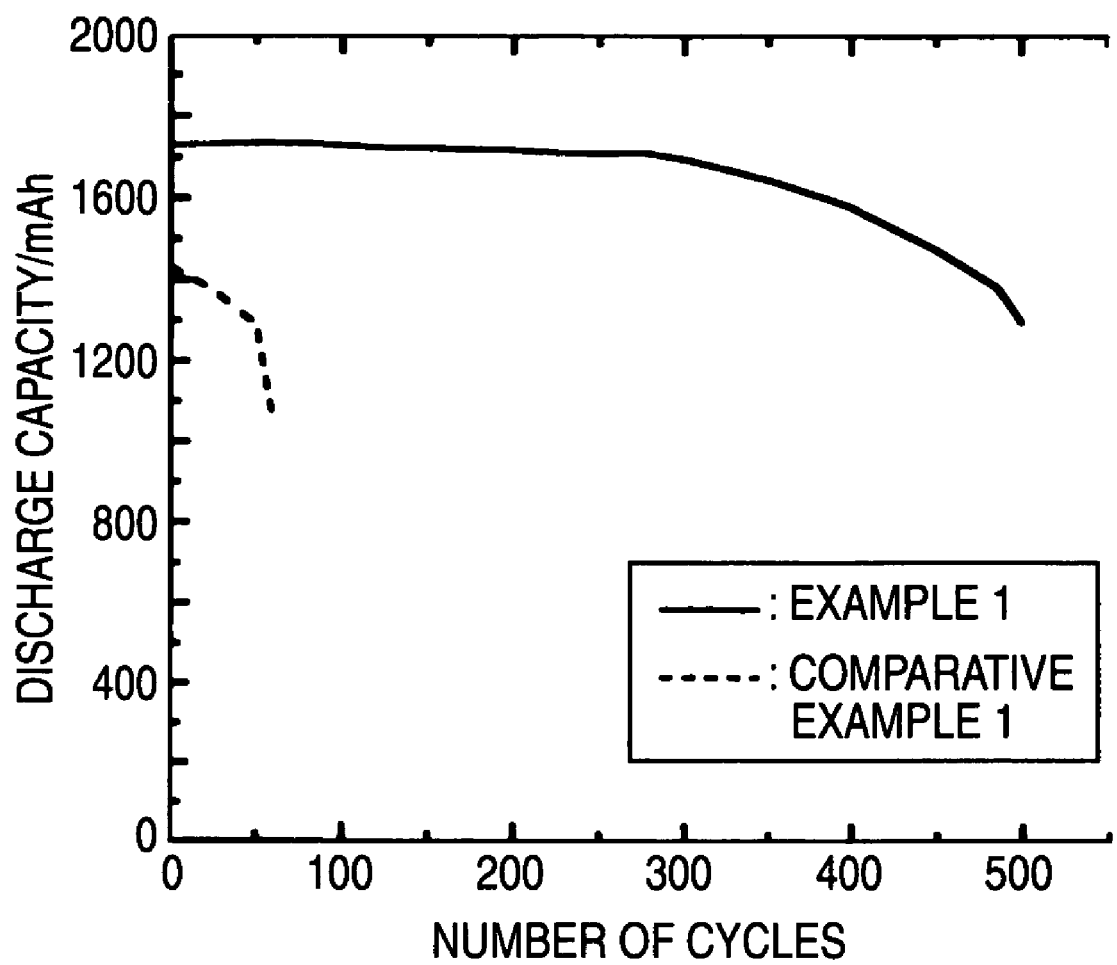
FIG. 4 is a graphic presentation showing the charge/discharge cycle performances of the battery of the Example according to the invention and the battery of the Comparative Example.

Furthermore, changes in discharge capacity in the charge/discharge cycle test are shown in FIG. 4.

In the case of charging at a constant voltage of 1.65 V, the internal pressure of the battery abruptly increases after the lapse of about 10 minutes from the initiation of charging as shown in FIG. 2.

When the charging of the battery of Example 1 is continued under the same conditions, the pressure switch works and charge on/off switching is repeated. As a result, the internal pressure of the battery fluctuates so as to form a sawtooth curve. Since the pressure switch function thus works, the battery of Example 1 is inhibited from increasing in battery temperature and the maximum temperature thereof is 57° C. at the most, as shown in FIG. 3.

On the other hand, in the case of the battery of Comparative Example 1, charging remains on and the internal pressure of the battery continues to increase until the safety vent works. At this point of time, the charging becomes off.

Furthermore, as shown in FIG. 3, the battery temperature continued to rise during charge and reached a temperature as high as 115° C. just before the termination of charging.

five batteries were charged respectively at ambient temperatures of 20° C. and 45° C. for 15 minutes at a charging voltage of 1.65 V. The maximum pressure in the batteries during this charge was taken as the maximum value of gas pressure in the battery (average for five batteries). Furthermore, the charging efficiency (average for five batteries, %) was determined in the same manner as in Battery Test 1. Thereafter, the same charge/discharge test as in Battery Test 1 was conducted to determine the cycle life (average for five batteries). The results of the tests are shown in Table 2.

TABLE 2

| Section | Specified value of battery temperature (° C.) | Discharge capacity in 20° C. 0.2-ItA discharge K (mAh) | Ambient temperature during charge (° C.) | Discharge capacity after 1.65-V 15-min charge L (mAh) | Charging efficiency in 1.65-V 15-min charge (%) | Cycle life (cycles) |
|---|---|---|---|---|---|---|
| Ex. 6 | 50 | 2015 | 20 | 1567 | 78 | 423 |
|  |  |  | 45 | 1315 | 65 | — |
| Ex. 7 | 60 | 2021 | 20 | 1632 | 81 | 392 |
|  |  |  | 45 | 1473 | 73 | — |
| Ex. 8 | 80 | 2035 | 20 | 1530 | 75 | 123 |
|  |  |  | 45 | 1457 | 72 | — |
| Ex. 9 | 100 | 2031 | 20 | 1485 | 73 | 83 |
|  |  |  | 45 | 1383 | 68 | — |
| Comp. Ex. 1 | no temperature switch | 2022 | 20 | 1423 | 70 | 59 |
|  |  |  | 45 | 938 | 46 | — |

Battery temperatures which have risen high result in a reduced charging efficiency and lead to subsequent deterioration of battery performances. As Table 1 and FIG. 4 show, the battery of Comparative Example 1 was found to have a lower charging efficiency than the battery of Example 1 and undergo an abrupt decrease in performance (discharge capacity) in repetitions of charge/discharge.

Especially when charged at an ambient temperature of 45° C., the battery of Comparative Example 1 has the defect of having a considerably reduced charging efficiency.

(Influence of Specified Value of Battery Temperature)

EXAMPLE 6 TO EXAMPLE 9

The same constitution as in Comparative Example 1 (having no pressure switch function) was employed, except that a temperature switch function only was imparted (the structure shown in FIG. 1 in which the pressure switch was omitted and one end of the bimetal positive-electrode lead plate was contacted with the inner side of the metallic lid to thereby electrically connect the positive electrode to the positive-electrode terminal) and that the temperature characteristics of the bimetal used as the positive-electrode lead plate were changed to set the operating temperatures for the temperature switch functions (the temperatures at which the charging circuit was made off) in Example 6 to Example 9 at 50° C., 60° C., 80° C., and 100° C., respectively. These batteries are referred to as the batteries of Example 6, Example 7, Example 8, and Example 9, respectively.

(Battery Test 2)

A pressure sensor for measuring the gas pressure in a battery was attached to each of test batteries (ten batteries for each Example) of Examples 6 to 9 which had undergone forming in the same manner as described above.

The ten batteries for each Example were divided into two groups each consisting of five batteries. The two groups of The batteries of Examples 6 to 9 each have a higher charging efficiency in 1.65-V constant-voltage charging than the battery of Comparative Example 1.

Of the batteries of the Examples, the batteries of Examples 7 and 8 have a high charging efficiency in both charging at an ambient temperature of 20° C. and charging at an ambient temperature of 45° C.

It can be seen from these results that the specified value of battery temperature is preferably 50-80° C., more preferably 60-80° C. It is thought that when the battery temperature exceeds 80° C. during charge, oxygen generation at the positive electrode is enhanced and the hydrogen-storing ability of the negative electrode decreases, resulting in a reduced charging efficiency.

On the other hand, specified values of battery temperature lower than 50° C. are undesirable for the following reasons. The battery temperature reaches such a specified value in a short time after the initiation of charging to make the charging off. Because of this, in the case where the charging time is limited, for example, to a short period of 15 minutes, the charging efficiency becomes low.

(Influence of Negative-Electrode Capacity/Positive-Electrode Capacity Ratio)

EXAMPLE 10 TO EXAMPLE 13

In Example 1 (with a pressure switch having an operating pressure of 2 MPa), a temperature switch having an operating temperature of 80° C. was attached besides the pressure switch. The capacity of the positive electrode was fixed and the capacity of the negative electrode was varied to thereby change the N/P ratio in the range of 1.0-1.6.

The negative-electrode capacity/positive-electrode capacity ratio (N/P) was regulated to 1.0, 1.02, 1.45, and 1.6 for respective batteries. The other constitutions were the same as in Example 1.

These batteries are referred to as the batteries of Example 10, Example 11, Example 12, and Example 13, respectively.

COMPARATIVE EXAMPLE 2 AND
COMPARATIVE EXAMPLE 3

A battery having the same constitution as the battery of Example 10 was produced, except that the pressure switch was omitted. This battery is referred to as the battery of Comparative Example 2.

A battery having the same constitution as the battery of Example 13 was produced, except that the pressure switch was omitted. This battery is referred to as the battery of Comparative Example 3.

(Battery Test 3)

Five batteries were prepared with respect to each of the batteries of Examples 10 to 13 and Comparative Examples 2 and 3. These batteries were subjected to forming in the same manner as described above. Thereafter, in an atmosphere having a temperature of 20° C., the batteries were charged at a current of 0.1 ItA for 16 hours and, after a 1-hour pause, discharged at a current of 0.2 ItA to a cut-off voltage of 1.0 V. The discharge capacity obtained in this discharge is referred to as K (mAh).

Furthermore, the batteries were charged at a current of 0.1 ItA for 16 hours and, after a 1-hour pause, discharged at a current of 3 ItA to a cut-off voltage of 0.8 V. The discharge capacity obtained in this discharge is referred to as M (mAh). The ratio between the discharge capacities M and K {[M (mAh)/K (mAh)]×100 (%)} was used as an index to high-rate discharge performance. Moreover, test batteries of Examples 9 to 14 which had undergone forming in the same manner as described above were subjected at 20° C. to the same tests as in Battery Test 1 to examine charging efficiency and cycle life. The results of the tests (average for five batteries) are shown in Table 3.

Compared to the battery of Example 10, which has an N/P ratio of 1, the batteries of Examples 11 to 13 have a higher value of M/K, which is an index to high-rate discharge performance, and a higher charging efficiency in 15-minute constant-voltage charging at 1.65 V.

In particular, the batteries of Examples 12 and 13, which have an N/P ratio of 1.2-1.6, have excellent properties.

The attainment of a high charging efficiency even in short-time charging and of excellent cycle performance as described above is attributable to the setting of the N/P ratio at a value in the range of 1.02-1.6 and the impartation of a pressure switch function to the batteries.

However, the following should be noted. In the case of the battery of Example 13, which is an AA size battery having a positive-electrode capacity as high as 2,000 mAh and an N/P ratio of 1.6, the negative-electrode plate has a large thickness because the amount of the negative-electrode active material used for impregnation is large. This constitution hence has a drawback that when wound elements are produced or batteries are fabricated, defectives are apt to be produced, resulting in a reduced yield.

Consequently, in the first sealed alkaline storage battery according to the invention, the N/P ratio is regulated to 1.02-1.45. In particular, it is more preferred to regulate the N/P ratio to 1.2-1.45.

(Oxidation Number of Positive-Electrode Active Material)

EXAMPLE 14 TO EXAMPLE 19

Batteries were produced in the same manner as for the battery of Example 1, except that the amount of the oxidizing agent solution (NaClO; effective concentration, 10%) to be added for oxidizing the positive-electrode active-material powder was varied to thereby prepare positive-electrode active materials differing in oxidation number (average oxidation number of nickel and cobalt contained in the positive-electrode active material) and these positive-electrode active materials each were used.

Namely, batteries respectively employing positive-electrode active materials having average oxidation numbers of 2.0, 2.04, 2.07, 2.3, 2.4, and 2.5 were produced.

These batteries are referred to as the batteries of Example 14, Example 15, Example 16, Example 17, Example 18, and Example 19, respectively.

TABLE 3

| Section | Negative-electrode capacity/positive-electrode capacity proportion (N/P) | Discharge capacity in 20° C. 0.2-ItA discharge K (mAh) | Discharge capacity in 3-ItA discharge M (mAh) | M/K × 100 (%) | Charging efficiency in 1.65-V 15-min charge (%) | Cycle life (cycles) |
|---|---|---|---|---|---|---|
| Ex. 10 | 1.0 | 1803 | 938 | 52 | 52 | 129 |
| Ex. 11 | 1.02 | 1920 | 1210 | 63 | 63 | 213 |
| Ex. 1 | 1.2 | 2033 | 1890 | 93 | 85 | 546 |
| Ex. 12 | 1.45 | 2024 | 1902 | 94 | 89 | 680 |
| Ex. 13 | 1.6 | 2013 | 1892 | 94 | 92 | 735 |
| Comp. Ex. 1 | 1.2 | 2022 | 1860 | 92 | 70 | 59 |
| Comp. Ex. 2 | 1.0 | — | — | — | 46 | 50 |
| Comp. Ex. 3 | 1.6 | — | — | — | 78 | 94 |

As Table 3 shows, the following can be found when each of Example batteries (with a pressure switch function) is compared with the Comparative Example battery (with no pressure switch function) having the same N/P ratio as the Example battery. Compared to the battery having an N/P ratio of 1.0, the battery having an N/P ratio of 1.2 has been markedly improved in charging efficiency and cycle performance by the impartation of the pressure switch function.

COMPARATIVE EXAMPLE 4 AND
COMPARATIVE EXAMPLE 5

A battery having the same constitution as the battery of Example 14 was produced, except that the pressure switch was omitted. This battery is referred to as the battery of Comparative Example 4.

A battery having the same constitution as the battery of Example 19 was produced, except that the pressure switch was omitted. This battery is referred to as the battery of Comparative Example 5.

(Battery Test 4)

Five batteries were prepared with respect to each of the batteries of Examples 14 to 19 and Comparative Examples 4 and 5. These batteries were subjected to forming in the same manner as described above. In an atmosphere having a temperature of 20° C., the five batteries with respect to each of the Examples and Comparative Examples which had undergone the forming (the batteries after discharging) were charged at a current of 0.1 ItA for 16 hours and, after a 1-hour pause, discharged at a current of 0.2 ItA to a cut-off voltage of 1.0 V.

The discharge capacity obtained in this discharge is referred to as K (mAh). A pressure sensor for measuring the internal pressure of a battery was attached to the batteries, and the internal pressure of each battery was measured when the battery was charged at a current of 1 ItA and an ambient temperature of 20° C. for 1 hour.

Thereafter, the batteries were subjected to a charge/discharge cycle test at an ambient temperature of 20° C. in the same manner as described above. Incidentally, five batteries of Example 12 were separately prepared and subjected to the measurement of internal battery pressure by the same test method as in Examples 15 to 18. The results thereof (average for five batteries) are shown in Table 4.

TABLE 4

| Section | Average oxidation number of transition metals contained in positive-electrode active material | Gas pressure in battery in 1-ItA 100% charge (MPa) | Discharge capacity in 20° C. 0.2-ItA discharge K (mAh) | Charging efficiency in 1.65-V 15-min charge (%) | Cycle life (cycles) |
|---|---|---|---|---|---|
| Ex. 14 | 2.0 | 1.8 | 2013 | 73 | 372 |
| Ex. 15 | 2.04 | 1.5 | 2022 | 81 | 484 |
| Ex. 16 | 2.07 | 1.2 | 2030 | 83 | 530 |
| Ex. 1 | 2.15 | 1.1 | 2033 | 85 | 546 |
| Ex. 17 | 2.3 | 1.0 | 2025 | 85 | 568 |
| Ex. 18 | 2.4 | 0.8 | 1960 | 86 | 621 |
| Ex. 19 | 2.5 | 0.8 | 1857 | 83 | 646 |
| Comp. Ex. 1 | 2.15 | 1.1 | 2022 | 70 | 59 |
| Comp. Ex. 4 | 2.0 | — | — | 65 | 46 |
| Comp. Ex. 5 | 2.5 | — | — | 74 | 78 |

As Table 4 shows, the following can be found when each of Example batteries (with a pressure switch function) is compared with the Comparative Example battery (with no pressure switch function) having the same average oxidation number of transition metal elements contained in the positive-electrode active material as the Example battery. Compared to the battery having an average oxidation number of 2.0, the battery having an average oxidation number of 2.15 has been markedly improved in charging efficiency in 15-minute charging at 1.65 V and in cycle performance. Compared to the battery of Example 14, the batteries of Example 1 and Examples 15 to 19 are more inhibited from increasing in internal battery pressure in 1-hour charging at 1 ItA.

The reasons for these results are thought to be as follows. Since the oxidation number of the positive-electrode active material had been heightened before the incorporation of the positive electrode into the battery, the formation of a discharge reserve in the negative electrode was inhibited. Since a charge reserve was thus secured, hydrogen generation at the negative electrode during charge was inhibited. Because of this, the internal pressure of the battery was inhibited from increasing and, simultaneously therewith, a heightened charging efficiency was obtained.

The attainment of a high charging efficiency in charging for a period as short as 15 minutes and of excellent cycle performance in Examples 15 to 19 is attributable to the setting of the average oxidation number at a value in the range of 2.04-2.5 and the impartation of a pressure switch function to the batteries.

However, the following should be noted. In the case of the battery of Example 18, which has an oxidation number increased to 2.4, the amount of the positive-electrode active material which participates in power-generating reactions is small and, hence, this battery has a slightly low discharge capacity K (mAh). The battery of Example 19, which has an oxidation number increased to 2.5, has a lower discharge capacity K (mAh). Furthermore, of the batteries of the Examples, the batteries of Examples 12 and 16 to 19, in particular the batteries of Examples 12, 17, and 18, are especially excellent in the effect of inhibiting internal-pressure increase and in charging efficiency and cycle performance.

Consequently, the positive-electrode active material, before being incorporated into a battery, has an oxidation number of preferably 2.04-2.4, more preferably 2.07-2.3.

(Electrochemical Oxidation of Positive Electrode)

EXAMPLE 20

Positive electrodes were produced in the same manner as in Example 1, except that the chemical oxidation treatment and alkali treatment of the positive-electrode active-material powder were omitted.

An open battery was fabricated using each positive electrode and a nickel plate as a counter electrode and using 7.5 mol/dm$^3$ aqueous KOH solution as a liquid electrolyte. Charging was conducted for 7.5 hours at 1/50 ItA based on the capacity of the positive electrode. After the charging, the positive electrode was recovered, washed with water, and dried. Ten positive electrodes were thus prepared. The active-material powder was recovered from five positive electrodes, and the average oxidation number of the nickel and cobalt contained in this active material was determined by the same method as described above.

The remaining five electrodes were used to fabricate batteries in the same manner as in Example 1, and the batteries were subjected to forming. These batteries are referred to as the battery of Example 20.

EXAMPLE 21

Positive electrodes were produced in the same manner as in Example 1, except that the chemical oxidation treatment and alkali treatment of the positive-electrode active-material powder were omitted.

These positive electrodes were used to fabricate ten batteries in the same manner as in Example 1, except that before battery sealing, charging was conducted for 7.5 hours at 1/50

ItA based on the capacity of the positive electrode. After the charging, the positive electrodes were recovered from five batteries, washed with water, and dried.

The average oxidation number of the nickel and cobalt contained in the active-material powder of the positive electrodes was determined in the same manner as in Example 1. The remaining five batteries were placed in a sealed vessel, which was continuously sucked for 1 hour.

During this operation, the pressure in the sealed vessel was kept at 0.01MPa or lower.

Subsequently, the batteries were sealed and subjected to forming in the same manner as described above. These batteries are referred to as the battery of Example 21.

COMPARATIVE EXAMPLE 6

A battery having the same constitution as the battery of Example 20 was produced, except that the pressure switch was omitted. This battery is referred to as the battery of Comparative Example 6.

(Battery Test 5)

Five batteries were prepared with respect to each of the batteries of Examples 20 and 21 and Comparative Example 6. These batteries were subjected to the same battery tests as in Battery Test 4. The results thereof are shown in Table 5.

TABLE 5

| Section | Average oxidation number of transition metals contained in positive-electrode active material | Gas pressure in battery in 1-ItA 100% charge (MPa) | Discharge capacity in 20° C. 0.2-ItA discharge K (mAh) | Charging efficiency in 1.65-V 15-min charge (%) | Cycle life (cycles) |
|---|---|---|---|---|---|
| Ex. 20 | 2.15 | 1.1 | 2028 | 85 | 533 |
| Ex. 21 | 2.15 | 1.1 | 2035 | 85 | 547 |
| Comp. Ex. 6 | 2.15 | — | — | 71 | 60 |

As shown in Table 5, the batteries of Examples 20 and 21 are superior to the battery of Example 14 and comparable to the battery of Example 1 in the function of inhibiting the internal pressure of the battery from increasing during charge and in charging efficiency and cycle performance.

The reasons for these results are thought to be as follows. The electrochemical oxidation of the positive electrode by charging increased the oxidation number of nickel and cobalt, and a measure was taken for inhibiting the hydrogen which had generated due to the charging from accumulating in the negative electrode. Because of these, the effect of inhibiting the formation of a discharge reserve was obtained.

(Positive Electrodes Containing Rare-Earth Elements and Calcium)

EXAMPLE 22 TO EXAMPLE 28

In Example 1, an $Ho_2O_3$ powder, $Er_2O_3$ powder, $Tm_2O_3$ powder, $Lu_2O_3$ powder, $Y_2O_3$ powder, 1:1:1 powder mixture of a $Tm_2O_3$ powder, $Yb_2O_3$ powder, and $Lu_2O_3$ powder, and $Ca(OH)_2$ powder were added in place of the $Yb_2O_3$ powder as a rare-earth element compound to be contained in the powdery material for positive-electrode formation.

In each of Examples 22 to 28, the content of the rare-earth elements and calcium contained in the powdery material for positive-electrode formation was regulated to 2% by weight in terms of element amount as in Example 1.

The other constitutions were the same as in Example 1.

These batteries are referred to as the batteries of Example 22, Example 23, Example 24, Example 25, Example 26, Example 27, and Example 28, respectively. Five batteries were prepared with respect to each Example and subjected to Battery Test 6.

(Battery Test 6)

The batteries of Examples 22 to 28 which had undergone forming in the same manner as described above were subjected to the same battery tests as in Battery Test 2 at an ambient temperature of 20° C. The results thereof (average for five batteries) are shown in Table 6.

TABLE 6

| Section | Kind of rare-earth element contained in positive electrode | Discharge capacity in 20° C. 0.2-ItA discharge K (mAh) | Discharge capacity after 1.65-V 15-min charge L (mAh) | Charging efficiency in 1.65-V 15-min charge (%) | Cycle life (cycles) |
|---|---|---|---|---|---|
| Ex. 22 | Ho | 2048 | 1580 | 77 | 385 |
| Ex. 23 | Er | 2025 | 1600 | 79 | 415 |
| Ex. 24 | Tm | 2051 | 1710 | 83 | 461 |
| Ex. 1 | Yb | 2033 | 1728 | 85 | 546 |
| Ex. 25 | Lu | 2019 | 1706 | 84 | 472 |
| Ex. 26 | Y | 2028 | 1570 | 77 | 365 |
| Ex. 27 | Tm, Yb, Lu | 2035 | 1735 | 85 | 493 |
| Ex. 28 | Ca | 2022 | 1510 | 75 | 360 |
| Comp. Ex. 1 | Yb | 2022 | 1415 | 70 | 59 |

As shown in Table 6, the batteries of Examples 22 to 28 are superior to the battery of Example 29, which will be given later, in both charging efficiency and cycle performance.

This may be because the incorporation of any of the rare-earth elements or calcium into the positive electrode increased the oxygen overvoltage of the positive electrode and improved the charging efficiency.

The attainment of a high charging efficiency even in charging for a period as short as 15 minutes and of excellent cycle performance as in the batteries of Examples 22 to 28 is attributable to the incorporation of a rare-earth element or calcium into the positive electrode and the impartation of a pressure switch function to the batteries.

EXAMPLE 29 TO EXAMPLE 35

In Example 1, the proportion of the $Yb_2O_3$ contained in the powdery material for positive-electrode formation was varied to 0 and values in the range of 0.1-8% by weight in terms of elemental ytterbium amount.

Namely, the proportion thereof was changed to 0, 0.1, 0.5, 1, 4, 5, and 8% by weight. The other constitutions were the same as in Example 1.

These batteries were referred to as the batteries of Example 29, Example 30, Example 31, Example 32, Example 33, Example 34, and Example 35, respectively.

COMPARATIVE EXAMPLE 7 AND COMPARATIVE EXAMPLE 8

A battery having the same constitution as the battery of Example 29 was produced, except that the pressure switch was omitted. This battery is referred to as the battery of Comparative Example 7.

A battery having the same constitution as the battery of Example 35 was produced, except that the pressure switch was omitted. This battery is referred to as the battery of Comparative Example 8.

(Battery Test 7)

The batteries of Examples 29 to 35 and Comparative Examples 7 and 8 which had undergone forming in the same manner as described above were subjected to the same battery tests as in Battery Test 2 at an ambient temperature of 20° C. The results thereof (average for five batteries) are shown in Table 7.

TABLE 7

| Section | Content of Yb (element amount, wt %) | Discharge capacity in 20° C. 0.2-ItA discharge K (mAh) | Discharge capacity after 1.65-V 15-min charge L (mAh) | Charging efficiency in 1.65-V 15-min charge (%) | Cycle life (cycles) |
|---|---|---|---|---|---|
| Ex. 29 | 0 | 2039 | 1515 | 74 | 321 |
| Ex. 30 | 0.1 | 2037 | 1568 | 77 | 453 |
| Ex. 1 | 2 | 2033 | 1728 | 85 | 546 |
| Ex. 31 | 0.5 | 2036 | 1608 | 79 | 471 |
| Ex. 32 | 1 | 2030 | 1664 | 82 | 518 |
| Ex. 33 | 4 | 2024 | 1639 | 81 | 492 |
| Ex. 34 | 5 | 2019 | 1635 | 81 | 484 |
| Ex. 35 | 8 | 2005 | 1435 | 72 | 431 |
| Comp. Ex. 1 | 2 | — | — | 70 | 59 |
| Comp. Ex. 7 | 0 | — | — | 64 | 48 |
| Comp. Ex. 8 | 8 | — | — | 66 | 52 |

Table 7 shows the following. With respect to the batteries having ytterbium contents in the positive electrode of 0% by weight and 2% by weight, the following can be found when each of the Example batteries (with a pressure switch function) is compared with the Comparative Example battery (with no pressure switch function) having the same ytterbium content. Compared to the battery having a ytterbium content of 0% by weight, the battery having a ytterbium content of 2% by weight has been markedly improved in charging efficiency in 15-minute charging at 1.65 V and in cycle performance, due to the impartation of a pressure switch function to the battery.

The batteries of Example 1 and 30 to 35 each are superior in cycle characteristics to the battery of Example 29.

This is thought to be attributable to each rare-earth element oxide which has been added to the positive electrode and exerts the effect of inhibiting oxygen generation at the positive electrode during charge.

Namely, those effects are thought to have been brought about by the inhibition of side reactions at the positive electrode during charge and a resultant improvement in charging efficiency and by the diminution of the corrosion of the hydrogen-storing alloy of the negative electrode by the oxygen generated at the positive electrode.

The attainment of a high charging efficiency in charging for a period as short as 15 minutes and of excellent cycle performance in the batteries of Examples 1 and 30 to 34 is attributable to the incorporation of ytterbium, a rare-earth element, into the positive electrode and setting of the content thereof at 0.1-5% by weight and to the impartation of a pressure switch function to the batteries.

Although the Examples showed battery examples employing a positive electrode containing an oxide of a rare-earth element, incorporation of hydroxides of rare-earth elements produces the same effects.

Of the excellent Examples, the batteries of Examples 1 and 30 to 34 show excellent performance also in charging efficiency. In contrast, the battery of Example 35 has a drawback that the discharge capacity thereof as measured after constant-voltage charging at 1.65 V is low.

This may be because the high proportion of the $Yb_2O_3$ contained in the positive electrode reduced the conductivity of the positive electrode and this resulted in a reduced coefficient of active-material use.

Consequently, the proportion of the compound of a rare-earth element to be added to the positive electrode is preferably 0.1-5% by weight, more preferably 0.5-4% by weight, in terms of the amount of the rare-earth element.

(Amount of Liquid Electrolyte)

EXAMPLE 36 TO EXAMPLE 40

In Example 1, the amount of the liquid electrolyte, per unit capacity of the positive electrode, to be incorporated in the battery was varied in the range of from 0.4 $cm^3$/Ah to 1.20 $cm^3$/Ah.

Namely, the amount of the liquid electrolyte was changed to 0.4 $cm^3$/Ah, 0.6 $cm^3$/Ah, 1.05 $cm^3$/Ah, 1.10 $cm^3$/Ah, and 1.20 $cm^3$/Ah. The other constitutions were the same as in Example 1.

These batteries are referred to as the batteries of Example 36, Example 37, Example 38, Example 39, and Example 40, respectively.

COMPARATIVE EXAMPLE 9 TO COMPARATIVE EXAMPLE 11

A battery having the same constitution as the battery of Example 38 was produced, except that the pressure switch was omitted. This battery is referred to as the battery of Comparative Example 9.

A battery having the same constitution as the battery of Example 36 was produced, except that the pressure switch was omitted.

This battery is referred to as the battery of Comparative Example 10. A battery having the same constitution as the battery of Example 40 was produced, except that the pressure switch was omitted. This battery is referred to as the battery of Comparative Example 11.

(Battery Test 8)

With respect to each of the batteries of Examples 36 to 40 and Comparative Examples 9 to 11, five batteries which had undergone forming in the same manner as described above were subjected to the same tests as in Battery Test 3 at a temperature of 20° C. to examine high-rate discharge performance, charging efficiency, and cycle life. The results of the tests (average for five batteries) are shown in Table 8. Furthermore, the occurrence of liquid leakage during the tests was visually examined.

TABLE 8

| Section | Amount of electrolytic solution (cm³/Ah) | Discharge capacity in 20° C. 0.2-ItA discharge K (mAh) | Discharge capacity in 3-ItA discharge M (mAh) | Charging efficiency in 1.65-V 15-min charge (%) | Cycle life (cycles) | Liquid leakage |
|---|---|---|---|---|---|---|
| Ex. 36 | 0.40 | 1623 | 681 | 35 | 65 | not occurred |
| Ex. 37 | 0.60 | 1910 | 1491 | 73 | 185 | not occurred |
| Ex. 1 | 0.85 | 2033 | 1840 | 85 | 546 | not occurred |
| Ex. 38 | 1.05 | 2039 | 1881 | 86 | 572 | not occurred |
| Ex. 39 | 1.10 | 2035 | 1890 | 86 | 602 | not occurred |
| Ex. 40 | 1.20 | 2042 | 1905 | 86 | 573 | occurred |
| Comp. Ex. 9 | 1.05 | — | — | 68 | 55 | not occurred |
| Comp. Ex. 10 | 0.40 | — | — | 25 | 38 | not occurred |
| Comp. Ex. 11 | 1.20 | — | — | 74 | 52 | occurred |

As Table 8 shows, the following can be found when each of Example batteries (with a pressure switch function) is compared with the Comparative Example battery (with no pressure switch function) having the same liquid electrolyte amount as the Example battery. Compared to the battery having a liquid electrolyte amount of 0.40 cm³/Ah, the batteries respectively having liquid-electrolyte amounts of 1.05 cm³/Ah and 1.20 cm³/Ah have been markedly improved in charging efficiency in 15-minute charging at 1.65 V and in cycle performance due to the impartation of a pressure switch function to the batteries.

Compared to the battery of Example 36, the batteries of Examples 1 and 37 to 40 are excellent in each of discharge performance in high-rate discharging {M (mAh)}, charging efficiency, and cycle performance. It is thought that the battery of Example 36 had a reduced charging efficiency because the battery had a high internal impedance and, hence, had a lowered charging current and a reduced quantity of charging electricity in charging for a period as short as 15 minutes.

The attainment of a high charging efficiency in charging for a period as short as 15 minutes and of excellent cycle performance in the batteries of Examples 1 and 37 and 40 is attributable to the setting of the liquid-electrolyte amount to 0.6-1.2 cm³/Ah and the impartation of a pressure switch function to the batteries.

In the case of the battery of Example 40, however, liquid leakage was visually observed in each of the five batteries in an initial stage (up to the 50th cycle) in the charge/discharge cycle test. It can be seen from these results that the amount of the liquid electrolyte is preferably from 0.6 cm³/Ah to 1.4 cm³/Ah, more preferably from 0.8 cm³/Ah to 1.05 cm³/Ah.

A detailed explanation on the composition of the aqueous alkali solution as a liquid electrolyte is omitted here. However, the liquid electrolyte to be applied to the battery according to the invention preferably is an aqueous solution of one or more electrolytes consisting mainly of KOH in which the total amount of the electrolytes contained in the liquid electrolyte is 7.5 ±1.5 mol/dm³, as in conventional batteries.

Total electrolyte amounts exceeding 9.0 mol/dm³ or smaller than 6.0 mol/dm³ are undesirable because the battery has an increased internal impedance and undergoes enhanced generation of gases such as hydrogen and oxygen during charge, resulting in a reduced charging efficiency and reduced low-temperature properties.

Incidentally, the electrolytes to be used may be ones consisting mainly of KOH and containing a small amount of LiOH mixed therewith, such as those shown in the Examples. Furthermore, NaOH may be mixed with the KOH although this is not shown in the Examples.

(Fiber Diameter and Material of Major Constituent Material of Separator)

EXAMPLE 41

In Example 38, use was made of separators obtained by sulfonating a nonwoven fabric which was constituted of fibers of a copolymer of ethylene and propylene in a ratio of 1/1 and had a fiber diameter of 0.7 deniers, basis weight of 40 g/m², and thickness of 100 μm.

The other constitutions were the same as in Example 38. (The proportion of sulfo groups incorporated was regulated to 0.3% by weight as in Example 12.)

This battery is referred to as the battery of Example 41.

EXAMPLE 42

In Example 38, use was made of separators obtained by sulfonating a nonwoven fabric which was constituted of fibers of a copolymer of ethylene and propylene in a ratio of 1/1 and had a fiber diameter of 0.5 deniers, basis weight of 40 g/m², and thickness of 100 μm.

The other constitutions were the same as in Example 38.

This battery is referred to as the battery of Example 42.

EXAMPLE 43

In Example 38, use was made of separators obtained by sulfonating a nonwoven fabric which was constituted of fibers of a copolymer of ethylene and propylene in a ratio of 1/1 and had a fiber diameter of 0.3 deniers, basis weight of 40 g/m², and thickness of 100 μm. The other constitutions were the same as in Example 38.

This battery is referred to as the battery of Example 43.

EXAMPLE 44

In Example 38, use was made of separators made of a nonwoven fabric having a fiber diameter after splitting of 0.2 deniers and a thickness of 100 μm, the nonwoven fabric being one obtained by subjecting 60 parts by weight of split composite fibers having a fiber diameter of 3 deniers obtained by subjecting polypropylene and an ethylene/vinyl alcohol copolymer in a ratio of 1:1 by weight to bi-component fiber spinning so as to be arrange alternately in the fiber section and 40 parts by weight of core/sheath type composite fibers having a fiber diameter of 2 deniers comprising polypropylene as a core ingredient and polyethylene as a sheath ingredient to a wet papermaking process to form a sheet having a basis weight of 40 g/m² and then jetting a high-pressure water stream to the sheet to thereby entangle the fibers and simultaneously split the split fibers.

The other constitutions were the same as in Example 38.

This battery is referred to as the battery of Example 44.

COMPARATIVE EXAMPLE 12 AND COMPARATIVE EXAMPLE 13

A battery having the same constitution as the battery of Example 44 was produced, except that the pressure switch was omitted. This battery is referred to as the battery of Comparative Example 12.

A battery having the same constitution as the battery of Example 41 was produced, except that the pressure switch was omitted.

This battery is referred to as the battery of Comparative Example 13.

(Battery Test 9)

With respect to each of the batteries of Examples 41 to 44 and Comparative Examples 12 and 13, five batteries which had undergone forming in the same manner as described above were examined for internal battery pressure during charge and cycle performance at an ambient temperature of 20° C. in the same manners as in Battery Test 4. The results of the tests (average for five batteries) are shown in Table 9.

TABLE 9

| Section | Fiber diameter of separator (denier) | Major constituent material of separator | Gas pressure in battery in 1-ItA 100% charge (MPa) | Charging efficiency in 1.65-V 15-min charge (%) | Cycle life (cycles) |
|---|---|---|---|---|---|
| Ex. 38 | 0.2 | sulfonated E/P copolymer | 1.1 | 86 | 572 |
| Ex. 41 | 0.7 | sulfonated E/P copolymer | 1.9 | 80 | 193 |
| Ex. 42 | 0.5 | sulfonated E/P copolymer | 1.4 | 82 | 267 |
| Ex. 43 | 0.3 | sulfonated E/P copolymer | 1.3 | 84 | 435 |
| Ex. 44 | 0.2 | E/VA copolymer split fiber | 0.9 | 86 | 594 |
| Comp. Ex. 12 | 0.2 | E/VA copolymer split fiber | — | 68 | 56 |
| Comp. | 0.7 | E/VA | — | 66 | 55 |
| Ex. 13 | | copolymer split fiber | | | |

As table 9 shows, the following can be found when each of Example batteries (with a pressure switch function) is compared with the Comparative Example battery (with no pressure switch function) having the same separator fiber diameter as the Example battery. Compared to the battery having a separator fiber diameter of 0.7 deniers, the batteries having a fiber diameter of 0.2 deniers have been markedly improved in charging efficiency in 15-minute charging at 1.65 V and in cycle performance due to the impartation of a pressure switch function to the batteries.

This is thought to be attributable to the use of fibers having a small fiber diameter, which enabled the separator to be dense, have even pore distribution, and be excellent in liquid-electrolyte retention and gas permeability.

The attainment of a high charging efficiency in charging for a period as short as 15 minutes and of excellent cycle performance in the batteries of Examples 38 and 42 to 44 is attributable to the separator-constituting fibers having a diameter of 0.5 deniers or smaller and the impartation of a pressure switch function to the batteries. Compared to the battery of Example 41, the batteries of Examples 42 to 44 are excellent in each of the function of inhibiting the internal battery pressure from increasing during charge and cycle performance. The batteries of Examples 38, 43, and 44 are especially excellent.

Consequently, the fiber diameter of the nonwoven fabric constituting the separators is preferably 0.5 deniers or smaller, more preferably 0.3 deniers or smaller.

Furthermore, a comparison between the batteries of Examples 38 and 44, which are equal in the fiber diameter of the separators, shows that the battery of Example 44 is superior to the battery of Example 38 in both of the function of inhibiting the internal battery pressure from increasing and cycle performance. Consequently, the material of the fibers constituting the separators especially preferably is split fibers comprising an ethylene/vinyl alcohol copolymer and polypropylene.

This is because among the fibers which have been split, those made of the ethylene/vinyl alcohol copolymer are thought to have highly long-lasting hydrophilicity. In the case of split fibers in which one of the two kinds of constituent fibers is non-hydrophilic (in the Example, it corresponds to the polypropylene fibers), it is possible to incorporate hydrophilic groups such as sulfo groups into the non-hydrophilic fibers, although this technique was not employed in this Example.

In each of Examples 41 to 44, the assembly failure which will be described later was not observed.

(Basis Weight and Thickness of Separators)

EXAMPLE 45 TO EXAMPLE 51

In Example 44, the basis weight and thickness of the separators were varied in the ranges of 25-80 g/m² and 40-110 μm, respectively.

Namely, the basis weight and thickness of the separators in each of Examples 45 to 50 were as follows: 25 g/m² and 40 μm in Example 45; 35 g/m² and 70 μm in Example 46; 40 g/m² and 80 μm in Example 47; 40 g/m² and 110 μm in Example 48; 60 g/m² and 100 μm in Example 49; 70 g/m² and 100 μm in Example 50; and 80 g/m² and 100 μm in Example 51. The other constitutions were the same as in Example 44.

In each of Example 45 to Example 51, 50 batteries were assembled and examined for assembly failure (occurrence of internal short-circuiting during assembly).

COMPARATIVE EXAMPLE 14 AND COMPARATIVE EXAMPLE 15

Batteries having the same constitution as the battery of Example 45 were produced, except that the pressure switch was omitted.

Five batteries having no assembly failure were selected.

These batteries are referred to as the battery of Comparative Example 14. Batteries having the same constitution as the battery of Example 51 were produced, except that the pressure switch was omitted.

Five such batteries were produced and are referred to as the battery of Comparative Example 15.

(Battery Test 10)

Five batteries having no assembly failure were selected with respect to each of Examples 45 to 51. These batteries and the batteries of Comparative Examples 14 and 15 were subjected to forming in the same manner as described above. Thereafter, these batteries were examined at an ambient temperature of 20° C. for the function of inhibiting the inner battery pressure from increasing, by the same test method as in Battery Test 8.

The results of the test (average for five batteries) are shown in Table 10.

TABLE 10

| Section | Basis weight of separator (g/m²) | Thickness of separator (μm) | Gas pressure in battery in 1-ItA 100% charge (MPa) | Charging efficiency in 1.65-V 15-min charge (%) | Percentage of assembly failures (%) |
|---|---|---|---|---|---|
| Ex. 45 | 25 | 40 | 0.5 | 83 | 24 |
| Ex. 46 | 35 | 70 | 0.7 | 85 | 0 |
| Ex. 47 | 40 | 80 | 0.9 | 87 | 0 |
| Ex. 44 | 40 | 100 | 0.8 | 86 | 0 |
| Ex. 48 | 40 | 110 | 0.8 | 86 | 0 |
| Ex. 49 | 60 | 100 | 1.1 | 85 | 0 |
| Ex. 50 | 70 | 100 | 1.2 | 82 | 0 |
| Ex. 51 | 80 | 100 | 1.7 | 79 | 0 |
| Comp. Ex. 12 | 40 | 100 | — | 68 | — |
| Comp. Ex. 14 | 25 | 40 | — | 69 | — |
| Comp. Ex. 15 | 80 | 100 | — | 68 | — |

As Table 10 shows, the following can be found when each of Example batteries (with a pressure switch function) is compared with the Comparative Example battery (with no pressure switch function) having the same separator basis weight as the Example battery. Compared to the battery having a basis weight of 80 g/m², the batteries having a basis weight of 70 g/m² or smaller are markedly improved in charging efficiency in 15-minute charging at 1.65 V when a pressure switch function has been imparted to the batteries. It is thought that the battery having a separator basis weight of 80 g/m² had a reduced charging efficiency because the separators had poor gas permeability and, hence, the absorption of gases generating during charge is inhibited and the internal pressure of the battery was apt to increase.

The attainment of a high charging efficiency in charging for a period as short as 15 minutes in the batteries of Examples 45 to 50 is attributable to the separators having a basis weight of 25-70 g/m² and the impartation of a pressure switch function.

In the case of the battery of Example 45, however, assembly failures occurred at a high rate. This is because separator penetration short-circuiting occurred in the step of producing a wound element due to the small basis weight of the separators.

Furthermore, the battery of Example 51 is inferior to the batteries of the other Examples in the effect of inhibiting the internal battery pressure from increasing during charge.

This may be because the oxygen generating at the positive electrode during charge is inhibited from moving toward the negative-electrode side through the separators and being absorbed by the negative electrode, as stated above.

As shown in Table 10, the batteries of Examples 46 to 50 have excellent properties and, in particular, the batteries of Examples 46 to 49 have excellent properties.

As long as the separator basis weight is 40 g/m² or larger, there is no possibility of the occurrence of an assembly failure.

Consequently, the basis weight of the separators is preferably from 35 g/m² to 70 g/m², more preferably 40-60 g/m².

The thickness of each separator is preferably 70-110 μm.

(Hydrogen-Storing Alloy Electrode Containing Catalyst for Hydrogen/Oxygen Gas Absorption Reaction)

EXAMPLE 52

The same constitution as in Example 45 was employed, except that a hydrogen-storing alloy powder containing 2% by weight Raney nickel powder was used as a negative-electrode active material.

The Raney nickel powder was one having an average particle diameter of about 3 μm and obtained by developing an alloy of aluminum and nickel in a ratio of 1/1 by mass in a warm aqueous solution of a caustic alkali by a known method.

This battery is referred to as the battery of Example 52.

EXAMPLE 53

The same constitution as in Example 51 was employed, except that a hydrogen-storing alloy powder containing 0.2% by weight Raney cobalt powder was used as a negative-electrode active material.

The Raney cobalt powder was one having an average particle diameter of about 3 μm and obtained by developing an alloy of aluminum and cobalt in a ratio of 1/1 by mass in a warm aqueous solution of a caustic alkali by a known method.

This battery is referred to as the battery of Example 53.

EXAMPLE 54

The same constitution as in Example 51 was employed, except that a hydrogen-storing alloy powder containing 1% by weight Raney cobalt powder was used as a negative-electrode active material.

This battery is referred to as the battery of Example 54.

EXAMPLE 55

The same constitution as in Example 51 was employed, except that a hydrogen-storing alloy powder containing both 0.5% by weight Raney nickel powder and 0.5% by weight Raney cobalt powder was used as a negative-electrode active material.

This battery is referred to as the battery of Example 55.

COMPARATIVE EXAMPLE 16

A battery having the same constitution as the battery of Example 54 was produced, except that the pressure switch was omitted.

This battery is referred to as the battery of Comparative Example 16.

(Battery Test 11)

Five batteries were prepared with respect to each of the batteries of Examples 52 to 55 and subjected to forming in the same manner as described above. Thereafter, the batteries were subjected to the same tests as in Battery Test 4 to examine the function of inhibiting the internal battery pressure from increasing during charge, charging efficiency, and cycle life.

The results of the tests (average for five batteries) are shown in Table 11.

TABLE 11

| Section | Kind of catalyst contained in negative electrode | Proportion of catalyst in negative electrode (mass %) | Gas pressure in battery in 1-ItA 100% charge (MPa) | Charging efficiency in 1.65-V 15-min charge (%) | Cycle life (cycles) |
|---|---|---|---|---|---|
| Ex. 52 | Raney nickel | 2 | 0.8 | 86 | 630 |
| Ex. 53 | Raney cobalt | 0.2 | 0.6 | 87 | 638 |
| Ex. 54 | Raney cobalt | 0.5 | 0.5 | 88 | 651 |
| Ex. 55 | Raney nickel | 0.5 | 0.5 | 88 | 662 |
|  | Raney cobalt | 0.5 |  |  |  |
| Ex. 44 | — | 0 | 0.9 | 86 | 594 |
| Comp. Ex. 12 | — | 0 | — | 68 | 56 |
| Comp. Ex. 16 | Raney cobalt | 0.5 | — | 70 | 60 |

As Table 11 shows, the following can be found from a comparison among the Example batteries (with a pressure switch function) and the Comparative Example battery (with no pressure switch function) each containing no Raney cobalt in the negative electrode and from a comparison among the Example batteries (with a pressure switch function) and the Comparative Example battery (with no pressure switch function) each containing 0.5% by weight Raney cobalt in the negative electrode. The batteries containing 0.5% by weight Raney cobalt are markedly improved in cycle performance when a pressure switch function has bee imparted to the batteries.

The reason why the batteries containing Raney cobalt in the negative electrode decrease little in performance even in repetitions of charging conducted for a period as short as 15 minutes may be that gas absorption by the negative electrode is accelerated.

The attainment of excellent cycle performance even in repetitions of short-time charging as short as 15 minutes in the batteries of Examples 52 to 55 is attributable to the incorporation of Raney nickel or Raney cobalt in the negative electrode and the impartation of a pressure switch function to the batteries. Compared to the battery of Example 44, the batteries of Examples 52 to 55 each are excellent in the function of inhibiting the internal battery pressure from increasing during charge and in cycle performance.

The N/P ratio is smaller than in related-art batteries, and hydrogen is apt to generate at the negative electrode during high-rate charging.

It is thought that since Raney nickel has a catalytic activity to accelerate a reaction for causing the negative electrode to absorb hydrogen, it shows the effect of inhibiting internal pressure increase in batteries having a lower N/P ratio than batteries heretofore in use in which the N/P ratio exceeds 1.6, as in the battery of Example 52, which has an N/P ratio of 1.25.

In the case where alkaline storage batteries are charged at a high rate, oxygen is apt to generate at the positive electrode during charge. In the batteries of Examples 53 and 54, the Raney cobalt functions as a catalyst to accelerate a reaction for causing the negative electrode to absorb oxygen. It is thought that in batteries intended to be capable of being charged at a high rate as in the invention, the addition of Raney cobalt to the negative electrode enhances the effects of inhibiting the internal battery pressure from increasing during charge.

The battery of Example 55, in which both Raney nickel and Raney cobalt have been added to the negative electrode, shows especially excellent properties among the batteries of the Examples.

The proportions in which Raney nickel and Raney cobalt are to be added to the negative electrode are not particularly limited. However, marked effects are obtained when Raney nickel or Raney cobalt is added in a proportion of 0.2-2% by weight or 0.2-1% by weight, respectively.

(Activation Treatment of Hydrogen-Storing Alloy)

EXAMPLE 56

In Example 44, use was made of a hydrogen-storing alloy powder which had been treated by immersing it in 7 mol/dm³ aqueous KOH solution at a temperature of 100° C. for 1 hour, removing the aqueous KOH solution by filtration, and then water-washing and drying the powder.

The other constitutions were the same as in Example 44. This battery is referred to as the battery of Example 56.

COMPARATIVE EXAMPLE 17

A battery having the same constitution as the battery of Example 56 was produced, except that the pressure switch was omitted. This battery is referred to as the battery of Comparative Example 17.

(Battery Test 12)

The batteries which had undergone forming were tested in the same manners as in Battery Test 4. The results of the tests are shown in Table 12.

TABLE 12

| Section | Alkali treatment of hydrogen-storing alloy | Discharge capacity in 20° C. 0.2-ItA discharge K (mAh) | Gas pressure in battery in 1-ItA 100% charge (MPa) | Charging efficiency in 1.65-V 15-min charge (%) | Cycle life (cycles) |
|---|---|---|---|---|---|
| Ex. 56 | treated | 2041 | 0.6 | 87 | 617 |
| Ex. 44 | not treated | 2029 | 0.9 | 86 | 594 |
| Comp. Ex. 12 | not treated | — | — | 68 | 56 |

TABLE 12-continued

| Section | Alkali treatment of hydrogen-storing alloy | Discharge capacity in 20° C. 0.2-ItA discharge K (mAh) | Gas pressure in battery in 1-ItA 100% charge (MPa) | Charging efficiency in 1.65-V 15-min charge (%) | Cycle life (cycles) |
|---|---|---|---|---|---|
| Comp. Ex. 17 | treated | — | — | 70 | 61 |

As Table 12 shows, the following can be found from comparisons of ones in which the hydrogen-storing alloy has undergone no alkali treatment with ones in which the alloy has undergone the alkali treatment, among the Example batteries (with a pressure switch function) and the Comparative Example batteries (with no pressure switch function). The batteries in which the alloy has undergone the alkali treatment are superior in cycle performance even in repetitions of charging conducted for a period as short as 15 minutes, and are superior also in the effect of inhibiting the internal battery pressure from increasing during charge. Such improvements in performance are thought to have been brought about because the immersion of the hydrogen-storing alloy in an alkaline aqueous solution heightened the activity of the hydrogen-storing alloy as a negative-electrode active material.

The attainment of such excellent performances is attributable to the alkali treatment of the hydrogen-storing alloy and the impartation of a pressure switch function to the battery.

Although an aqueous alkali solution was used in this Example, treatment with an aqueous solution of an inorganic acid such as hydrochloric acid or organic acid such as acetic acid was ascertained to be effective in improving activity.

(Hydrogen-Storing Alloy Electrode Containing Rare-Earth Element)

(Kinds of Rare-Earth Elements)

EXAMPLE 57 TO EXAMPLE 63

The same constitution as in Example 44 was employed, except that use was made of negative electrodes in which the hydrogen-storing alloy powder as a negative-electrode active material contained $Ho_2O_3$, $Er_2O_3$, $Yb_2O_3$, $Tm_2O_3$, $Lu_2O_3$, $Y_2O_3$, and $Ce_2O_3$, respectively, each in an amount of 1% by weight in terms of rare-earth element amount.

These batteries are referred to as the batteries of Example 57, Example 58, Example 59, Example 60, Example 61, Example 62, and Example 63, respectively.

EXAMPLE 64

In Example 64 only, use was made of a negative electrode obtained by a process in which the hydrogen-storing alloy was treated with an aqueous alkali solution in the same manner as in Example 56 and $Yb_2O_3$ was then added to the resultant hydrogen-storing alloy powder in an amount of 1% by weight in terms of elemental ytterbium amount. The other constitutions were the same as in Example 56.

This battery is referred to as the battery of Example 64.

COMPARATIVE EXAMPLE 18 AND COMPARATIVE EXAMPLE 19

A battery having the same constitution as the battery of Example 60 was produced, except that the pressure switch was omitted. This battery is referred to as the battery of Comparative Example 18.

A battery having the same constitution as the battery of Example 64 was produced, except that the pressure switch was omitted.

This battery is referred to as the battery of Comparative Example 19.

(Battery Test 13)

With respect to each of the batteries of the Examples and Comparative Examples, five batteries which had undergone forming in the same manner as described above were prepared. The batteries of Examples 57 to 64 and Comparative Examples 18 and 19 were subjected to the same tests as in Battery Test 4 at an ambient temperature of 20° C. to examine charging efficiency and cycle performance. The results of the tests (average for five batteries) are shown in Table 13.

TABLE 13

| Section | Kind of rare-earth element contained in hydrogen-storing alloy | Content of rare-earth element (mass %) | Discharge capacity in 20° C. 0.2-ItA discharge K (mAh) | Charging efficiency in 1.65-V 15-min charge (%) | Cycle life (cycles) |
|---|---|---|---|---|---|
| Ex. 57 | Ho | 1 | 2031 | 85 | 617 |
| Ex. 58 | Er | 1 | 2020 | 85 | 625 |
| Ex. 59 | Tm | 1 | 2023 | 85 | 626 |
| Ex. 60 | Yb | 1 | 2033 | 85 | 634 |
| Ex. 61 | Lu | 1 | 2015 | 85 | 610 |
| Ex. 62 | Y | 1 | 2026 | 85 | 604 |
| Ex. 63 | Ce | 1 | 2028 | 85 | 611 |
| Ex. 64 | Yb | 1 | 2030 | 86 | 652 |
| Comp. Ex. 18 | Yb | 1 | — | 69 | 52 |
| Comp. Ex. 19 | Yb | 1 | — | 70 | 55 |

Note:
In Example 64 and Comparative Example 19, the hydrogen-storing alloy powder was treated by immersion in aqueous alkali solution.

As shown in Table 13, the batteries of Examples 57 to 64 are superior in cycle performance to the battery of Example 44, which was shown in Table 9, even in repetitions of charging conducted for a period as short as 15 minutes.

Furthermore, the battery of Example 64 is superior in cycle performance to the battery of Example 56 (the hydrogen-storing alloy had undergone alkali treatment as in Example 64), which was shown in Table 12.

This effect is thought to have been brought about because the addition of any of the rare-earth elements ranging from Ho to Yb and Ce improved the corrosion resistance of the hydrogen-storing alloy and thereby inhibited the alloy from being corroded by the oxygen generating at the positive electrode during charge.

Moreover, with respect to the battery of Example 64, it is thought that the treatment of the hydrogen-storing alloy powder with an aqueous alkali solution inhibited oxygen from generating at the positive electrode during charge and, hence, better cycle performance was obtained.

The attainment of excellent cycle performance in the batteries of Examples 57 to 64 even in repetitions of charging conducted for a period as short as 15 minutes, as shown in Table 13, is attributable to the incorporation of any of the aforementioned rare-earth elements in the negative electrode and the impartation of a pressure switch function to the batteries.

(Comparison between Charging Modes: Battery Test 14)

EXAMPLE 65

Five batteries of Example 64 were prepared. The batteries which had undergone forming were charged at a current of 4

ItA to a final charge voltage of 1.65 V, with the maximum charging time being 15 minutes (comparative charging mode). Thereafter, the batteries were discharged at a current of 0.2 ItA to a cut-off voltage of 1.0 V.

The proportion of the discharge capacity obtained through this discharge to discharge capacity obtained in the same operation as described above comprising 16-hour charging at a current of 0.1 ItA and subsequent discharging at a current of 0.2 ItA to a cut-off voltage of 1.0 V was taken as the charging efficiency in Example 65.

Batteries were charged at a current of 4 ItA for 15 minutes and discharged at 1 ItA to a cut-off voltage of 0.9 V. This charge/discharge as one cycle was repeatedly conducted. The number of cycles required for the discharge capacity to decrease to 80% of the discharge capacity in the first cycle in this cycling was taken as the cycle life in Example 65.

The results of the tests are shown in Table 14.

TABLE 14

| Section | Mode of charging | Charging efficiency (%) | Cycle life (cycles) |
|---|---|---|---|
| Ex. 65 | 15-min charging at constant current of 4 ItA | 76 | 446 |
| Ex. 64 | 15-min charging at constant voltage of 1.65 V | 86 | 652 |

As shown in Table 14, charging in the constant-voltage charging mode shown as Example 64 attains a higher charging efficiency than the constant-current charging in Example 65 conducted for the same charging time, i.e., 15 minutes, as in the former charging.

This is an effect brought about by the impartation of a pressure switch function and/or a temperature switch function to the sealed alkaline storage battery and by combining this function with the constant-voltage charging mode. As shown above, constant-voltage charging is preferred among various charging modes.

(Charging Voltage in Constant-Voltage Charging: Battery Test 15)

EXAMPLE 66 TO EXAMPLE 69

In Example 64, the charging voltage was varied in the range of 1.45-1.8 V.

Namely, the charging voltage was changed to 1.45 V, 1.5 V, 1.7 V, and 1.8 V. The other conditions were the same as in Example 64.

These charging methods are referred to the charging methods of Example 66, Example 67, Example 68, and Example 69, respectively.

Furthermore, a temperature sensor was attached to the side surface of each battery to measure the battery temperature.

COMPARATIVE EXAMPLE 20 AND COMPARATIVE EXAMPLE 21

In the charging methods of Examples 66 and 69, batteries having no pressure switch were used as the batteries to be charged.

These charging operations are referred to as Comparative Example 20 and Comparative Example 21, respectively. The results of the tests (average for five batteries) are shown in Table 15.

Figure 5:
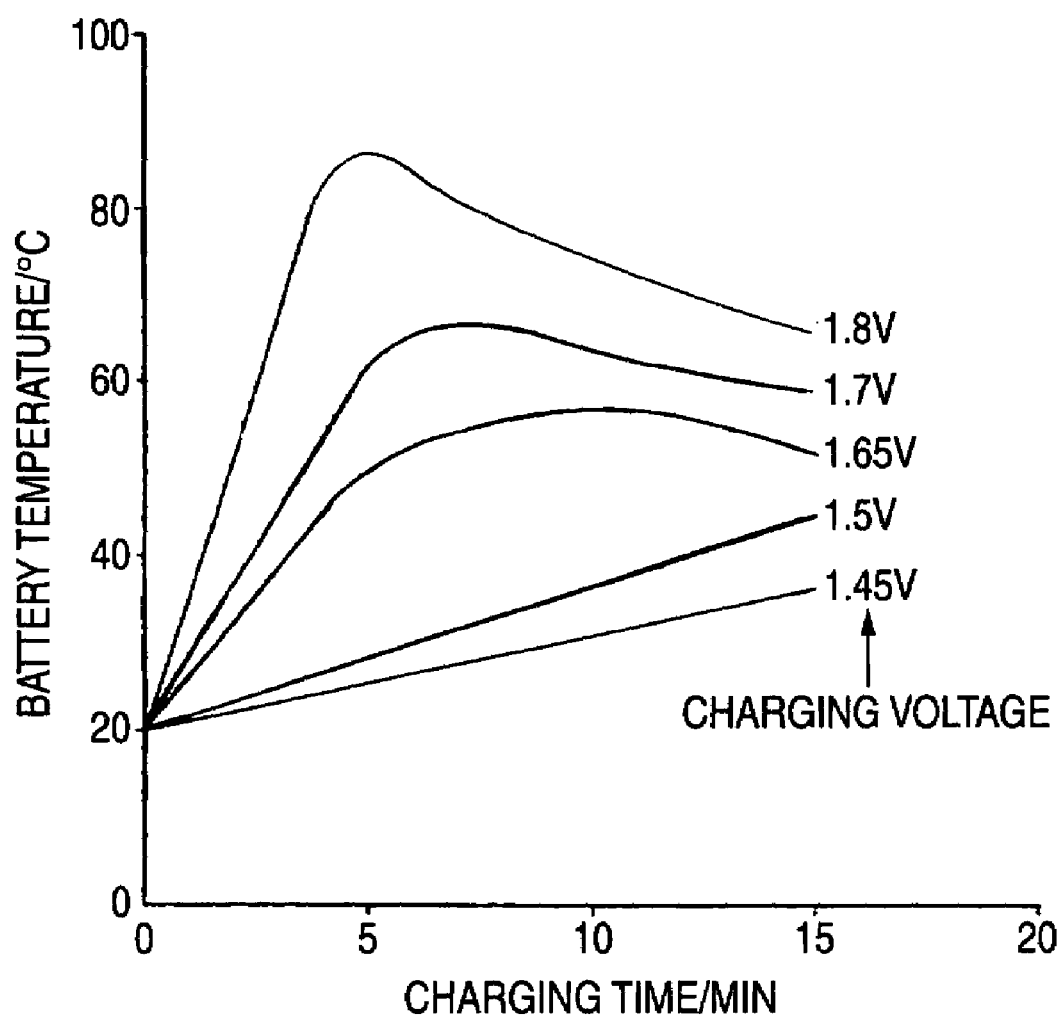
FIG. 5 is a graphic presentation showing battery temperatures measured when the batteries of Examples according to the invention were charged at a current voltage.

The battery temperatures during charge in the first cycle are shown in FIG. 5.

TABLE 15

| Section | Charging voltage (V) | Discharge capacity in 20° C. 0.2-ItA discharge K (mAh) | Discharge capacity after 15-min charge at constant voltage L (mAh) | Charging efficiency in constant-voltage charge (%) |
|---|---|---|---|---|
| Ex. 66 | 1.45 | 2035 | 1282 | 63 |
| Ex. 67 | 1.5 | 2031 | 1563 | 77 |
| Ex. 64 | 1.65 | 2033 | 1769 | 87 |
| Ex. 68 | 1.7 | 2030 | 1644 | 81 |
| Ex. 69 | 1.8 | 2032 | 1524 | 75 |
| Comp. Ex. 20 | 1.45 | — | — | 63 |
| Comp. Ex. 19 | 1.65 | — | — | 70 |
| Comp. Ex. 21 | 1.8 | — | — | 67 |

Example 67, Example 64, and Example 68 attain a high charging efficiency as shown in Table 15.

Consequently, the charging voltage is preferably 1.5-1.7 V. In the case of Example 69, the internal pressure of the battery reached the specified value in a short time after the initiation of charging, resulting in a prolonged pause of charging. It is thought that this was causative of the reduced charging efficiency in Example 69 in the charging conducted for a period as short as 15 minutes.

Furthermore, the battery temperature in Example 69 during charge exceeds 90° C. This is undesirable because the deterioration of materials constituting the battery proceeds with repetitions of charging and this may impair cycle characteristics.

(Second Sealed Alkaline Storage Battery According to the Invention: Batteries Having N/P Ratio Exceeding 1.45)

EXAMPLE 70

(Production of Positive-Electrode Active Material)

A positive-electrode active material comprising nickel hydroxide as the main component was produced in the same manner as in Example 1.

However, the oxidation treatment and heat treatment of the positive-electrode active material synthesized were omitted.

The average oxidation number of the transition metal elements (Ni and Co) contained in the active material was determined by the same method as in Example 1. As a result, the average oxidation number thereof was 2.0.

(Production of Nickel Electrode)

The positive-electrode active material having an average oxidation number of transition metal elements (Ni and Co) of 2.0 was used to produce a nickel electrode having a discharge capacity of 1,600 mAh for cylindrical batteries (AA size) in the same manner as in Example 1, except that the addition of a $Yb_2O_3$ powder was omitted.

(Production of Negative Electrode)

The same hydrogen-storing alloy powder as in Example 1 was used to produce a hydrogen-storing alloy electrode having a discharge capacity of 2,400 mAh for cylindrical batteries (AA size) in the same manner as in Example 1.

(Production of Cylindrical Nickel/Metal-Hydride Battery)

The nickel electrode (positive electrode) having a discharge capacity of 1,600 mAh was used in combination with the hydrogen-storing alloy electrode (negative electrode) having a discharge capacity of 2,400 mAh to produce a cylindrical nickel/metal-hydride battery (AA size) having an N/P of 1.5 in the same manner as in Example 1.

However, the amount of the liquid electrolyte to be introduced was changed to 2.0 cm³. A pressure switch function was imparted to the nickel/metal-hydride battery as in Example 1.

However, the operating pressure for the pressure switch was regulated to 0.5 MPa. This battery is referred to the battery of Example 70.

EXAMPLE 71 TO EXAMPLE 73

In Example 70, the operating pressure for the pressure switch was regulated to 0.3 MPa.

The other constitutions were the same as in Example 70. This Example is referred to as the battery of Example 71.

In Example 70, the operating pressure for the pressure switch was regulated to 1.0 MPa. The other constitutions were the same as in Example 70. This Example is referred to as the battery of Example 72.

In Example 70, the operating pressure for the pressure switch was regulated to 2.0 MPa. The other constitutions were the same as in Example 70.

This Example is referred to as the battery of Example 73.

COMPARATIVE EXAMPLE 22

In Example 70, a sealed storage battery having no pressure switch function was produced.

The other constitutions were the same as in Example 70. This battery is referred to as the battery of Comparative Example 22.

EXAMPLE 74

In Example 70, the discharge capacity of the negative electrode was changed to 2,720 mAh. The other constitutions were the same as in Example 70. (The N/P is 1.7).

This battery is referred to as the battery of Example 74.

EXAMPLE 75 TO EXAMPLE 77

In Example 74, the operating pressure for the pressure switch was regulated to 0.3 MPa.

The other constitutions were the same as in Example 74. This Example is referred to as the battery of Example 75. In Example 74, the operating pressure for the pressure switch was regulated to 1.0 MPa.

The other constitutions were the same as in Example 74. This Example is referred to as the battery of Example 76. In Example 74, the operating pressure for the pressure switch was regulated to 2.0 MPa.

The other constitutions were the same as in Example 74. This battery is referred to as the battery of Example 77.

COMPARATIVE EXAMPLE 23

In Example 74, a sealed battery having no pressure switch function was produced.

This battery is referred to as the battery of Comparative Example 23.

(Forming)

With respect to each of the nickel/metal-hydride batteries of Examples 70 to 77 and Comparative Examples 22 and 23, five batteries were prepared.

These batteries were subjected to forming under the same conditions as in Example 1.

(Battery Test 16)

Figure 6:
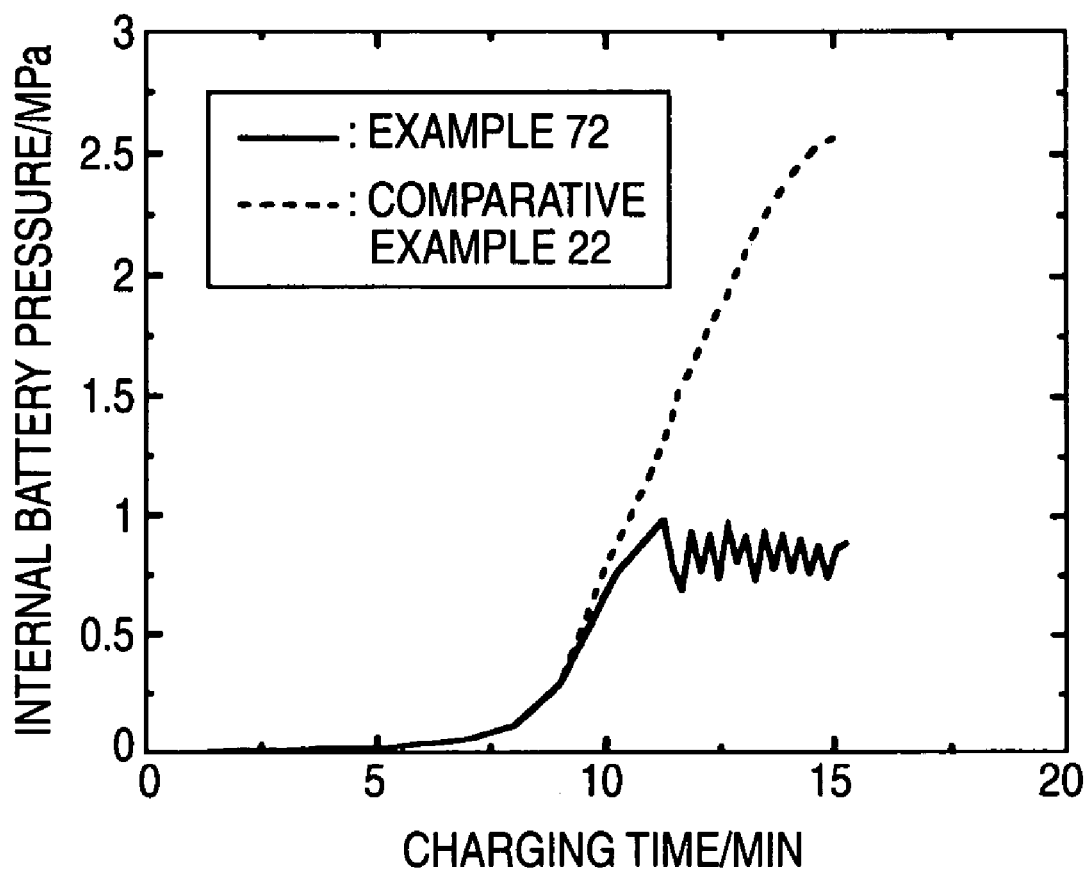
FIG. 6 is a graphic presentation showing internal battery pressures measured when the battery of an Example according to the invention and the battery of a Comparative Example were charged.
Figure 7:
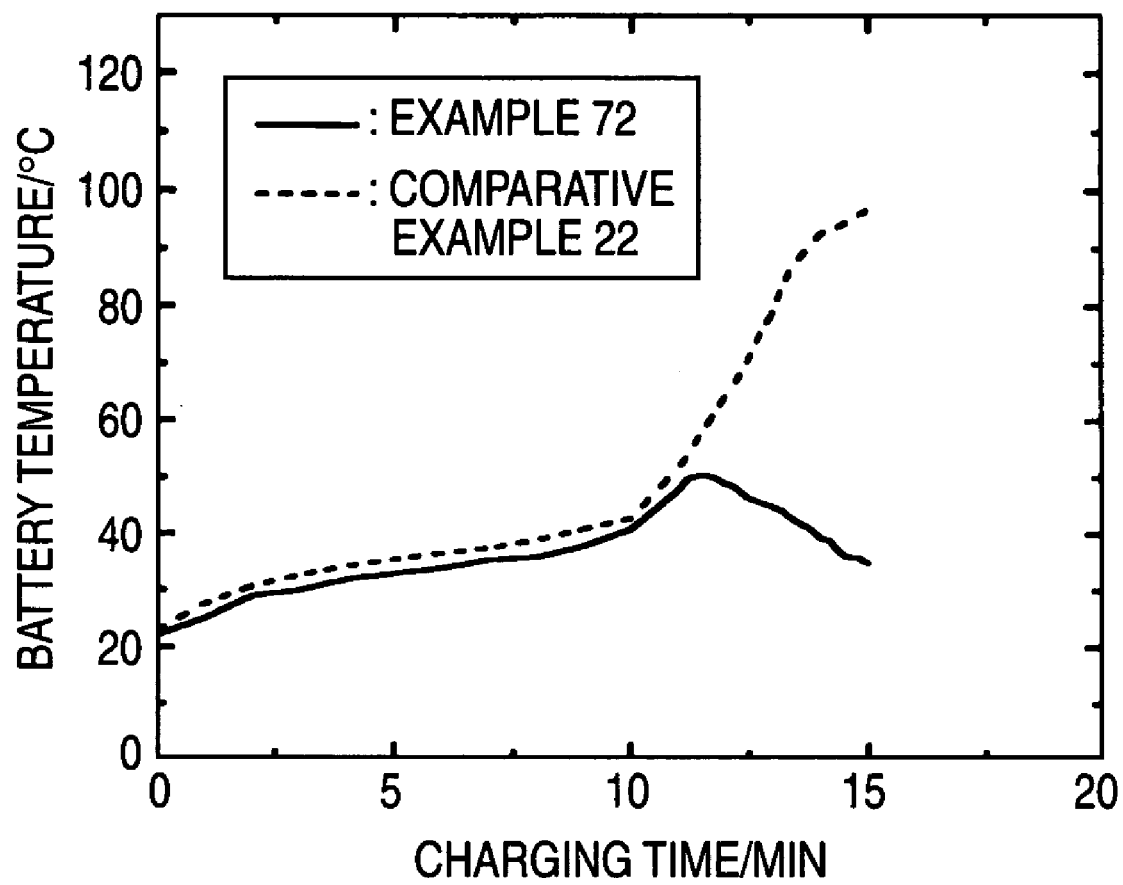
FIG. 7 is a graphic presentation showing battery temperatures measured when the battery of the Example according to the invention and the battery of the Comparative Example were charged.

The nickel/metal-hydride batteries which had undergone forming were subjected to the same tests as in Battery Test 1 at a temperature of 20° C. The internal battery pressures and battery temperatures (temperatures of battery side surfaces) of the batteries of Example 72 and Comparative Example 22, as measured in 15-minute constant-voltage charging at 1.65 V, are shown in FIG. 6 and FIG. 7, respectively.

The results of the tests of the batteries of Examples 70 to 77 and Comparative Examples 22 and 23 are shown in Table 16.

TABLE 16

| Section | Negative-electrode capacity/positive-electrode capacity proportion (N/P) | Specified value of gas pressure in battery (MPa) | Discharge capacity in 20° C. 0.2-ItA discharge K (mAh) | Maximum temperature in 1.65-V 15-min charge (° C.) | Charging efficiency in 1.65-V 15-min charge (%) | Cycle life (cycles) |
|---|---|---|---|---|---|---|
| Ex. 70 | 1.5 | 0.5 | 1615 | 43 | 87 | 543 |
| Ex. 71 | 1.5 | 0.3 | 1616 | 35 | 80 | 656 |
| Ex. 72 | 1.5 | 1.0 | 1609 | 51 | 90 | 528 |
| Ex. 73 | 1.5 | 2.0 | 1618 | 77 | 85 | 448 |
| Ex. 74 | 1.7 | 0.5 | 1616 | 41 | 89 | 611 |
| Ex. 75 | 1.7 | 0.3 | 1611 | 35 | 82 | 693 |
| Ex. 76 | 1.7 | 1.0 | 1614 | 54 | 90 | 623 |
| Ex. 77 | 1.7 | 2.0 | 1619 | 79 | 85 | 575 |
| Comp. Ex. 22 | 1.5 | no pressure switch | — | 97 | 65 | 48 |
| Comp. Ex. 23 | 1.7 | no pressure switch | — | 95 | 67 | 52 |

In the case of the battery of Example 72, the pressure switch attached to the battery functions to regulate the internal pressure of the battery so as not to exceeds 1 MPa, as shown in Table 6. The temperature of the battery surface during charge is lower than 60° C. as shown in FIG. 7.

In contrast, in the case of the storage battery of Comparative Example 22, the battery temperature during charge rises far beyond 80° C., which is a preferred upper limit of temperature, as shown in FIG. 7 because this battery has no pressure switch function.

Like the battery of Comparative Example 1, the battery of Comparative Example 22 was inferior in both charging efficiency and cycle performance.

As shown in Table 16, the battery temperatures during charge of the nickel/metal-hydride batteries of Examples 70 to 72 and 74 to 76 are regulated so as to be not higher than 60° C., which is an especially preferred upper limit of temperature.

This effect is thought to have been obtained because the pressure switch functioned to repeat charge on/off switching and the battery temperature was hence inhibited from rising.

In contrast, the battery temperatures during charge of the batteries of Examples 73 and 77 exceed 60° C., which is an especially preferred upper limit of temperature, although lower than 80° C., which is a preferred upper limit of temperature for alkaline storage batteries.

The reasons for these results are thought to be as follows. Since batteries having an N/P exceeding 1.45 are superior to batteries having an N/P of 1.45 or lower in the function of absorbing gases generating during charge, the internal battery pressure is inhibited from rising during charge. In addition, the gas-absorbing reactions generate a large quantity of heat and this accelerates the battery temperature increase during charge. Because of these, the battery temperature rose beyond 60° C. before the pressure switch worked.

These are thought to be reasons for that the batteries of Examples 73 and 77 are inferior in cycle performance to the batteries of the other Examples.

Specified values of internal battery pressure exceeding 2.0 MPa are undesirable because there is a high possibility that the battery temperature during charge might exceed 80° C., which is a preferred upper limit of temperature, although a detailed explanation on this point is omitted. Furthermore, the batteries of Examples 71 and 75 have a low discharge capacity and a low charging efficiency.

The reason for this may be that since the operating pressure for the pressure switch had been set at a low value, the pressure switch worked in an early state after charging initiation, resulting in an increased proportion of charge-off periods.

It was found from the results shown in Table 16 that in sealed alkaline storage batteries having an N/P ratio exceeding 1.45, the specified value of internal battery pressure at which the charging is made off (the set value of the operating pressure for the pressure switch) is preferably 0.5-2.0 MPa, more preferably 0.5-1.0 MPa.

The batteries of Comparative Examples 22 and 23 are inferior to the batteries of Examples 70-77 in both charging efficiency and cycle performance.

This may be because the battery temperature during charge of each of the batteries of the Comparative Examples far exceeded 80° C., which is a preferred upper limit of temperature.

Also in the second sealed alkaline storage battery according to the invention, the chemical or electrochemical oxidation treatment of the positive-electrode active material, addition of a rare-earth element or calcium to the positive electrode, addition of a rare-earth element to the negative electrode, addition of Raney cobalt or Raney nickel to the negative electrode, activation treatment of the hydrogen-storing alloy powder, regulation of the fiber diameter and basis weight of the separators, and the like can be applied as in the first sealed alkaline storage battery according to the invention, although such constitutions were not shown in the Examples for the second sealed alkaline storage battery according to the invention.

The explanations given above were made on nickel/metal-hydride batteries, as examples, which include a negative electrode employing a hydrogen-storing alloy as an active material. However, the invention should not be construed as being limited to nickel/metal-hydride batteries and is applicable also to nickel-cadmium batteries employing cadmium in the negative electrode.

EMBODIMENT 1 OF ELECTRODE STRUCTURE

A preferred embodiment of the electrode structure of the invention will be explained below by reference to accompanying drawings.

Figure 10:
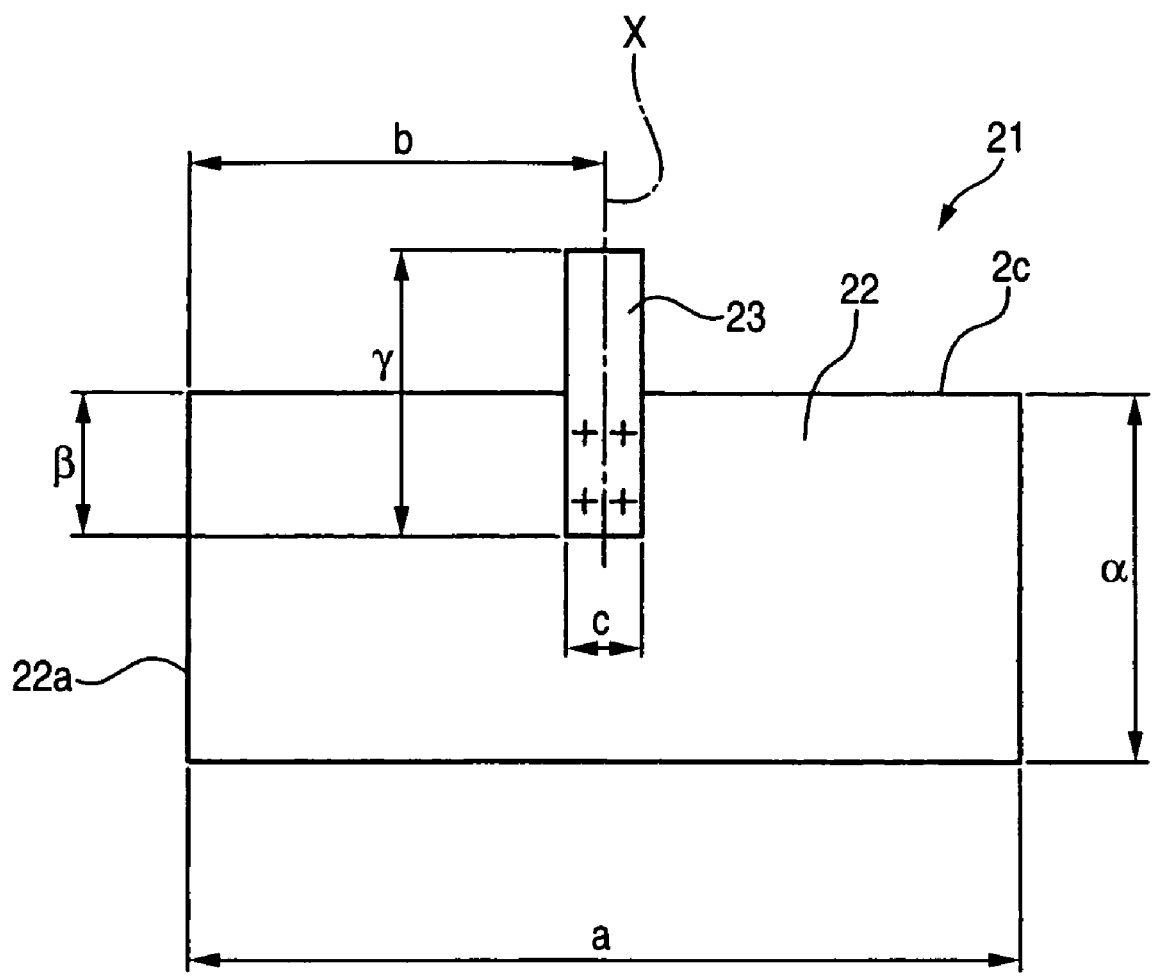
FIG. 10 is a front view of an electrode structure according to one embodiment of the invention; the view shows the state before being spirally wound.

FIG. 10 is a front view of an electrode structure 21 according to this embodiment; the view shows the state before being spirally wound.

Figure 11:
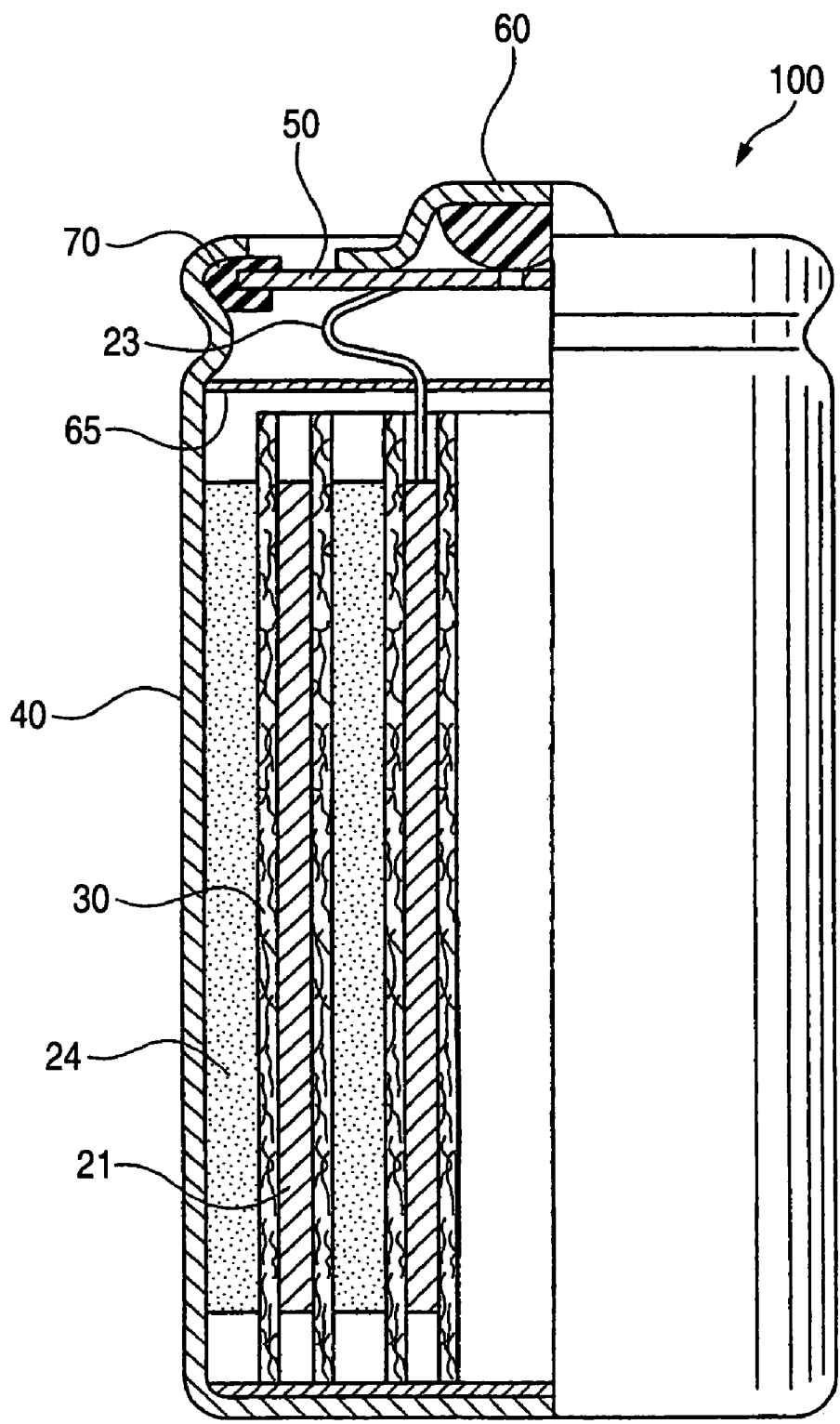
FIG. 11 is a diagrammatic view illustrating a sectional structure of a storage battery employing the electrode structure shown in FIG. 10.

FIG. 11 is a partly vertical sectional view of a storage battery 100 employing the electrode structure 21 according to this embodiment.

Figure 12:
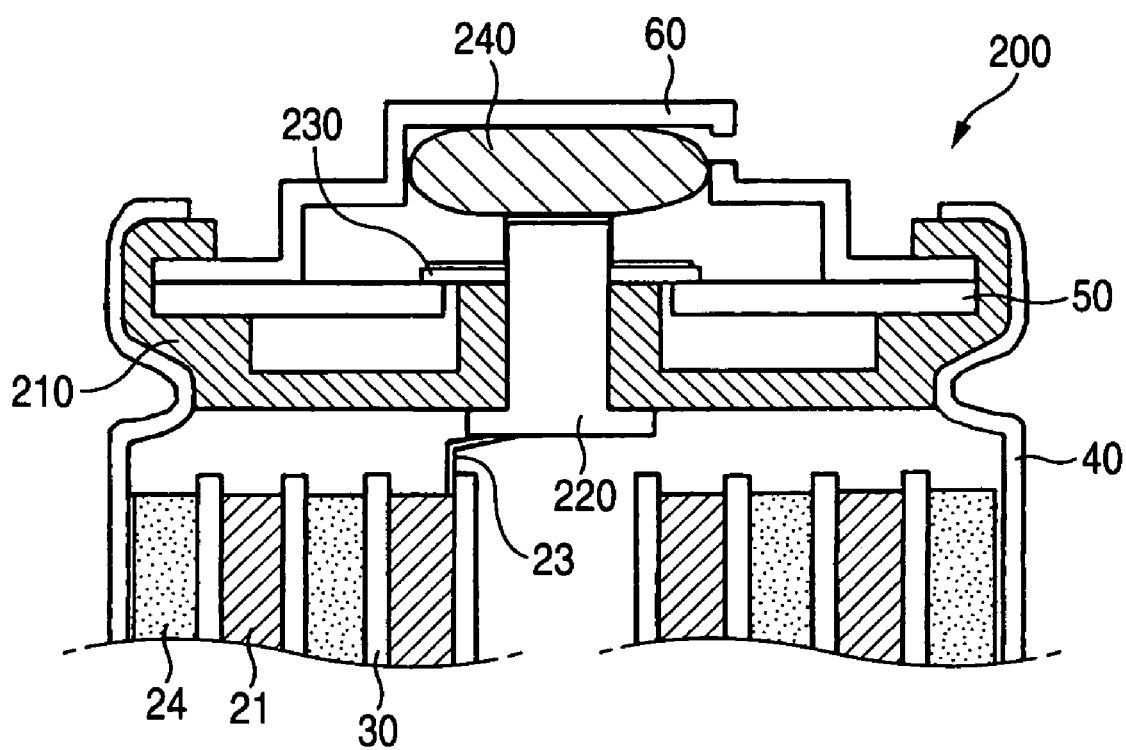
FIG. 12 is a diagrammatic view illustrating a sectional structure of a storage battery employing the electrode structure shown in FIG. 10.

FIG. 12 is a sectional view of an important part of a storage battery 200 as another embodiment employing the electrode structure 21 according to this embodiment.

First, the constitution of the storage battery 100 employing the electrode structure 21 according to this embodiment will be roughly explained.

As shown in FIG. 11, the storage battery 100 comprises: a positive electrode 21 and a negative electrode 24 which have been spirally wound in a stacked state; separators 30 which have been interposed between the positive electrode 21 and negative electrode 24 and serve to insulate the electrodes from each other; a case 40 in which these members are packed; a battery lid 50 which closes the opening of the case 40; and a cap 60 for external connection which has been connected to the battery lid 50.

Numeral 65 in FIG. 11 denotes an insulating plate having an opening through which a positive-electrode lug 3, which will be described later, extends. Namely, the positive-electrode lug 3 is bonded to the battery lid 50 while extending through the opening of the insulating plate 65. Numeral 70 denotes a gasket which seals the gap between the periphery of the battery lid 50 and the inner circumferential surface of the case 40.

As a negative-electrode active material with which the negative electrode 24 is to be impregnated can be used, for example, a hydrogen-storing alloy. As a liquid electrolyte to be introduced into the case 40 can be used, for example, an aqueous solution of one or more alkalis comprising potassium hydroxide as the main component. Furthermore, as the separators 30 can preferably be used, for example, ones which have undergone a hydrophilizing treatment.

The battery shown in FIG. 12, which includes the battery structure, is a battery according to the battery embodiment equipped with the pressure switch function. This battery has, in an electric circuit connecting a positive electrode 21 and a cap 60 for external connection, a function which changes the electric circuit from on to off or from off to on according to the degree of pressure.

Namely, the positive electrode 21 and the cap 60 for external connection have been connected to each other through a positive-electrode lug 23, a metallic connecting member 220, a metallic connecting ring 230, and a battery lid 50 bonded to the cap 60 for external connection.

A sealing member 210 comprising a synthetic resin molding, the case 40, and the connecting member 220 which extends through a through-hole formed in a central part of the sealing member are in hermetic contact with one another, whereby the space inside the battery is gastightly sealed.

That part of the sealing member 210 which surrounds the through-hole formed in a central part thereof has a reduced thickness to thereby impart flexibility to the sealing member 210. Thus, the connecting member 220 fitted into the sealing member 210 is movable in upward/downward directions on the figure.

In an ordinary state (the state in which the internal pressure of the battery remains low), the connecting member 220 is in the state of being pushed downward on the figure by an elastic object 240 disposed on the inner side of the cap for external connection. Namely, the connecting ring 230 bonded to the connecting member 220 is in contact with the metallic lid 50 and the electric circuit is in an on state. When the internal pressure of the battery increases and has become higher than the pressing force of the elastic object 240, then the connecting member 220 and the connecting ring 230 bonded to the connecting member 220 are pushed upward on the figure. As a result, the connecting ring 230 separates from the metallic lid 50 and the electric circuit is changed from on to off.

When the internal pressure of the battery has decreased, the connecting member 220 and the connecting ring 230 bonded to the connecting member 220 are pushed downward on the figure. As a result, the connecting ring 230 comes into contact with the metallic lid 50 and the electric circuit is changed from off to on.

In the invention, the internal battery pressure at which the pressure switch function changes the electric circuit from on to off (pressure at which the pressure switch functions) can be regulated, for example, by changing the modulus of elasticity of the elastic object.

In the invention, the pressure at which the pressure switch functions is not particularly limited. However, it is preferably 0.5-3 megapascals (MPa), more preferably 1-2.5 MPa. In case where the pressure at which the pressure switch functions is lower than 0.5 MPa, there is a possibility that the proportion of electric-circuit-off periods in the charging time might be high, resulting in a reduced charging efficiency.

In case where the pressure at which the pressure switch functions exceeds 3 MPa, there is a possibility that the battery temperature during charge might rise to exert adverse influences on battery characteristics.

As will be described later, the battery according to the invention is a battery which has been obtained by applying the electrode structure 21 to a battery having the pressure switch function and which hence has a further heightened charging efficiency in rapid charging.

The electrode structure 21 according to this embodiment is explained next. As shown in FIG. 10, the electrode structure 21 comprises an electrode substrate 22 and a single lug 23 bonded to the electrode substrate.

As shown in FIG. 10, the electrode substrate 22 has a rectangular shape with a longer-direction width of a and a shorter-direction width of α and is capable of being spirally wound, with one of the shorter sides facing toward the center. More particularly, the electrode substrate 22 comprises a porous substrate and an active material with which the porous substrate is impregnated.

The porous substrate can be, for example, a foamed metal, e.g., foamed nickel, metal fiber sinter, e.g., nickel fiber sinter, metal particle sinter, perforated metal sheet, or perforated metal sheet having surface irregularities.

The basis weight of the porous substrate can be 250-600 $g/m^2$, preferably 350-500 $g/m^2$, more preferably 400-450 $g/m^2$.

Basis weights thereof smaller than 250 $g/m^2$ are undesirable because such a substrate has low conductivity, resulting in a reduced charging efficiency in high-rate charging and a reduced discharging efficiency in high-rate discharging.

Furthermore, such a substrate has low mechanical strength and this may lead to the occurrence of battery assembly failures. In case where the basis weight thereof exceeds 600 $g/m^2$, the nickel electrode has a reduced porosity and ion movement within the electrode is inhibited, resulting in a possibility that suitability for rapid charging might decrease.

In addition, since such an electrode has increased hardness, there is a possibility that electrode winding might be difficult.

As the active material can be used various materials as long as they function to contribute to power-generating reactions of the electrode for batteries. For example, in a nickel electrode for alkaline storage batteries, the active material can preferably be one which comprises nickel hydroxide as the main component and a cobalt compound disposed on the surface thereof.

The lug 23 can have any of various shapes. In this embodiment, the lug 23 has a rectangular shape with a shorter-direction width of c and a longer-direction width of γ, from the standpoints of ease of production and suitability for connection to the battery lid.

The material of the lug is not particularly limited and a nickel plate can, for example, be used.

The lug 23 has been bonded to the electrode substrate 22 in such a state that the shorter direction for the lug 23 coincides with the longer direction for the electrode substrate 22 and that the longer direction for the lug 23 coincides with the shorter direction for the electrode substrate 22.

Furthermore, the lug 23 has been bonded in such a position that the distance b between the width-direction center line X thereof (the virtual bisector passing through the positions corresponding to one-half the shorter-direction width c of the lug) and one shorter side 22a of the electrode substrate 22 satisfies the following relationship with the longer-direction width a of the electrode substrate: $0.3a \leq b \leq 0.6a$. This produces the following effects.

Namely, in case where b<0.3a, a specific part of the electrode substrate 22 is considerably apart from the lug 23.

For example, in case where b<0.3a, a right lower region in the electrode substrate 22 in FIG. 10 is considerably apart from the lug 23.

In such case, the efficiency of charging in that specific part is impaired, resulting in impaired charge/discharge characteristics, etc.

Furthermore, in case where b<0.3a, the lug 23 in the electrode substrate 22 in the state of being spirally wound is located close to the center of the "spiral".

Figure 13:
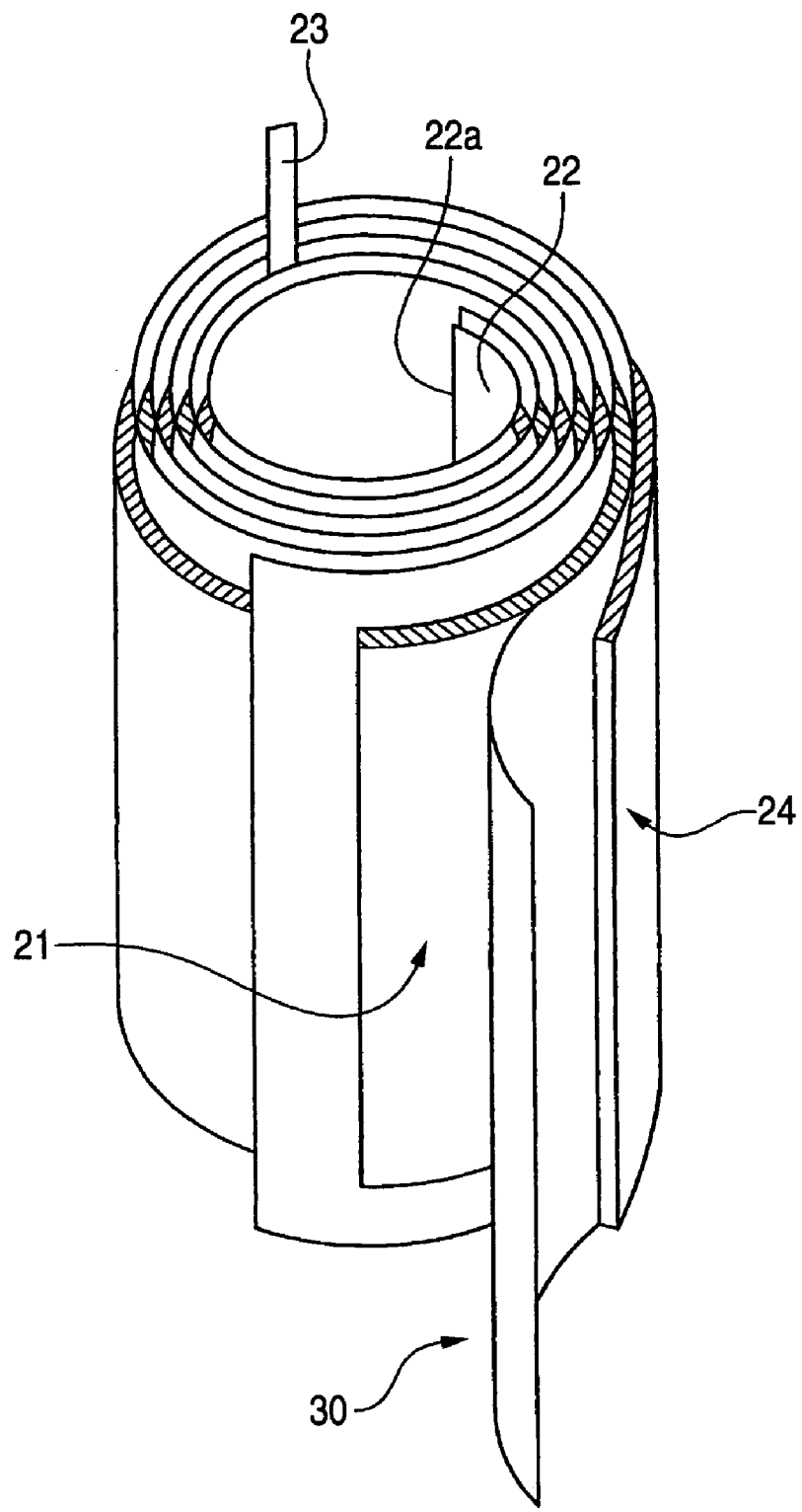
FIG. 13 is a slant view of an assembly which comprises a positive electrode comprising the electrode structure shown in FIG. 10 and FIG. 11, a negative electrode, and separators and has been spirally wound.

In FIG. 13 is shown a slant view of the state in which the positive electrode 21, a negative electrode 24, and separators 30 have been spirally wound. As shown in FIG. 13, the radius of curvature of the "spiral" becomes smaller as the distance from the center becomes shorter.

Consequently, when the lug 23 is located too close to the center of the "spiral", this poses a problem that formation of this spiral is difficult due to the rigidity of the lug 23.

Likewise, in case where b>0.6a, there is a problem that a specific region in the electrode substrate 22 is considerably apart from the lug 23.

Furthermore, when b>0.6a and this positive electrode 21 is spirally wound together with a negative electrode 24 and separators 30, the lug 23 is located too close to the outer periphery of the "spiral", resulting in a possibility that the lug 23 might come into contact with, e.g., the inner wall of the case 40 to cause short-circuiting (see FIG. 11). In addition, such a position of the lug 23 is disadvantageous because there is the necessity of increasing the length of the lug.

From these standpoints, the lug 23 in this embodiment is located so as to satisfy $0.3a \leq b \leq 0.6a$. Thus, the coefficient of active-material use and charging characteristics can be improved while effectively preventing the lug 23 from causing short-circuiting.

More preferably, the electrode structure can be constituted so that when the length of that region of the lug 23 which overlaps the electrode substrate 22 is expressed by β, then the a, c, α, β, and γ satisfy the following relationships.

$$0.02 \leq c/a \leq 0.07$$

$$0.065 \leq \beta/\alpha \leq 0.45$$

$$0.1 \leq \beta/\gamma \leq 0.75$$

Namely, in case where $c/a<0.02$, the electrode substrate 22 has increased resistance. On the other hand, in case where $c/a>0.07$, the area of that part of the electrode substrate 22 on which an active material can be filled is reduced and a sufficient increase in capacity is difficult to attain.

In case where $\beta/\alpha<0.065$, that region of the lug 23 which overlaps the electrode substrate 22 has a reduced area. As a result, not only resistance between the two members increases, but also a sufficient strength of bonding between these is difficult to secure, resulting in a possibility that assembly failures might occur more frequently.

On the other hand, in case where $\beta/\alpha>0.45$, the area of that part of the electrode substrate 22 on which an active material can be filled is reduced and a sufficient increase in capacity is difficult to attain, although an improvement in bonding strength and a reduction in resistance can be attained.

Furthermore, in case where $\beta/\gamma<0.1$, that region of the lug 23 which overlaps the electrode substrate 22 has a reduced area. As a result, not only resistance between the two members increases, but also a sufficient strength of bonding between these is difficult to secure, resulting in a possibility that assembly failures might occur more frequently.

On the other hand, in case where $\beta/\gamma>0.75$, the area of that part of the electrode substrate 22 on which an active material can be filled is reduced and a sufficient increase in capacity is difficult to attain, although an improvement in bonding strength and a reduction in resistance can be attained. In addition, there also is a problem that bonding between the battery lid 50 and the lug 23 is difficult.

Incidentally, the lug 23 can be formed from various electrically conductive materials capable of being bonded to the electrode substrate 22. The lug has a thickness of, for example, from 0.05 mm to 0.3 mm, preferably from 0.1 mm to 0.2 mm.

Figure 14A:
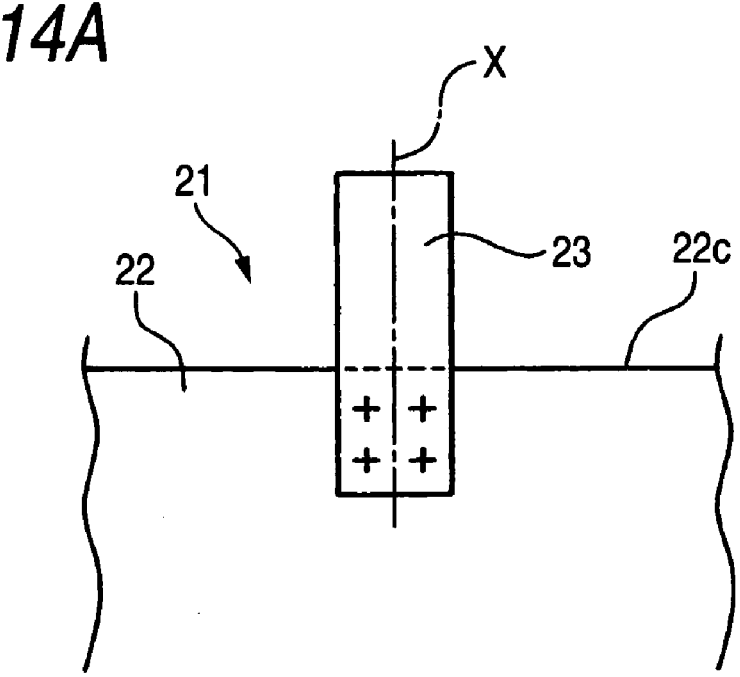
FIG. 14 is enlarged views illustrating the structure of the weld between the electrode substrate and the lug in the electrode structure shown in FIG. 10.

From the standpoints of strength and resistance, bonding between the lug and the electrode substrate preferably is welding. The welding preferably is spot welding such as that shown in FIG. 14A, from the standpoints of strength and workability.

Figure 14B:
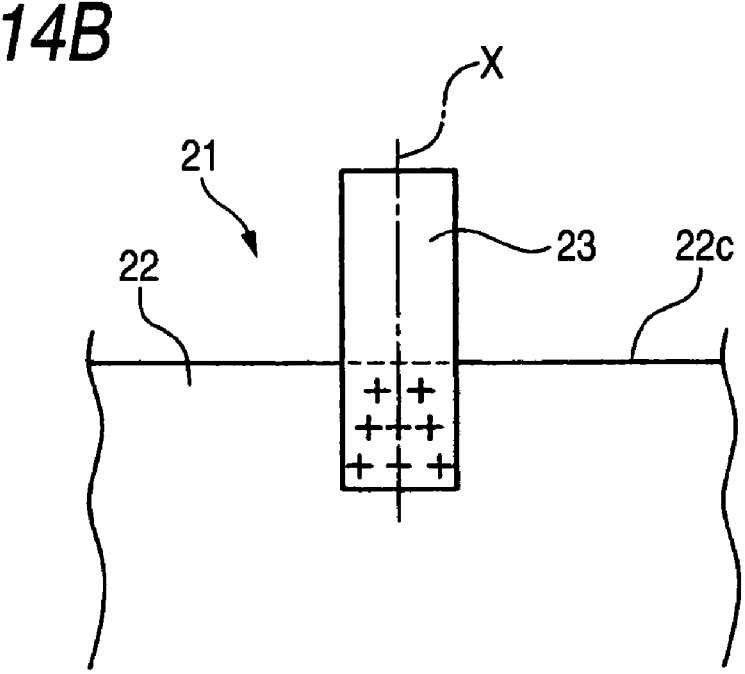

More preferably, the spot welding can be conducted on weld spots radially arranged around the point of intersection of the center line X of the lug 23 and that longer side 22c of the electrode substrate 22 to which the lug 23 is bonded, as shown in FIG. 14B.

By employing this constitution, the charging efficiency can be improved throughout the whole electrode substrate 22.

EMBODIMENT 2

Figure 15:
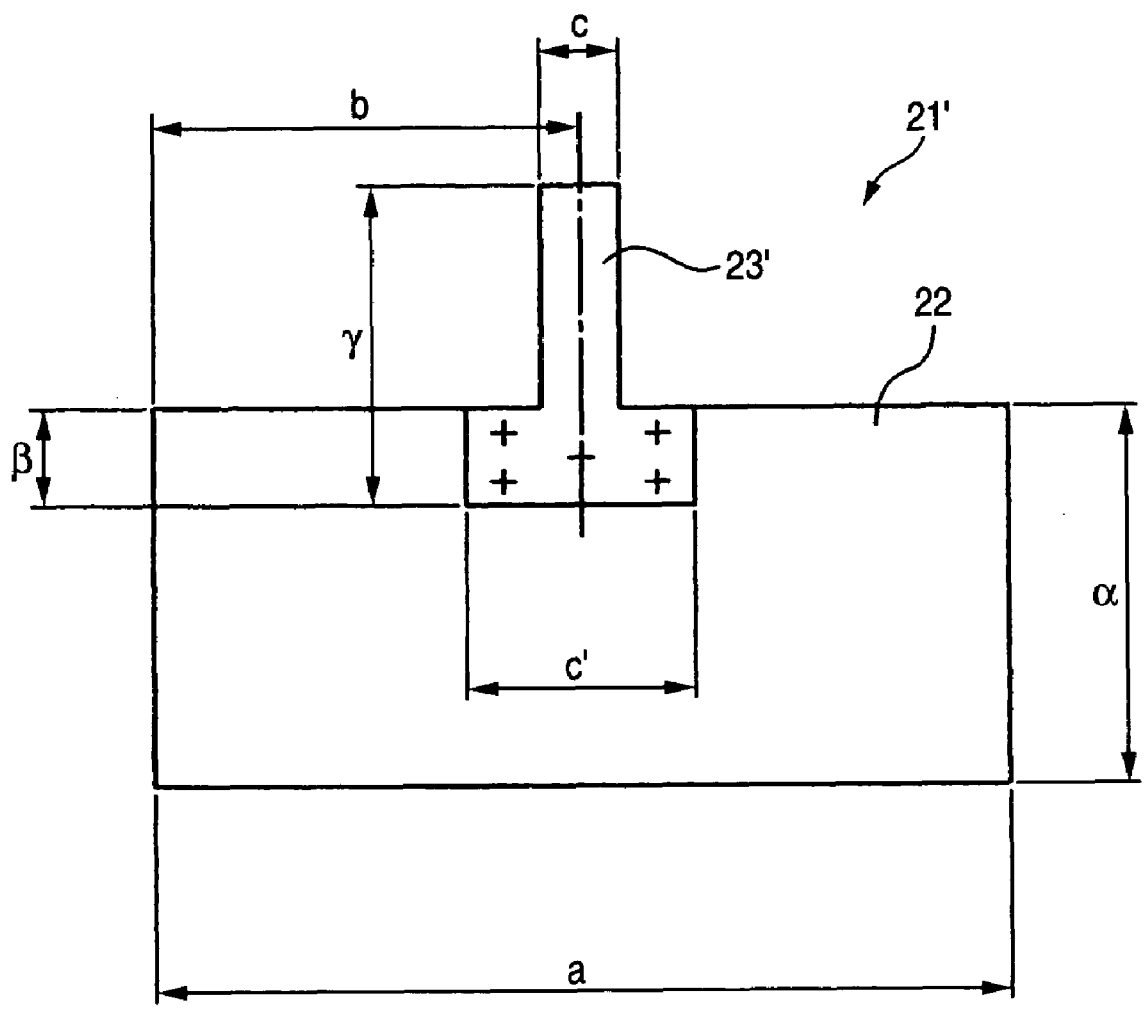
FIG. 15 is a front view of an electrode structure according to another embodiment of the invention; the view shows the state before being spirally wound.

Another preferred embodiment of the electrode structure of the invention will be explained below by reference to accompanying drawings. FIG. 15 is a front view of an electrode structure 21' according to this embodiment; the view shows the state before being spirally wound.

The members which are the same as or correspond to members in embodiment 1 described above are designated by the same numerals or signs, and explanations thereon are omitted.

As shown in FIG. 15, the electrode structure 21' according to this embodiment has a lug 23' in place of the lug 23 in the electrode structure as embodiment 1.

The lug 23' has been constituted so that the shape of that region of the lug 23' which overlaps the electrode substrate 22 is nearly similar to the outer shape of the electrode substrate 22.

Specifically, the lug 23' has a shorter-direction width of c and a longer-direction width of γ like the lug 23 in embodiment 1. However, the region which overlaps the electrode substrate 22 has a shorter-direction width of c'.

More specifically, the lug 23' has been constituted so that the part thereof extending outward from the electrode substrate 22 has a shorter-direction width of c and the part thereof which overlaps the electrode substrate 22 has a shorter-direction width of c' and that the c' satisfies $c'/\beta=(0.8 \text{ to } 1.2) \times (a/\alpha)$.

In the electrode structure 21' having this constitution, the distance from the lug 23' can be made even throughout the whole electrode substrate 22.

Consequently, this embodiment has the effect of being capable of further improving the charging characteristics of the electrode substrate 22 besides the effects in embodiment 1 described above.

EXAMPLES

Examples will be explained below which relate to storage batteries each employing as the positive electrode an electrode structure according to embodiment 1 described above.

EXAMPLE 78 TO EXAMPLE 81

(Constitution of Positive Electrode)

As the porous substrate was used a foamed nickel substrate having a basis weight of 400 g/m$^2$, longer-direction width a of 100 mm, and shorter-direction width a of 43 mm. This foamed nickel substrate was impregnated with a nickel hydroxide-based active material to produce an electrode substrate 22. Thereafter, a nickel lug 23 was bonded thereto by 5-spot welding.

As the nickel lug 23 was used one in which γ=25 mm and c=4 mm and which had a thickness of 0.1 mm. The welding position b of the nickel lug 23 (the distance between the one shorter side 2a and the center line X of the lug 23 in the electrode structure shown in FIG. 10) was: b=0.3a (Example 78), b=0.4a (Example 79), b=0.5a (Example 80), and b=0.6a (Example 81).

The detailed constitution is as follows. Namely, the nickel hydroxide-based active material used was a nickel hydroxide-based active material which comprised nickel hydroxide as the main component and 3 parts by weight of zinc and 2 parts by weight of cobalt, in terms of metal proportion, contained therein in a solid solution state and the surface of which had been coated with β-cobalt hydroxide. The amount of the β-cobalt hydroxide coating was 4% by weight in terms of metal amount.

Eighty parts by weight of this nickel hydroxide-based active material was mixed with 20 parts by weight of 0.5% aqueous carboxymethyl cellulose solution to prepare a paste to be used for impregnation.

The paste was evenly applied to the foamed nickel substrate and dried. Thereafter, the substrate was pressed to a dimension for AA-size batteries and cut into a size in which longer-direction width a=100 mm and shorter-direction width α=43 mm. The cutting was conducted so that the lug position b was 0.3a (Example 78), 0.4a (Example 79), 0.5a (Example 80), or 0.6a (Example 81) as stated above. The capacity of the electrode thus formed was 1,800 mAh.

(Constitution of Negative Electrode)

For a negative electrode was used a hydrogen-storing alloy having the composition $MmNi_{3.6}Co_{0.7}$-$Mn_{0.4}Al_{0.3}$ (wherein Mm means a mischmetal which is a mixture of rare-earth elements such as La, Ce, Pr, Nd, and Sm). Thereto were added 1% methyl cellulose and 60% aqueous SBR latex as a binder in amounts of 15% by weight and 1.5% by weight, respectively. The ingredients were mixed together to prepare a paste. Thereafter, the paste was applied to a perforated steel sheet and dried. After drying, the coated steel sheet was pressed to produce a hydrogen-storing alloy electrode. Thereafter, the electrode was cut into a size for AA-size batteries. The capacity of the negative electrode was regulated so as to be 1.4 times the capacity of the positive electrode.

(Constitution of Nickel/Metal-Hydride Battery)

The positive electrode plate 21 and the negative electrode plate 24 were spirally wound together with separators 30 sandwiched between these, the separators 30 each comprising a nonwoven polypropylene resin fabric which had a thickness of 100 μm and with which acrylic acid had been graft-polymerized. This wound assembly was disposed in a cylindrical case. A liquid electrolyte comprising an aqueous solution of potassium hydroxide in a concentration of 7 mol/$dm^3$ and lithium hydroxide in a concentration of 0.5 mol/$dm^3$ was filled into the case in an amount of 1.8 mL/battery. Thus, a sealed alkaline storage battery (nickel/metal-hydride battery) of the cylindrical AA size was produced which had a capacity of 1,800 mAh. In the manner described above, batteries of Examples 78 to 81 were obtained.

COMPARATIVE EXAMPLE 24 AND COMPARATIVE EXAMPLE 25

The same constitution as in the Examples given above was employed, except that the bonding position of the nickel lug b was changed to b=0.1a (Comparative Example 24) and b=0.8a (Comparative Example 25).

(Resistance Test)

With respect to each of Examples 78 to 81 and Comparative Examples 24 and 25, hundred storage batteries were produced and examined for resistance. Specifically, in an atmosphere having a temperature of 20° C., the nickel/metal-hydride batteries of Examples 78 to 81 and Comparative Examples 24 and 25 were charged at a charging current of 0.1 ItA for 16 hours and, after a 1-hour pause, discharged to 1.0 V at a current of 0.2 ItA; this operation was repeated 10 times. Subsequently to the final discharge, a current of 10 A was caused to flow in the charging direction for 10 msec and then the current was stopped. The difference (V) between the battery voltage as measured just before the current stopping and the battery voltage as measured at 0.1 msec after the current stopping was divided by the current (10 A), and the resultant quotient was taken as the value of resistance. The results of the test (average) are shown in Table 17 and FIG. 16.

TABLE 17

| Section | Lug bonding position (b/a) | Internal resistance (mΩ) | Charging efficiency (%) | Percentage of assembly failures (%) |
|---|---|---|---|---|
| Comp. Ex. 24 | 0.1 | 34.2 | 73 | 4 |
| Ex. 78 | 0.3 | 19.7 | 84.0 | 0 |
| Ex. 79 | 0.4 | 15.5 | 90.7 | 0 |
| Ex. 80 | 0.5 | 13.6 | 91.6 | 0 |
| Ex. 81 | 0.6 | 17.4 | 89 | 0 |
| Comp. Ex. 25 | 0.8 | 31.1 | 68 | 43 |

Figure 16:
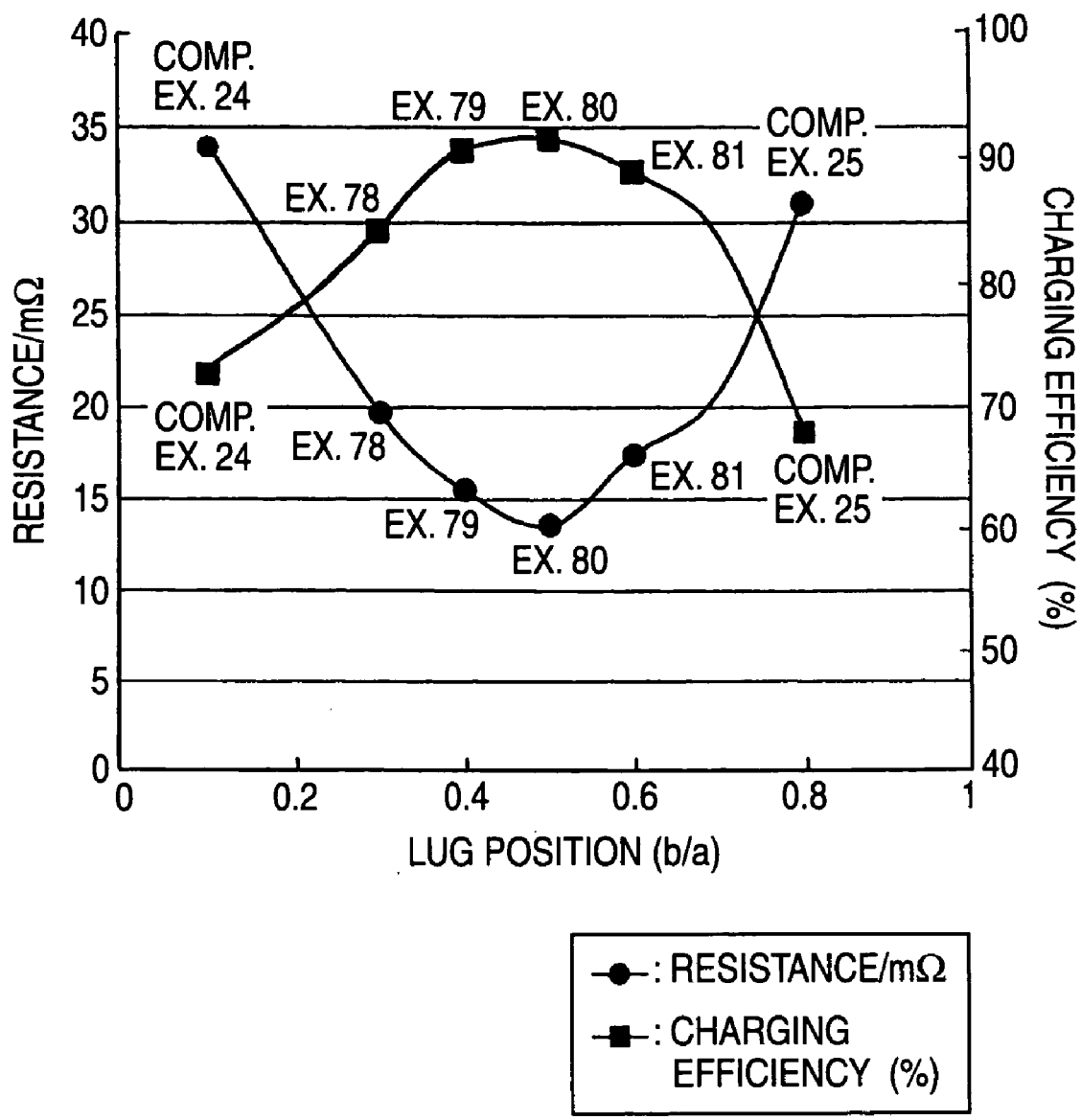
FIG. 16 is a graphic presentation showing the results of tests in Examples and Comparative Examples concerning resistance and charging efficiency.

As apparent from Table 17 and FIG. 16, Examples 78 to 81 were ascertained to have a lower resistance than Comparative Examples 24 and 25. Furthermore, Comparative Example 25 had an exceedingly high rate of assembly failures. The cause of these failures was the short-circuiting which occurred due to a contact of the lug with the inner circumferential surface of the case.

(Charging Efficiency Test)

As in the resistance test, hundred storage batteries for each of Examples 78 to 81 and Comparative Examples 24 and 25 were subjected to a charging efficiency test.

Specifically, the batteries were first charged at a current of 0.1 ItA for 16 hours and, after a 1-hour pause, discharged to 1.0 V at 0.2 ItA to measure the discharge capacity A. Furthermore, the batteries were charged at a current of 4 ItA for 15 minutes and, after a 1-hour pause, discharged to 1.0 V at 0.2 ItA to measure the discharge capacity B. The value of B/A× 100 was taken as the charging efficiency.

The results of the test (average) also are shown in Table 17 and FIG. 16.

As apparent from Table 17 and FIG. 16, the batteries of Examples 78 to 81 were ascertained to have a higher charging efficiency than the batteries of Comparative Examples 24 and 25.

The reasons why the batteries of Examples 78 to 81 have a higher charging efficiency than the batteries of Comparative Examples 24 and 25 are thought to be as follows. The nickel electrode as the positive electrode received charge in all parts of the electrode and, hence, the coefficient of active-material use was improved. In addition, the batteries of the Examples had a reduced charging current density and were inhibited from undergoing side reactions during charge (e.g., decomposition reactions of the liquid electrolyte), as compared with the batteries of the Comparative Examples, and this brought about an improved charging efficiency in rapid charging.

Incidentally, Example 78 among Examples 78 to 81 has a slightly lower charging efficiency than the other Examples as shown in Table 17 and FIG. 16. In the case of Examples 79 to 81, the values of charging efficiency were as high as 89% or above.

It can be seen from these results that in the case of storage batteries having no pressure switch function as shown in FIG. 11, the lug bonding position (b/a) is preferably 0.3-0.6 and is more preferably 0.4-0.6, which brings about a higher charging efficiency.

EXAMPLE 82 TO EXAMPLE 85

The battery constitution shown in FIG. 12, which is equipped with a pressure switch function, was employed. In FIG. 12, a synthetic rubber molding was used as the elastic object and the pressure at which the pressure switch functioned was regulated to 2 megapascals (MPa) The same electrode structures as in Examples 78 to 81 were applied to batteries of this constitution. Thus, batteries having the same constitutions as in Examples 78 to 81 were produced, except that they had a pressure switch. These batteries are referred to as the batteries of Examples 82 to 85.

COMPARATIVE EXAMPLE 26 AND COMPARATIVE EXAMPLE 27

The same electrode structures as in Comparative Examples 24 and 25 were applied to batteries with a pressure switch function as in Examples 82 to 85. The other constitutions were the same as in Comparative Examples 24 and 25. These batteries are referred to as the batteries of Comparative Examples 26 and 27.

(Charging Efficiency Test)

As in the case described above, the batteries were charged at a current of 0.1 ItA for 16 hours and, after 1-hour pause, discharged to 1.0 V at 0.2 ItA to measure the discharge capacity A.

Furthermore, the batteries were charged at a current of 4 ItA for 15 minutes and, after 1-hour pause, discharged to 1.0 V at 0.2 ItA to measure the discharge capacity B. The value of B/A×100 was taken as the charging efficiency. The results of the test are shown in Table 18.

TABLE 18

| Section | Lug bonding position (b/a) | Internal resistance (mΩ) | Charging efficiency (%) |
|---|---|---|---|
| Comp. Ex. 26 | 0.1 | 34.0 | 74 |
| Ex. 82 | 0.3 | 19.3 | 91.8 |
| Ex. 83 | 0.4 | 15.0 | 93.6 |
| Ex. 84 | 0.5 | 13.2 | 95.3 |
| Ex. 85 | 0.6 | 17.0 | 93 |
| Comp. Ex. 27 | 0.8 | 30.9 | 70 |

As shown in Table 18, the batteries of Examples 82 to 85 according to the invention have a higher charging efficiency than the batteries of Comparative Examples 26 and 27.

The reasons why the batteries of Examples 82 to 85 have an increased charging efficiency are thought to be as follows. Compared to the batteries of Comparative Examples 26 and 27, the batteries of Examples 82 to 85 had a reduced charging current density and were inhibited from undergoing side reactions during charge (e.g., decomposition reactions of the liquid electrolyte). Because of this, the batteries of the Examples were inhibited from increasing in internal pressure and, hence, the proportion of periods where the pressure switch function worked and the charging circuit was off in the charging time could be small.

When an attempt is made in which a battery which has been completely or almost completely discharged is rapidly charged in a period as short as 15-30 minutes, then the battery temperature rises to accelerate side reactions and cause a possibility that the charging efficiency might decrease. As apparent from a comparison between the results given in Table 17 and the results given in Table 18, the batteries of Examples 82 to 85 according to the invention have an even higher charging efficiency than the batteries of Examples 78 to 81.

Furthermore, although the battery of Example 78 had a slightly low charging efficiency, the battery of Example 85, which has the same lug bonding position (b/a) as in Example 78, has a charging efficiency as high as above 90%.

The reasons for this are thought to be as follows. Since a pressure switch function had been imparted to the batteries of Examples 82 to 85, the charging-circuit on/off switch function worked during charge. These batteries are hence more inhibited from undergoing a local increase in internal temperature than the batteries of Examples 78 to 81, and are thus inhibited from undergoing side reactions during charge.

It is thought that by applying the electrode structure according to the invention to a battery having a pressure switch function as described above, the charging efficiency in rapid charging could be markedly heightened.

As shown in Table 18, the batteries having a pressure switch function show a charging efficiency as high as above 90%, when the lug bonding position (b/a) is in the range of 0.3-0.6. In particular, when the lug bonding position (b/a) is in the range of 0.4-0.6, the charging efficiency is 93% or higher. It can hence be seen that the latter range is especially preferred.

Incidentally, the materials (compositions) of the active materials and other components of the battery according to the invention should not be construed as being limited to those described in the Examples. For example, the active material of the nickel electrode for use as the positive electrode can be one which has undergone oxidation by a chemical or electrochemical method to regulate the oxidation number of transition metal elements, e.g., nickel and cobalt, contained in the active material to a value exceeding 2.

Furthermore, a compound (oxide or hydroxide) containing a rare-earth element such as erbium, thulium, ytterbium, lutetium, or yttrium can be incorporated into the nickel electrode to thereby inhibit oxygen from generating at the nickel electrode during charge and further heighten the charging efficiency.

Although nickel/metal-hydride batteries were explained above as examples, the invention should not be construed as being limited to these and is applicable to other batteries.

Moreover, in the Examples given above, constant-current charging conducted at 4 ItA for 15 minutes was shown as an example of rapid charging. However, modes of charging and charging times applicable to the battery of the invention should not be construed as being limited to these. With respect to charging modes, for example, application of constant-voltage charging is also effective.

INDUSTRIAL APPLICABILITY

The alkaline storage batteries described in claims 1-30 can be inhibited from increasing in gas pressure in the battery or increasing in battery temperature, even when charged at such a high rate that charging is completed in 15 minutes to 30 minutes. These batteries attain a high charging efficiency even in such high-rate charging and hence have exceedingly high industrial applicability.

The invention claimed is:

1. A sealed alkaline storage battery, comprising:
   a positive electrode comprising a nickel electrode,
   wherein the battery is capable of charge when the gas pressure in the battery is not higher than a specified value and incapable of charge when the gas pressure in the battery exceeds the specified value, and
   wherein the positive electrode contains a compound containing at least one element selected from the group consisting of Ho, Er, Tm, Yb, Lu, Y, and Ca.

2. A sealed alkaline storage battery, comprising:
   a positive electrode comprising a nickel electrode, wherein the battery is capable of charge when a gas pressure in the battery and a battery temperature are not higher than specified values and incapable of charge when the gas pressure in the battery and the battery temperature exceed the specified values, and wherein the positive electrode contains a compound containing at least one element selected from the group consisting of Ho, Er, Tm, Yb, Lu, Y, and Ca.

3. The sealed alkaline storage battery of claim 2, wherein a ratio between a capacity of a negative electrode and a capacity of the positive electrode is in a range from 1.02 to 1.45, and wherein at least one of the specified value of the gas pressure in the battery has been set at a value in a range of 1.0-3.0 megapascals (MPa) and the specified value of the battery temperature has been set at a value in a range of 50-80° C.

4. A process for producing the sealed alkaline storage battery of claim 3, comprising:

forming said nickel electrode by filling, on a first porous substrates, a first powdery material which comprises, as a major constituent material, an active material, comprising nickel hydroxide as a main component, wherein an average oxidation number of transition metal elements contained in said first powdery material is in a range from 2.04-2.4.

5. The process for producing the sealed alkaline storage battery of claim 4, further comprising one of chemically oxidizing said first powdery material with an oxidizing agent, and electrochemically oxidizing said first powdery material, wherein said chemically oxidizing said first powdery material and said electrochemically oxidizing said first powdery material occurs before said first powdery material is incorporated into the battery to thereby regulate the average oxidation number of the transition metal elements contained in the first powdery material to the range from 2.04-2.4.

6. The process for producing a sealed alkaline storage battery of claim 5, further comprising:

forming said positive electrode by filling, on a second porous substrate, a second powdery material prepared by one of adding one of a compound of cobalt having an oxidation number of 2 or smaller and elementary cobalt to said first powdery material and forming a coating layer comprising a compound of cobalt having one of an oxidation number of 2 or smaller and elementary cobalt on a surface of the active material, and charging said positive electrode in an alkaline liquid electrolyte before incorporating said positive electrode into the battery to thereby regulate the average oxidation number of the transition metal elements contained in the first powdery material to a range of 2.04-2.4.

7. The process for producing a sealed alkaline storage battery of claim 6, further comprising:

incorporating the positive electrode and the negative electrode into the battery, said negative electrode employing a hydrogen-storing material;

subsequently charging the battery in an unsealed state to regulate the average oxidation number of the transition metal elements contained in the first powdery material of the positive electrode to the range from 2.04-2.4;

bringing the battery, after completion of the charging, under a reduced pressure obtained by suction to thereby remove hydrogen accumulated in the negative electrode due to the charging; and sealing the battery.

8. The sealed alkaline storage battery of claim 1 or 2, wherein said compound containing at least one element selected from the group consisting of Ho, Er, Tm, Yb, Lu, Y, and Ca is not contained as a eutectoid with an active material comprising nickel hydroxide as a main component.

9. The sealed alkaline storage battery of claim 1 or 2, wherein a proportion of the compound containing at least one element selected from the group consisting of Ho, Er, Tm, Yb, Lu, Y, and Ca is in a range from 0.1% by weight to 5% by weight.

10. The sealed alkaline storage battery of claim 1 or 2, wherein an aqueous alkali solution is employed as a liquid electrolyte, said aqueous alkali solution comprising one or more electrolytes comprising potassium hydroxide as a major electrolytes, and wherein a concentration of the electrolytes is 7.5±1.5 mol/dm$^3$, the liquid electrolyte being contained in a range from 0.6-1.4 cm$^3$ per unit capacity (Ah) of the alkaline storage battery.

11. The sealed alkaline storage battery of claim 1 or 2, wherein a nonwoven fabric comprising hydrophilic fibers of 0.5 deniers or finer is employed as a separator.

12. The sealed alkaline storage battery of claim 11, wherein the hydrophilic fibers constituting the nonwoven fabric employed as the separator are split fibers comprising one of a copolymer of an olefin and vinyl alcohol, and polyolefin fibers into which sulfo groups have been incorporated, and wherein the nonwoven fabric has a basis weight in a range of 35-70 g/m$^2$.

13. The sealed alkaline storage battery of claim 1 or 2, wherein a negative electrode comprises a catalyst which accelerates a reaction by which at least one of oxygen gas and hydrogen gas is absorbed.

14. The sealed alkaline storage battery of claim 13, wherein the catalyst comprises one of Raney cobalt and Raney nickel.

15. A process for producing the sealed alkaline storage battery of claim 1 or 2, wherein an active material of a negative electrode is comprises a hydrogen-storing-alloy powder, and wherein one of the hydrogen-storing-alloy powder or a negative electrode obtained by filling the hydrogen-storing-alloy powder on a porous substrate is brought into contact with one of an acid solution and an aqueous alkaline solution before being incorporated into the battery to thereby activate the hydrogen-storing-alloy powder.

16. The sealed alkaline storage battery of claim 1 or 2, wherein an active material of a negative electrode comprises a hydrogen-storing-alloy powders, and wherein the negative electrode contains, outside a structure of the hydrogen-storing-alloy powder, at least one rare-earth element selected from the group consisting of Ho, Er, Tm, Yb, Lu, Y, and Ce.

17. The sealed alkaline storage battery of claim 2, wherein a ratio between a capacity of a negative electrode and a capacity of the positive electrode is greater than 1.45, and wherein at least one of the specified value of the gas pressure in the battery has been set at a value in a range of 0.5-1.5 megapascals (MPa) and the specified value of the battery temperature has been set at a value in a range of 50-80° C.

18. A method of charging the sealed alkaline storage battery of claim 2, wherein, when at least one of an internal pressure of the battery being charged and the battery temperature exceeds the specified values, the charging is stopped, and wherein when the internal pressure of the battery and the battery temperature is not higher than the specified value, charging is conducted.

19. A method of charging the sealed alkaline storage battery of claim 17, wherein charging is conducted at a constant voltage, and
  wherein a charging voltage is in a range of 1.5-1.7 V.

20. The sealed alkaline battery of claim 1 or 2, wherein the battery comprises an electrode structure comprising:
  electrode obtained by impregnating said electrode with an active material;
  a porous electrode substrate capable of being spirally wound, said porous electrode substrate having a rectangular shape with a longer-direction width of a and a shorter-direction width of $\alpha$ with a shorter side of the shorter-directing width facing toward a center; and
  a single lug bonded to the porous electrode substrate, the single lug having been bonded to the porous electrode substrate in such a position that the distance b between the shorter side of the porous electrode substrate and a center line of the single lug satisfies $0.3a \leq b \leq 0.6a$.

21. The sealed alkaline battery of claim 20, wherein the single lug has a shorter-direction width and a longer-direction width, which are widths as measured respectively along a longer direction and a shorter direction for the porous electrode substrate, of c and $\gamma$, respectively, and
  wherein a region of the single lug which overlaps the porous electrode substrate has a length of $\beta$, where a, c, $\alpha$, $\beta$, and $\gamma$ satisfying the following:

$0.02 \leq c/a \leq 0.07$, $0.065 \leq \beta/\alpha \leq 0.45$, and $0.1 \leq \beta/\gamma \leq 0.75$.

22. The sealed alkaline battery of claim 20, wherein a region in which the single lug overlaps the porous electrode substrate has a shape similar to an outer shape of the porous electrode substrate.

23. The sealed alkaline battery of claim 20, wherein the single lug has been bonded to the porous electrode substrate by welding.

24. The sealed alkaline battery of claim 23, wherein the welding comprises spot welding conducted on a plurality of spots radially arranged around a point of intersection of a center line of the single lug and a longer side of the porous electrode substrate to which the single lug is bonded.

25. The sealed alkaline storage battery of claim 1, wherein a ratio between a capacity of a negative electrode and a capacity of the positive electrode is in a range from 1.02 to 1.45, and
  wherein the specified value of the gas pressure in the battery has been set at a value in a range of 1.0-3.0 megapascals (MPa).

26. A process for producing the sealed alkaline storage battery of claim 25, comprising:
  forming said nickel electrode by filling, on a first porous substrate, a first powdery material which comprises, as a major constituent material, an active material, comprising nickel hydroxide as a main component,
  wherein an average oxidation number of transition metal elements contained in said first powdery material is in a range from 2.04-2.4.

27. The process for producing the sealed alkaline storage battery of claim 26, further comprising one of chemically oxidizing said first powdery material with an oxidizing agent, and electrochemically oxidizing said first powdery material,
  wherein said chemically oxidizing said first powdery material and said electrochemically oxidizing said first powdery material occurs before said first powdery material is incorporated into the battery to thereby regulate the average oxidation number of the transition metal elements contained in the first powdery material to the range from 2.04-2.4.

28. The process for producing a sealed alkaline storage battery of claim 27, further comprising:
  forming said positive electrode by filling, on a second porous substrate, a second powdery material prepared by one of adding one of a compound of cobalt having an oxidation number of 2 or smaller and elementary cobalt to said first powdery material and forming a coating layer comprising a compound of cobalt having one of an oxidation number of 2 or smaller and elementary cobalt on a surface of the active material, and
  charging said positive electrode in an alkaline liquid electrolyte before incorporating said positive electrode into the battery to thereby regulate the average oxidation number of the transition metal elements contained in the first powdery material to a range of 2.04-2.4.

29. The process for producing a sealed alkaline storage battery of claim 28, further comprising:
  incorporating the positive electrode and the negative electrode into the battery, said negative electrode employing a hydrogen-storing material;
  subsequently charging the battery in an unsealed state to regulate the average oxidation number of the transition metal elements contained in the first powdery material of the positive electrode to the range from 2.04-2.4;
  bringing the battery, after completion of the charging, under a reduced pressure obtained by suction to thereby remove hydrogen accumulated in the negative electrode due to the charging; and
  sealing the battery.

30. A method of charging the sealed alkaline storage battery of claim 1, wherein, when an internal pressure of the battery exceeds the specified value, the charging is stopped, and
  wherein, when the internal pressure of the battery is not higher than the specified value, charging is conducted.

* * * * *